US009521722B2

(12) United States Patent
Wong et al.

(10) Patent No.: US 9,521,722 B2
(45) Date of Patent: Dec. 13, 2016

(54) LED LIGHTING SYSTEM

(71) Applicants: Chon Meng Wong, Lincoln, RI (US);
Belinda H. T. Wong, Lincoln, RI (US);
An-Kwok Ian Wong, Lincoln, RI (US)

(72) Inventors: Chon Meng Wong, Lincoln, RI (US);
Belinda H. T. Wong, Lincoln, RI (US);
An-Kwok Ian Wong, Lincoln, RI (US)

(*) Notice: Subject to any disclaimer, the term of this patent is extended or adjusted under 35 U.S.C. 154(b) by 224 days.

(21) Appl. No.: 14/549,337

(22) Filed: Nov. 20, 2014

(65) Prior Publication Data
US 2015/0305120 A1 Oct. 22, 2015

Related U.S. Application Data

(62) Division of application No. 12/932,608, filed on Feb. 28, 2011, now Pat. No. 8,912,905.

(51) Int. Cl.
G06F 13/42 (2006.01)
H05B 33/08 (2006.01)
F21V 23/04 (2006.01)
H05B 37/02 (2006.01)
F21S 8/00 (2006.01)
(Continued)

(52) U.S. Cl.
CPC ............ H05B 33/0854 (2013.01); F21S 4/28 (2016.01); F21S 8/03 (2013.01); F21V 13/08 (2013.01); F21V 14/04 (2013.01); F21V 17/10 (2013.01); F21V 23/003 (2013.01); F21V 23/0442 (2013.01); F21V 23/0464 (2013.01); F21V 23/06 (2013.01); F21V 33/0052 (2013.01); F21V 33/0076 (2013.01); G06Q 10/0633 (2013.01); G06Q 10/063114 (2013.01); H05B 33/0815 (2013.01); H05B 33/0851 (2013.01); H05B 37/0218 (2013.01); H05B 37/0227 (2013.01); H05B 37/0263 (2013.01); H05B 37/0272 (2013.01); F21V 14/02 (2013.01); F21V 19/02 (2013.01); F21W 2131/40 (2013.01); F21W 2131/402 (2013.01); F21Y 2101/00 (2013.01); F21Y 2103/10 (2016.08); F21Y 2115/10 (2016.08); Y02B 20/46 (2013.01)

(58) Field of Classification Search
CPC .... F21V 14/04; F21V 23/003; F21V 23/0442; F21V 33/0052; F21W 2131/402; F21Y 2101/00; F21Y 2115/10; G06Q 10/063114; G06Q 10/0633; H05B 33/0815; H05B 33/0851
See application file for complete search history.

(56) References Cited

U.S. PATENT DOCUMENTS 6,609,804 B2 8/2003 Nolan et al.
6,816,074 B2 11/2004 Wong
(Continued)

Primary Examiner — Omeed Alizada

(57) ABSTRACT

A lighting system includes at least one lighting apparatus having a light emitting element capable of emitting a controllably variable light output in a region. A position determination subsystem is capable of determining a position in three dimensions of at least one mobile entity within the region. A control subsystem is capable of variably controlling a light output of the at least one lighting apparatus according to the position of the mobile entity. The system may determine position by radio ranging with mobile electronic elements. The system may include multiple lighting elements and may determine light levels according to positions of multiple mobile entities. The system may include a database of information about lighting elements, mobile entities, and lighting plans that may be selected from mobile electronic elements.

10 Claims, 43 Drawing Sheets

(51) Int. Cl.

| | | |
|---|---|---|
| *F21V 13/08* | (2006.01) | |
| *F21V 14/04* | (2006.01) | |
| *F21V 17/10* | (2006.01) | |
| *F21V 23/00* | (2015.01) | |
| *F21V 23/06* | (2006.01) | |
| *F21V 33/00* | (2006.01) | |
| *G06Q 10/06* | (2012.01) | |
| *F21V 14/02* | (2006.01) | |
| *F21V 19/02* | (2006.01) | |
| *F21W 131/40* | (2006.01) | |
| *F21W 131/402* | (2006.01) | |
| *F21Y 101/00* | (2016.01) | |

(56) References Cited

U.S. PATENT DOCUMENTS

| | | | |
|---|---|---|---|
| 6,853,151 | B2 | 2/2005 | Leong et al. |
| 6,860,628 | B2 | 3/2005 | Robertson et al. |
| 6,865,347 | B2 | 3/2005 | Perkins et al. |
| 7,080,921 | B2 | 7/2006 | Feldstein |
| 7,114,830 | B2 | 10/2006 | Robertson et al. |
| 7,178,941 | B2 | 2/2007 | Roberge et al. |
| 7,202,613 | B2 | 4/2007 | Morgan et al. |
| 7,309,965 | B2 | 12/2007 | Dowling et al. |
| 7,450,085 | B2 | 11/2008 | Thielemans et al. |
| 7,490,957 | B2 | 2/2009 | Leong et al. |
| 7,507,001 | B2 | 3/2009 | Kit |
| 7,546,167 | B2 | 6/2009 | Walters et al. |
| 7,549,773 | B2 | 6/2009 | Lim |
| 7,598,854 | B2 | 10/2009 | Wong |
| 7,603,184 | B2 | 10/2009 | Walters et al. |
| 7,659,674 | B2 | 2/2010 | Mueller et al. |
| 7,761,260 | B2 | 7/2010 | Walters et al. |
| 7,796,030 | B2 | 9/2010 | Lim |
| 7,806,569 | B2 | 10/2010 | Sanroma et al. |
| 7,828,465 | B2 | 11/2010 | Roberge et al. |
| 7,874,701 | B2 | 1/2011 | Pohlert et al. |
| 7,946,729 | B2 | 5/2011 | Ivey et al. |
| 7,961,113 | B2 | 6/2011 | Rabiner et al. |
| 7,994,723 | B2 | 8/2011 | Budde et al. |
| 8,047,682 | B2 | 11/2011 | Zheng et al. |
| 8,096,685 | B2 | 1/2012 | Lu et al. |
| 8,118,447 | B2 | 2/2012 | Simon et al. |
| 8,138,690 | B2 | 3/2012 | Chemel et al. |
| 8,143,811 | B2 | 3/2012 | Shloush et al. |
| 8,184,280 | B2 | 5/2012 | Meijer et al. |
| 8,203,581 | B2 | 6/2012 | Garcia et al. |
| 8,207,821 | B2 | 6/2012 | Roberge et al. |
| 8,214,084 | B2 | 7/2012 | Ivey et al. |
| 8,233,806 | B2 | 7/2012 | Kitaji |
| 8,235,554 | B2 | 8/2012 | Steinkraus |
| 8,251,544 | B2 | 8/2012 | Ivey et al. |
| 8,262,249 | B2 | 9/2012 | Hsia et al. |
| 8,264,172 | B2 | 9/2012 | Valois et al. |
| 8,324,817 | B2 | 12/2012 | Ivey et al. |
| 8,331,790 | B2 | 12/2012 | Pederson et al. |
| 8,339,069 | B2 | 12/2012 | Chemel et al. |
| 8,339,247 | B2 | 12/2012 | Adamson et al. |
| 2004/0052076 | A1 | 3/2004 | Mueller et al. |
| 2005/0047134 | A1 | 3/2005 | Mueller et al. |
| 2008/0315772 | A1 | 12/2008 | Knibbe |
| 2009/0039797 | A1 | 2/2009 | Wang et al. |
| 2009/0261748 | A1 | 10/2009 | McKinney et al. |
| 2009/0267540 | A1 | 10/2009 | Chemel et al. |
| 2009/0327245 | A1 | 12/2009 | Wong et al. |
| 2010/0039253 | A1 | 2/2010 | Zang et al. |
| 2010/0084985 | A1 | 4/2010 | Woytowitz |
| 2010/0225484 | A1 | 9/2010 | Van De Sluis et al. |
| 2010/0259931 | A1 | 10/2010 | Chemel et al. |
| 2010/0264846 | A1 | 10/2010 | Chemel et al. |
| 2010/0270933 | A1 | 10/2010 | Chemel et al. |
| 2010/0271476 | A1 | 10/2010 | Damink et al. |
| 2010/0283401 | A1 | 11/2010 | Chung et al. |
| 2010/0295473 | A1 | 11/2010 | Chemel et al. |
| 2010/0295474 | A1 | 11/2010 | Chemel et al. |
| 2010/0295475 | A1 | 11/2010 | Chemel et al. |
| 2010/0295482 | A1 | 11/2010 | Chemel et al. |
| 2010/0296285 | A1 | 11/2010 | Chemel et al. |
| 2010/0301768 | A1 | 12/2010 | Chemel et al. |
| 2010/0301769 | A1 | 12/2010 | Chemel et al. |
| 2010/0301770 | A1 | 12/2010 | Chemel et al. |
| 2010/0301771 | A1 | 12/2010 | Chemel et al. |
| 2010/0301773 | A1 | 12/2010 | Chemel et al. |
| 2010/0301774 | A1 | 12/2010 | Chemel et al. |
| 2010/0301834 | A1 | 12/2010 | Chemel et al. |
| 2010/0302779 | A1 | 12/2010 | Chemel et al. |
| 2010/0327757 | A1 | 12/2010 | Chung et al. |
| 2010/0327764 | A1 | 12/2010 | Knapp |
| 2011/0001436 | A1 | 1/2011 | Chemel et al. |
| 2011/0001438 | A1 | 1/2011 | Chemel et al. |
| 2011/0316441 | A1 | 12/2011 | Huynh |

| PIN # | Pin Name | Pin-Type | Description |
|---|---|---|---|
| 20 | SI | Digital Input | Serial configuration interface, data input |
| 2 | SO | Digital Output | Serial configuration interface, data output Optional general output pin when CSn is high |
| 1 | SCLK | Digital Input | Serial configuration interface, clock input |
| 7 | CSn | Digital Input | Serial configuration interface, Chip Select |
| 3 | GDO2 | Digital Output | Clear Channel Indicator |
| 6 | GDO0 | Digital I/O | Test Signals |
| 4 | DVDD | Power (Digital) | 1.8 – 3.6 V |
| 5 | DCOUPL | Power (Digital) | 1.6~2.0V |
| 9,11,14,15 | AVDD | Power (Analog) | 1.8 – 3.6 V |
| 16 | GND | Ground (Analog) | Analog ground connection |
| 19 | GND | Ground (Digital) | Ground connection for digital noise isolation |
| 12 | RF_P | RF I/O | Positive RF Input signal to LNA in receive mode. Positive RF output signal from PA in transmit mode |
| 13 | RF_N | RF I/O | Negative RF Input signal to LNA in receive mode. Negative RF output signal from PA in transmit mode |
| 18 | DGuard | Power (Digital) | Power Supply connection for digital noise isolation |
| 17 | RBias | Analog I/O | External bias resistor for reference current |
| 8 | XOsc_01 | | Oscillator Crystal |
| 10 | XOsc_02 | | Oscillator Crystal |

Figure 47

| 942 | P3.4_TXD0 | Digital I/O | UART Transmit |
|---|---|---|---|
| 944 | P3.5_RXD0 | Digital I/O | UART Receive |
| 946 | Test/SBWTCK | Digital Input | Select test mode for JTAG pins on Port 1. |
| 948 | RST/NMI/SBWTIO | Digital Input | Reset or Non Maskable interrupt input |
| 950 | P1.2/TA | Digital I/O | |
| | | | |
| | | | |

Figure 48

| Parts | Part Values | Description |
|---|---|---|
| 904 | 26-27MHz crystal | 26-27MHz crystal oscillator |
| 906, 908 | 15pF ~ 27pF | crystal loading NPO capacitors |
| 910, 918 | 1.0 pF +/-0.25pF | RF balun /matching capacitors |
| 912, 914 | 4.7nH+/- 0.3nH | RF balun /matching inductors |
| 916 | 4.7nH+/- 0.3nH | RF LC Filter inductor |
| 920 | 100 pF +/- 5% | DC Blocking capacitor |
| 922, 924 | 0.47pF +/- 0.25pF | RF LC filter /matching capacitor |
| 926, 928 | 100pF +/- 5%. | RF balun DC blocking NPO capacitors |
| 930 | 100 pF +/- 5% | RF balun DC blocking NPO capacitors |
| 932 | 56K ohms 1%. | for internal bias current reference |
| 934 | 220pF +/- 5% | Decoupling capacitors for on board regulator |
| 936 | 100 nF +/- 10% | Decoupling capacitors for on board regulator |
| 938 | 100 nF +/- 10% | Decoupling capacitors |
| 940 | 50 ohms | 50 ohms Antenna |

Figure 49

LED LIGHTING SYSTEM

CROSS-REFERENCE TO RELATED APPLICATIONS

This divisional application claims priority date under U.S. application Ser. No. 12/932,608 dated Feb. 28, 2011.

STATEMENT REGARDING FEDERALLY SPONSORED RESEARCH OR DEVELOPMENT

None.

NAMES OF THE PARTIES TO A JOINT RESEARCH AGREEMENT

None.

BACKGROUND

Lighting usually is an integral part of an office, factory, store, supermarket, hospital, home, other building, parking lot, walkway, roadway, park or other improved location. Light fixtures most commonly are located in close proximity above or on the sides of locations that people tend to occupy. A typical building incorporates a range of fixtures to address occupants' needs. For example, a building may use 2 foot, 4 foot, or 8 foot fluorescent light fixtures with different wattages, light angles and mounting requirements. Open spaces may use fixtures of differing size and power.

Commercial buildings and other lighting typically involves the use of lighting fixtures that can only be turned on or off, such as by a mechanical switch, a motion detector, a light sensor switch or a timer. Some offices and outdoor security lighting use motion detectors with light sensors to trigger the switching of lights. If the timer is set too long, it wastes energy. If timer is set too short, it annoys its occupants. (The term "occupant" is not intended to be limited to interior building occupants but to occupants of any lighted space.) Furthermore, if an obstruction blocks a motion sensor, or if an occupant is beyond sensor range, the lighting scheme may not work at all. Occupants are often annoyed by the automatic switching off the lights when an occupant remains in a space beyond the timer period, such as by sitting still using a computer or reading a book.

SUMMARY

An objective of the invention is to provide improved lighting fixtures and systems. A further objective is to provide lighting systems with enhanced intelligence. Yet another objective is to provide lighting fixtures and systems that better adapt to occupant needs and environmental factors to provide enhanced productivity, security, asset tracking, occupant health monitoring, and other goals. Other objectives include:

(A) providing lighting that is more efficient than incandescent and fluorescent lights;

(B) providing lighting fixtures suitable for retrofit to existing buildings or installation in newly-constructed buildings; and (C) providing lighting fixtures suitable for stand-alone operation or operation that coordinates multiple fixtures;

These and other objects may be achieved by providing lighting fixtures and systems designed with light emitting diodes (LEDs) that may be more efficient than fluorescent lights. Preferred fixtures may have modules that are 22 inches in length and optional numbers of LEDs in strips with variable output wattages and color temperatures. The modules can be chained together to achieve longer lengths. LED light strips preferably have several segments which may be individually driven or commonly driven. In the event that LEDs in some but less than all segments should fail, the LEDs in the other segments would remain functional. This overcomes a draw back in incandescent and fluorescent light fixtures that may go totally dark upon failure of an individual bulb. Fixtures may provide different color lights for each individual LED segment. The use of Red, Blue and Green LEDs for each segment allows the fixture to provide a selectable color chromaticity. An output level and/or chromaticity will be referred to here as a light plan. Fixtures may include capability for performing some or all of the following functions:

a) Self reporting of power usage and power consumption histories and patterns.

b) Automatic control of light fixture usage due to:
  i) environment (e.g., ambient light, time of day, etc.),
  ii) motion detectors sensing the presence and/or activity of people,
  iii) behavior or pattern of occupants, and/or
  iv) proximity of users and events;
  and/or c) Security and/or backup lighting for security and/or safety.

Lighting usage may be adjusted according to social behavior patterns. Social behavior may be captured by associating a wearable or otherwise portable device carried by occupants, such as a badge embedded with RFID devices, a cell phone, or other another electronic device that has a traceable unique identifier. Lighting fixtures may be assigned with a unique identifier and may communicate with portable devices to form a dynamic wireless network, such as a Zigbee network. A database may be provided to maintain information about portable devices, fixtures, and other information.

The early sections of the description below discuss lighting fixtures and their mechanical parts and assembly. Among other things, they describe a modular feature and a reflector that can adjust its angle to tailor light distribution to room requirements. The LEDs can cascade to various lengths according to room requirements while still powered by the same power source and drivers.

Then, circuit designs of LED drivers for lighting fixtures are shown with electrical details of how fixtures may be powered by one or more drivers under cascading conditions. The intensity of LED chains may be varied by a dimming capability of drivers and controllers. Alternative circuit configurations of drivers, jumpers and temperature controls are shown which facilitate LED function and longevity. LEDs can have 50,000 to 60,000 hours of lifetime compared to 8,000 to 10,000 hours for fluorescent lights.

Final sections discuss the use of microcontroller systems in the fixtures, portable devices worn by the users and network servers controlling, recording and coordinating lighting functions.

BRIEF DESCRIPTION OF THE SEVERAL VIEWS OF THE DRAWING

Reference will be made to the following drawings, which illustrate preferred embodiments of the invention as contemplated by the inventor(s).

FIG. 47. CC2500 Pin Configuration and Pin function
FIG. 48. MSP430 Communication Pins.
FIG. 49. CC2500 components values.

DETAILED DESCRIPTION OF THE INVENTION

A need exists for intelligence in responding to lighting needs of the users or occupants of a building, walkway, or other indoor or outdoor places that people may occupy. Activities determine how bright a location may need to be. People occupying spaces where the light fixtures are installed often have unspoken social interactions and intentions. A light fixture output should respond to the needs and requirements of the occupants, their activities, and the environment. Environmental factors also influence lighting needs, such as interior or exterior location, proximity to windows (if interior), other light sources and time of day. Consider, for example, a person walking across a very large space, such as a conference room, long hallway, parking lot, or sidewalk. The person would expect good lighting conditions in the direction of travel. However, to light up an entire area equally with constant brightness would be energy inefficient. Therefore an automatic adaptation of the lighting conditions in the direction of travel would conserve energy. A janitor, who cleans the offices especially during the night would need the light levels to be high to perform a good job. A person working on a computer and looking at a screen would like to have the room light level to be less then for reading a book. The room lights should not cause glare or compete with the computer monitor brightness. Adjusting lights with the right level would not only save the lighting energy, it would save the computer monitor's energy too. It is useful to track positions occupants relative to lights sources.

Light fixtures preferably will be installed in fixed locations in every room throughout a building or at regular intervals in exterior spaces. Their locations preferably will be non-obstructive and strategically positioned where the occupants would use the light for carrying out their activities. Most likely these fixtures would be installed above people's heads and therefore provide a good planar arrangement defining the ground or floor level. Staircase lightings would appear as between levels.

Figure 1:
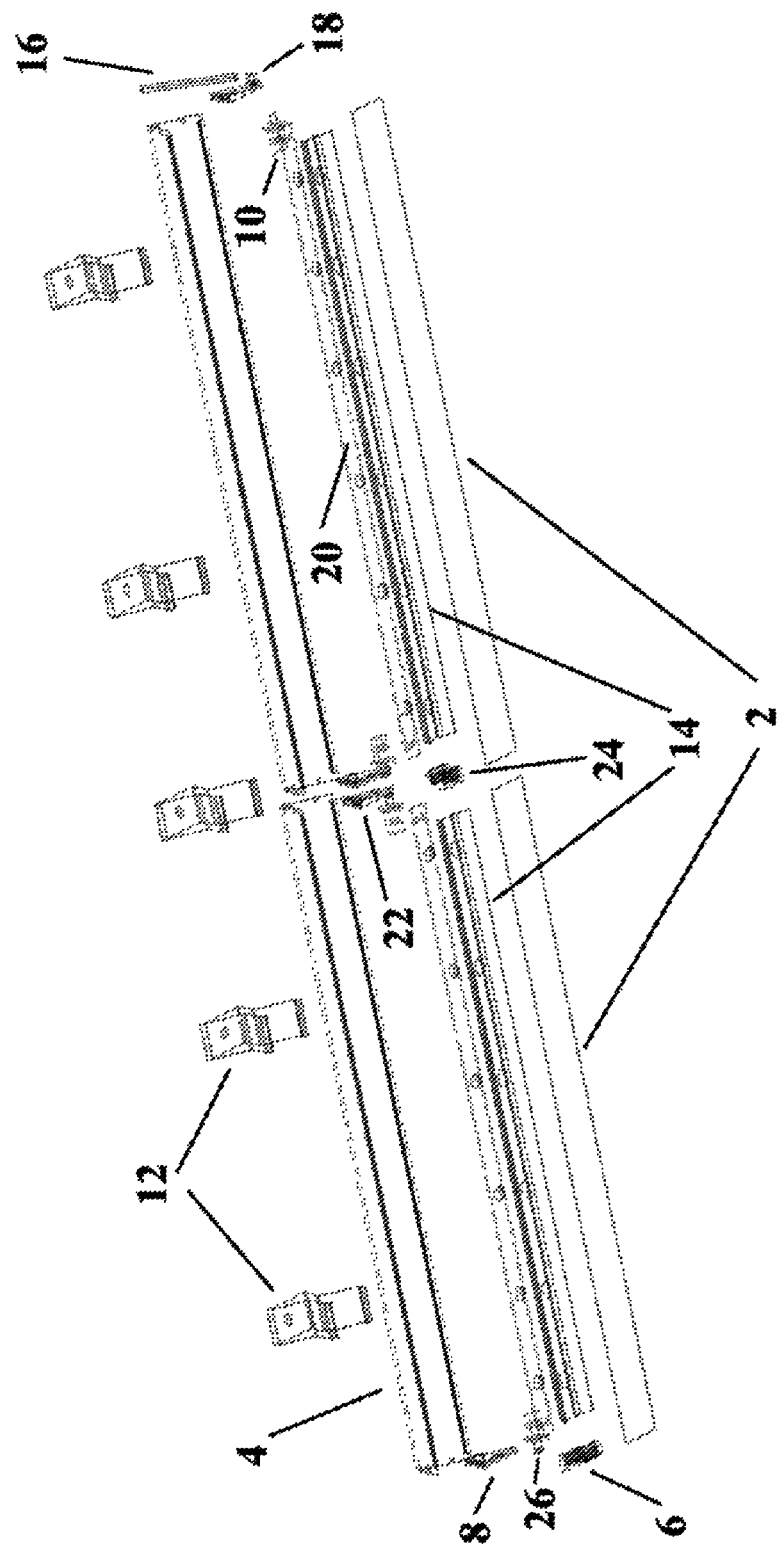
FIG. 1. Light fixture parts assembly.

FIG. 1 shows selected components of one embodiment of a preferred LED lighting fixture, referred to here as a "type B" fixture to distinguish it from other fixture types discussed further below. Such a fixture may include: a light diffuser 2, a back cover 4, a type B connector 6, a type B end cover 8, a rotate block A 10, one or more type A support brackets 12, one or more reflectors 14, a cable conduit 16, a cable rotate block 18, one or more LED light strips 20, a type A end cover 22, a type A connector 24, and a rotate block B 26.

Figure 2:
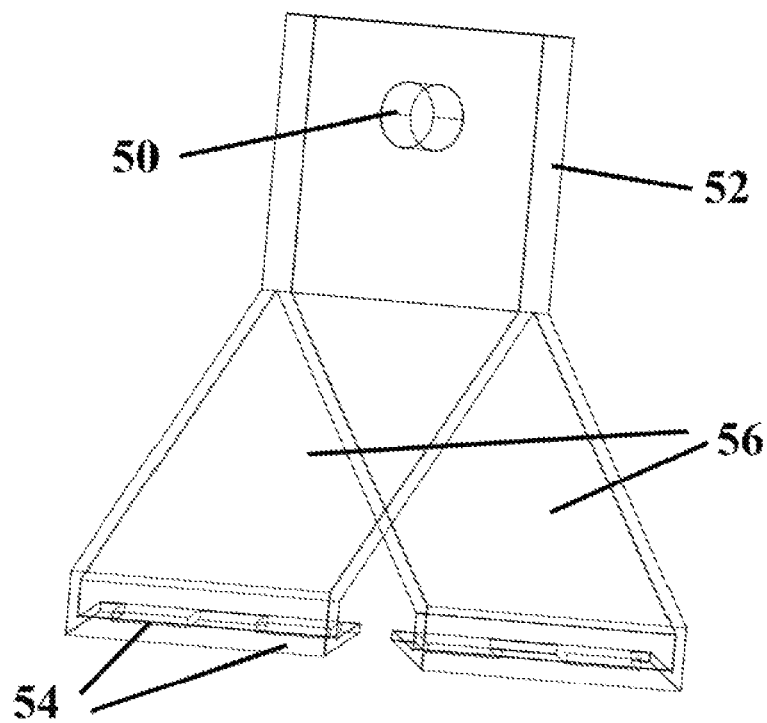
FIG. 2. Type B ceiling support bracket.

FIG. 2 shows a type B support bracket for alternate mounting of the fixture and adaptation to a choice of mounting methods. This may replace the type A bracket 12 shown in FIG. 1. This bracket supports the fixture from above through a hole 50 in chain bracket. Such a hole 50 allows the bracket to connect via either chain or other vertical architectural structure. It has a set of angle flaps 56 which connect to a back cover 4 (FIG. 1, item 4) of a fixture with a hooked edge at the ends that secures the fixture. The bracket first may be secured to a building support, and then the fixture may be snapped in place.

When two fixtures are joined together end-to-end, a bracket may be placed across the joining ends of the fixtures. A set of cut-out slots 54 preferably grips two fixture end covers and locks them in place.

Type C Corner Support Bracket

Figure 3:
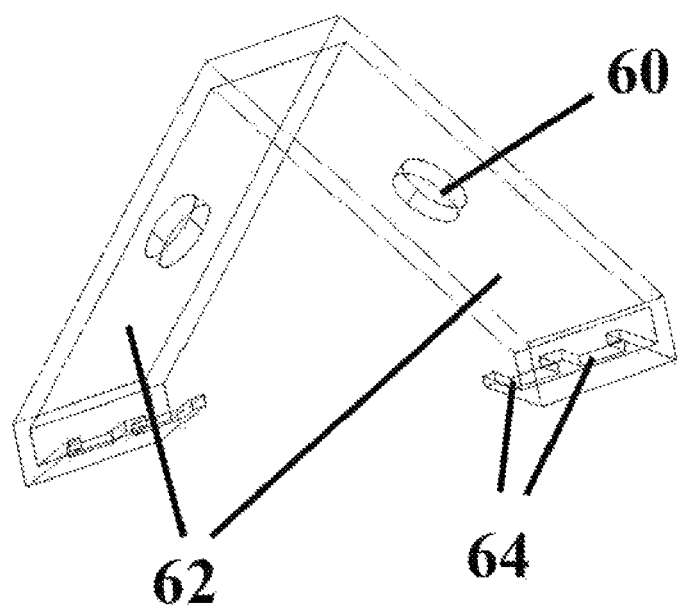
FIG. 3. Type C corner support bracket.

FIG. 3 shows a type C support bracket, which may be used for corner fixture mounting. This may replace the type A bracket 12 shown in FIG. 1. Two flaps 62 are similar to type B bracket flaps 56 except for holes 60. These holes 60 may be used for screw mounting to a corner lighting location. Slots 64 may be used similarly to the two cut-out slots 54 in FIG. 2 to join adjacent fixtures.

An outer surface of the bracket flaps 62 can also serve as a surface for a double sided tape or Velcro piece to secure the bracket to any surfaces. This would make mounting flexible for many surfaces.

Type A Flat Surface Support Bracket

Figure 4:
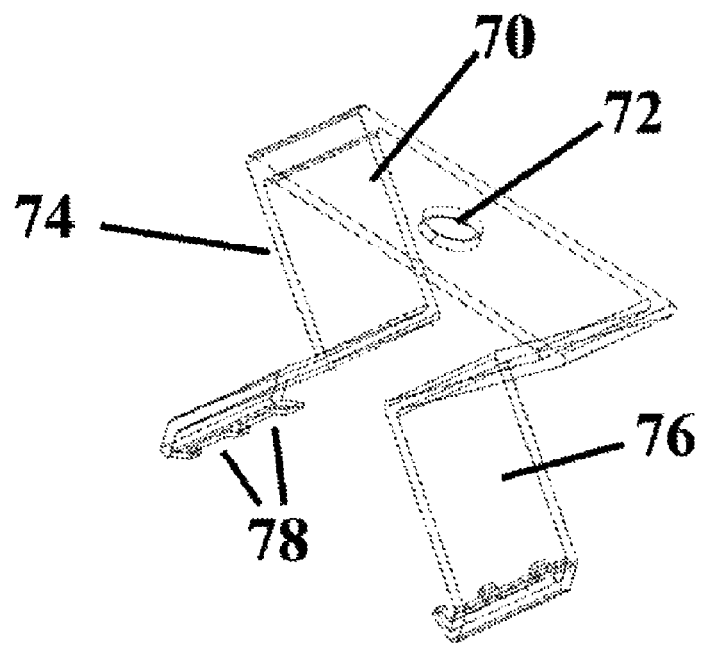
FIG. 4. Type A flat surface support bracket.

FIG. 4 shows a type A support bracket, which may be used for mounting to a ceiling or other surface. This type of support bracket is also shown in FIG. 1. A hole 72 can be used to screw the fixture to any flat surface. A bracket surface 70 alternately may serve as a surface for a double-sided tape or Velcro piece to secure the bracket to many surfaces. This would make mounting flexible for many surfaces.

Flaps 76 may be similar to flaps 56 of the type B bracket shown in FIG. 2, except that that they may flare outwardly 74, to accommodate the surface 70. The lengths of the flaps 74, 76 may be varied to provide a desired height to the fixture. This bracket allows the fixture to be mounted within another fixture, such as within an existing fluorescent tube fixture where the tube may be absent.

Fixture Back Cover

Figure 5:
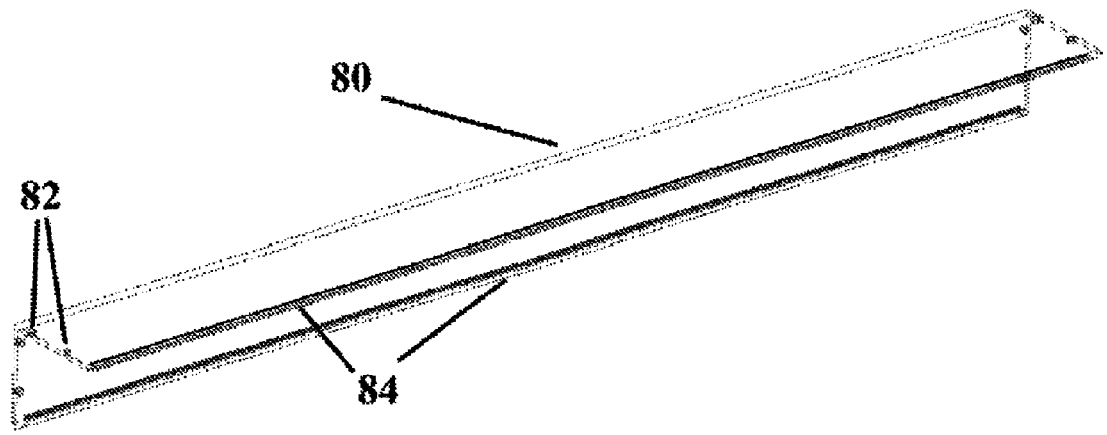
FIG. 5. Fixture back cover.
Figure 6:
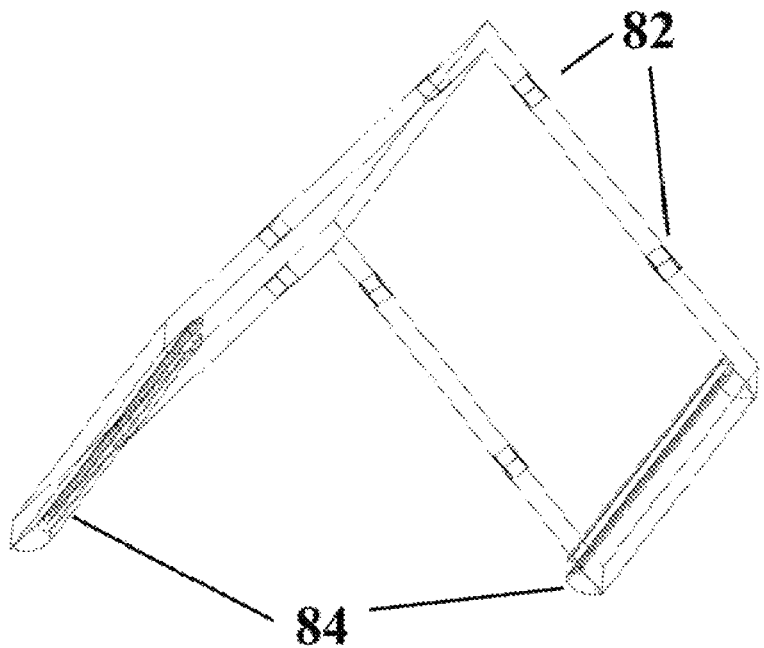
FIG. 6. Detail features of a fixture back cover.

FIG. 5 shows a preferred back cover (FIG. 1, item 4) as an angled piece 80 with two, generally-flat surfaces and a protruded lip on the long edges 84. There may be two holes 82 on each short edge to secure triangular end cover pieces (FIG. 1, items 8, 22) with screws. Details of lips 84 are shown in FIG. 6. These lips may be used to secure a light diffuser 2 to a back cover 4. A track allows a flat diffuser 2 to slide in from the ends.

Light Diffuser

Figure 7:
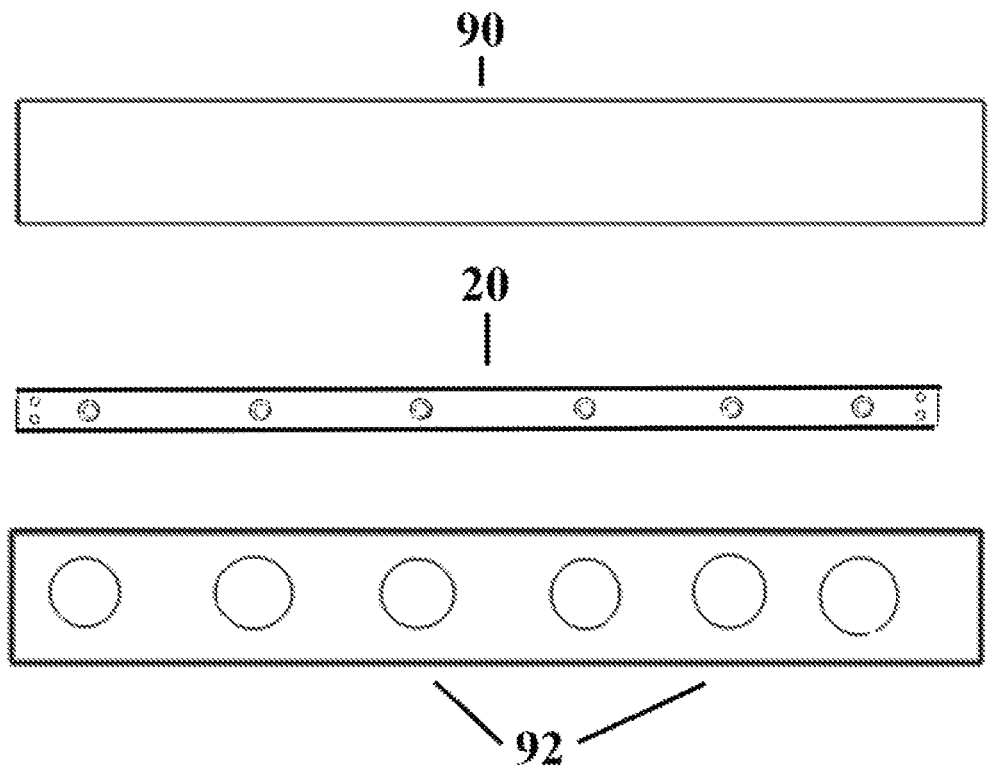
FIG. 7. Light diffuser unit.

FIG. 7 shows an exemplary light diffuser (FIG. 1, item 2) having a flat form. A diffuser may be made of transparent material 90 which has patterns to diffuse any spot appearance of LED lights. It preferably would be a light weight plastic, glass, or other material. The diffuser preferably lets light through efficiently but in a diffused manner. Diffusers such as those used in fluorescent light fixtures may be a patterned plastic material, though they might not be the most efficient. A preferred, more efficient light diffuser would be a Fresnel diffuser. These diffusers may have transmission efficiencies greater than ninety-eight percent. The entire diffuser piece can be made of this Fresnel type. An example is a clear acrylic material with a DIFF_RDN_20_R/20_FWHM random diffuser finish on one side from Fresnel Technologies, Inc. Wide diffusion angles of twenty degrees or more are preferred if the spotty look is to be minimized. Alternately, a diffuser can have localized Fresnel pattern areas, such as circular patches 92 where the Fresnel random diffuser is aligned in front of each LED spot on a light strip 20. Other areas beyond these patches can be either transparent or translucent. These diffusers may be fabricated from laser holography plastic cutting techniques on sheet plastic materials.

Light Reflector Unit

Figure 8:
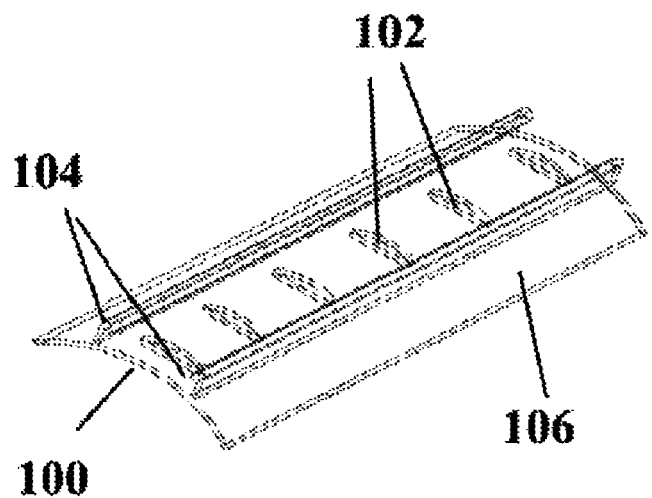
FIG. 8. Light reflector unit.

FIG. 8 shows an exemplary, curved light reflector (FIG. 1, item 14) with a body 100 and two guide rails 104. Such a reflector has holes 102 to permit access to LED light sources. Guide rails 104 have fingers to secure an LED light strip 20. Sandwiched between the LED light strip and the reflector may be a piece of thermally conductive elastomer with holes matching holes of the reflector. This elastomer piece may be electrically insulated or insulative. The reflector front preferably has a highly reflective surface 106 which may be an electroplated or plastic plated surface with a protective coating. A reflective adhesive foil would be one of many an alternate solutions. The reflector may be made of thermally conductive material. Preferably, it could be metallic or plastic material loaded with thermally conductive particles, such as barium titanate or strontium titanate.

Rotate Block A

Figure 9:
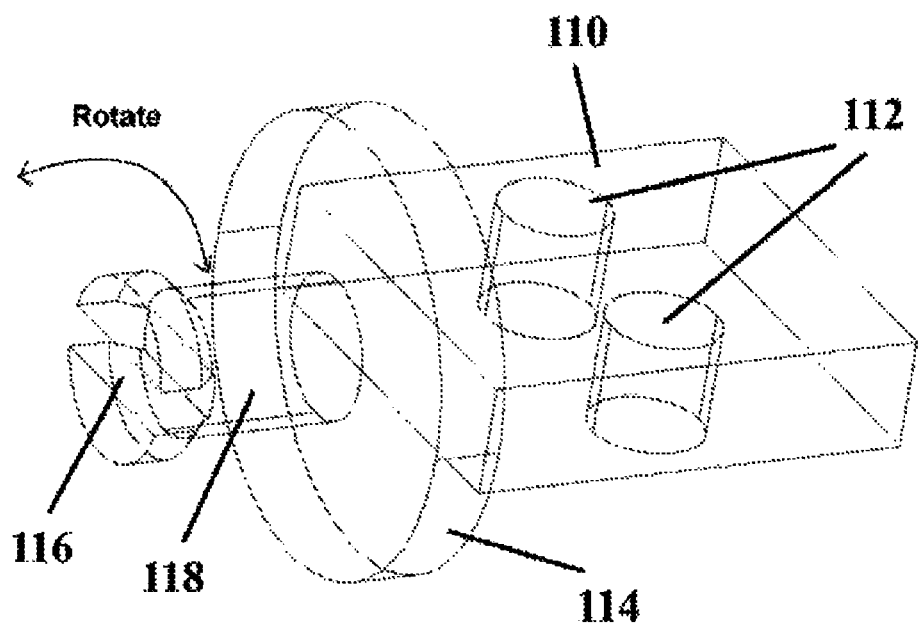
FIG. 9. Rotate block A.

FIG. 9 shows a first, A-type, rotate block (FIG. 1, 10). It may be comprised of an LED light strip mounting body section 110, a round disk section 114, a rod rotation section 118, and a rotate coupling connector 116. Two screw holes 112 in the body section 110 may be used for mounting an LED light strip (FIG. 1, item 20). Screw holes 112 may be used to rigidly secure the rotate block to an aluminum plate 206 illustrated in FIG. 20. This block enables an LED light strip to rotate, either manually by a screw driver at the end or by an electrically controlled by a coupling stage.

Rotate Block B

Figure 10:
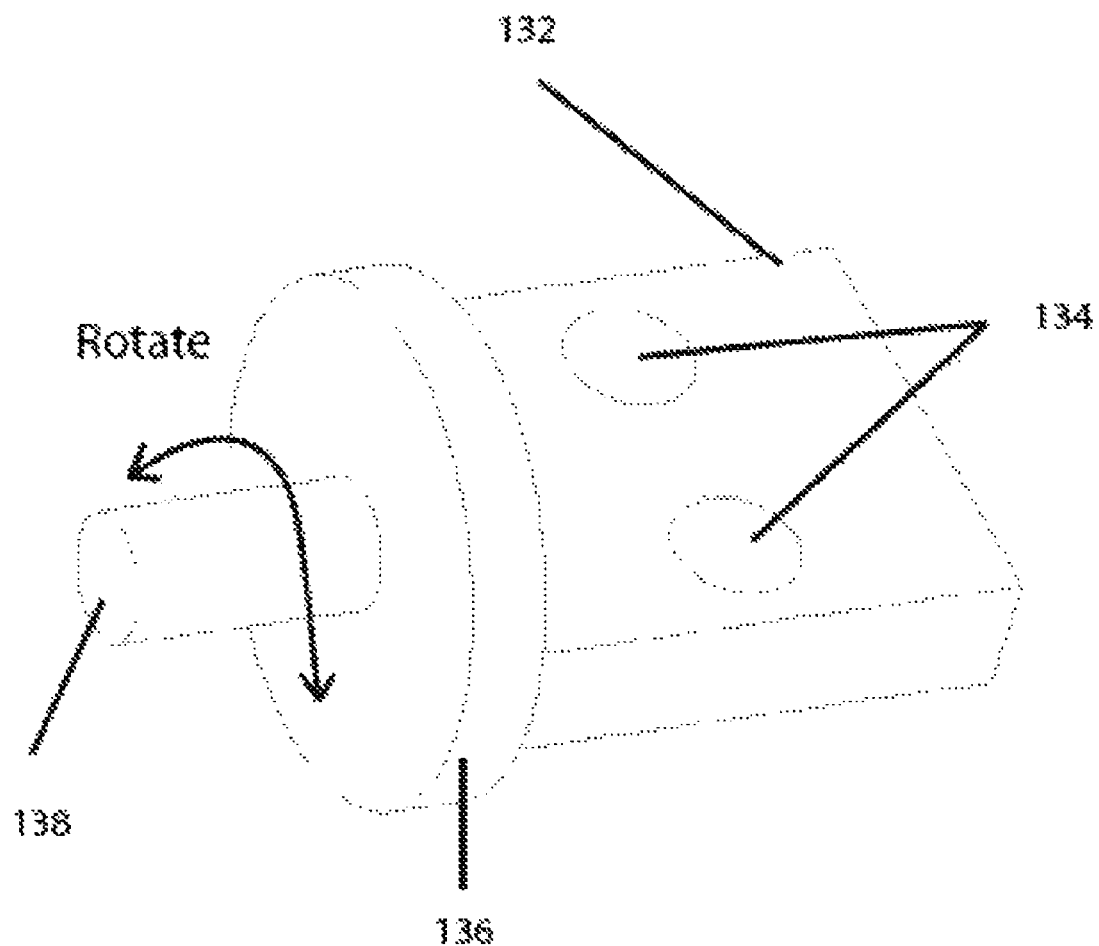
FIG. 10. Rotate block B.

FIG. 10 shows a B-type, rotate block (FIG. 1 item 26). It may be similar to an A-type rotate block, except for the absence of a rotate coupling connector 116.

Figure 11:
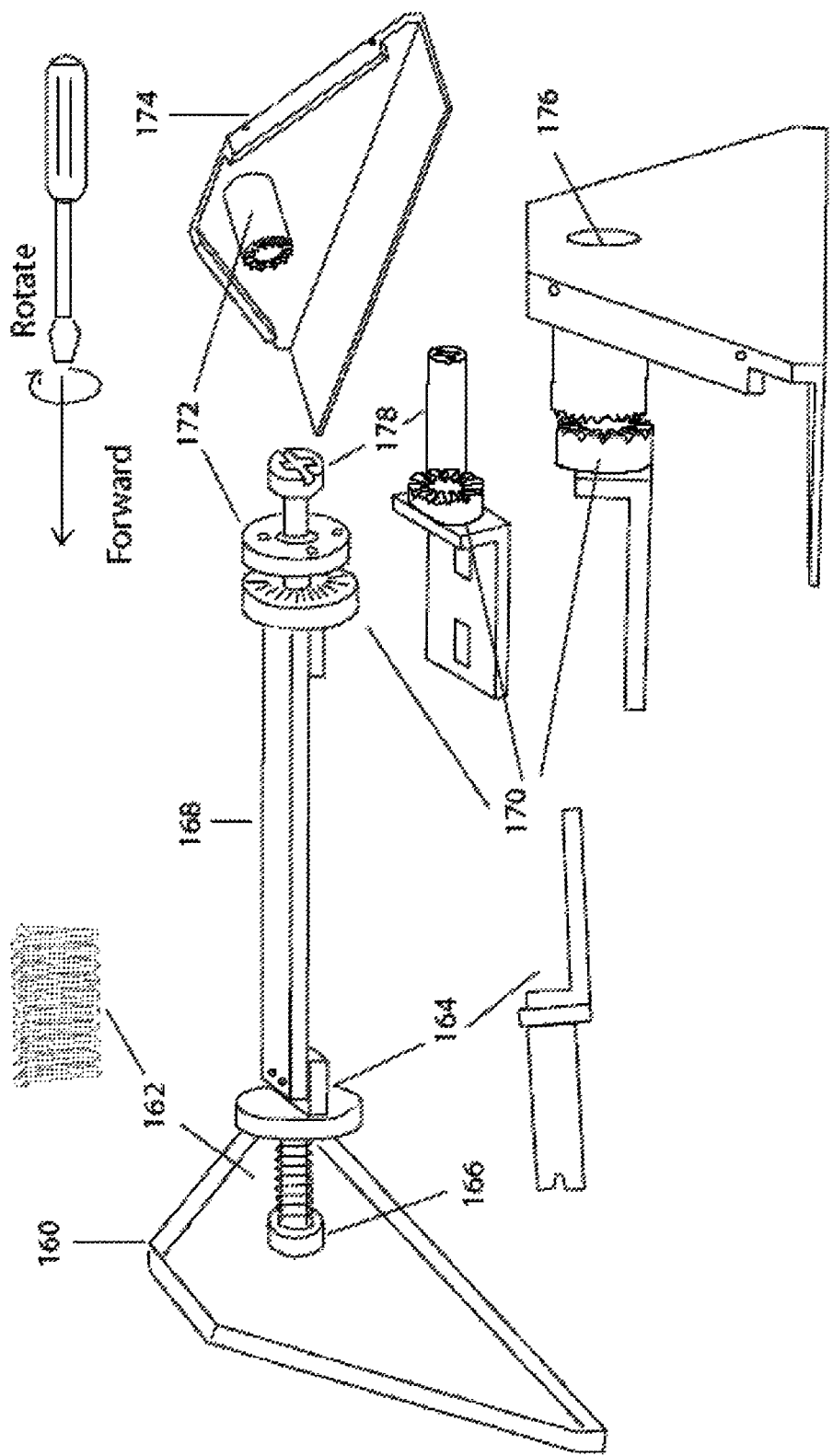
FIG. 11. LED light/reflector rotation system.

FIG. 11 shows a detailed view of elements used in adjusting an angle of a light fixture. An end cover 160 has a hole 166 for receiving a rod 138 from rotate block B 164. A spring 162 may be placed over the rod 138 to press against a disc of rotate block B (FIG. 10, item 136). An LED light/reflector assembly 168 may attach to rotate block B by screws through holes in rotate blocks A and B (FIG. 9, item 112 and/or FIG. 10, item 134). The spring tension at the disc 136 also pushes against a disc of block A (FIG. 9, item 114). The disc 114 also presses against a geared/rough surface ring 172 in end cover 174. The disc 114 is in engaged mode and holds an angle for the reflector assembly. By fitting a screw driver through hole 176 into a slot 178 and pushing against the spring compression, the disc disengages from the fixed ring 172. Turning the screw driver then freely rotates the reflector assembly 168. A user may see the light corresponding to the adjusted angle in real-time. Once a desired angle is achieved, the user can withdraw the screw driver, and the disc 114 will once again press against ring 172 and hold the fixture engaged in the set angle. The spring maintains a pressure to hold the disc engaged with the ring 172.

Type A End Cover

Figure 12:
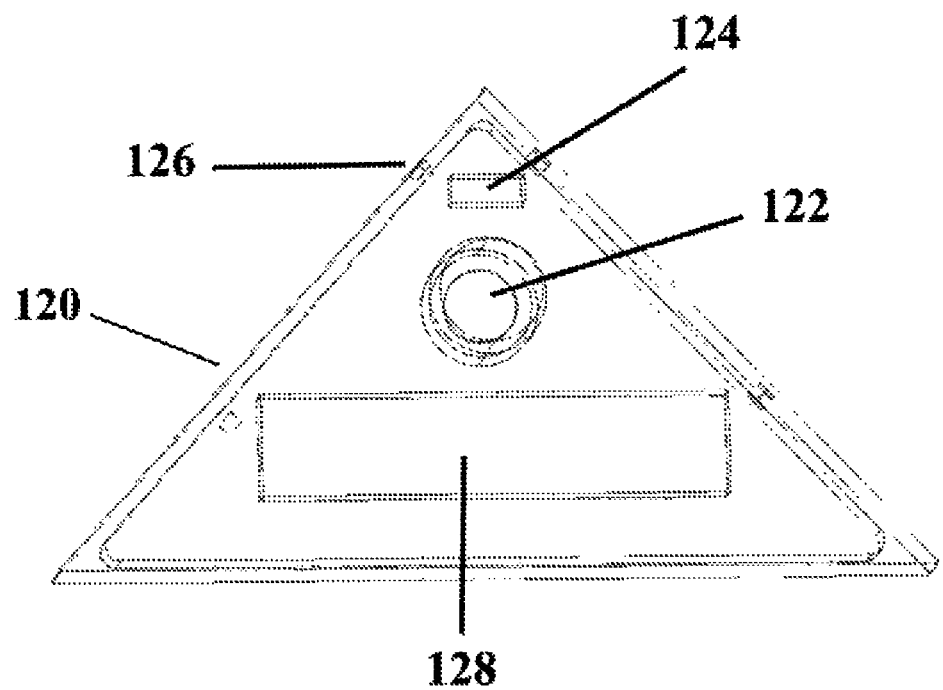
FIG. 12. Type A end cover.

FIG. 12 shows an exemplary, Type A, end cover (FIG. 1, item 22). This cover may be a triangular-shaped end body piece 120 with three openings. This cover may be secured within the inside back cover of a light fixture (FIG. 1, item 4) via screw holes 126 on two sides of the cover. The back cover (FIG. 1, item 4) preferably retains a smooth surface. A circular opening 122 allows the rotate coupling connector (FIG. 9, item 116) of Rotate Block A (FIG. 1, item 10) to fit through. A rectangular opening 128 may allow access for an electrical connector (e.g., FIG. 1, items 6, 24) to the next fixture module. A rectangle opening 124 may be included as a venting hole.

Figure 13:
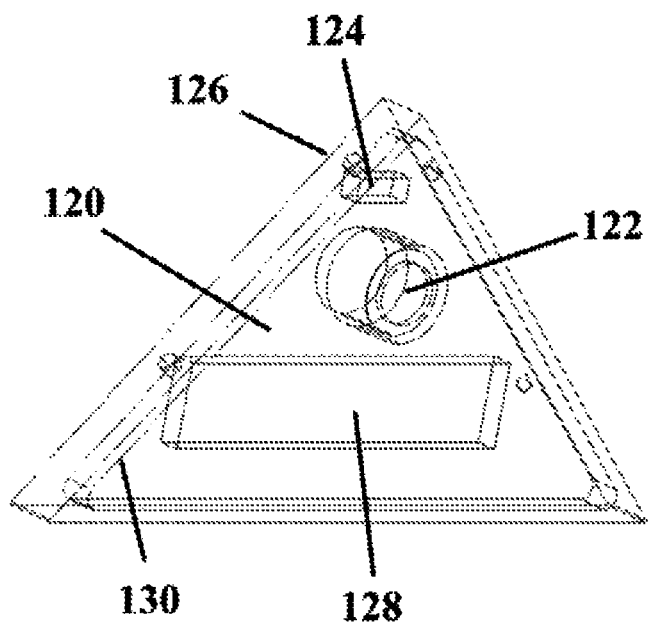
FIG. 13. Type A end cover details.

FIG. 13 shows an alternate view of Type A end cover 22. The rotate block A 10 preferably fits through a circular hole 122 and stays within the front surface of the cover 22 having a lip 130 around its edge.

Type B End Cover

Figure 14:
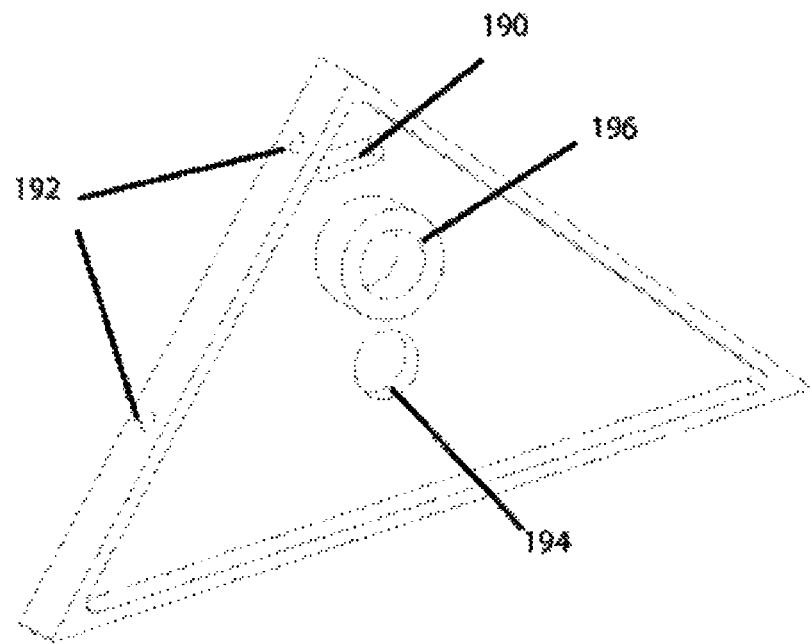
FIG. 14. Type B end cover.

FIG. 14 shows an alternate, type B, end cover (FIG. 1, item 8). This cover has a concealed circular ring 194, which may be a support for a rod rotation section (FIG. 10, item 138) in rotate block B and holds in place a curved reflector (FIG. 1, item 14) in a user-adjusted angle of rotation. A circular opening 196 allows cable rotate block (FIG. 1, item 18) to fit through from an outer surface. Similar to the Type A end cover, there may be screw holes 192 on two sides of the cover. A smaller rectangular opening 190 may be provided as a vent hole.

Figure 15:
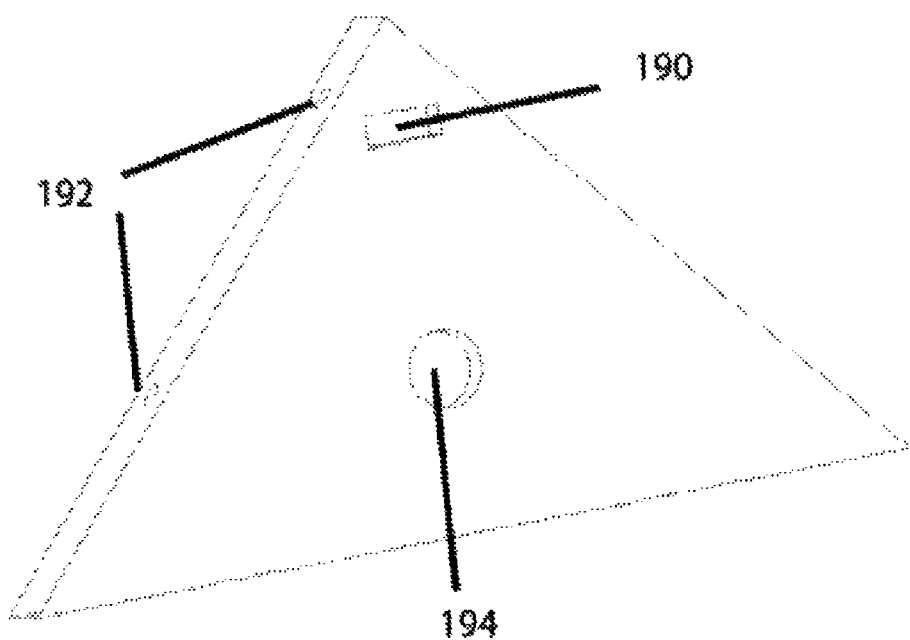
FIG. 15. Type B end cover details.

FIG. 15 shows an alternate view of Type B end cover (FIG. 1, item 8). A circular ring 194 in FIG. 14 may be concealed from this outer view of the cover. If a hole through the circular ring 194 is opened, a rotation rod adapted to be turned with a screw driver may slide to a corresponding hole in the next module and engage with the rotation rod in the adjacent module to rotate the other module's reflector assembly.

Cable Rotate Block

Figure 16:
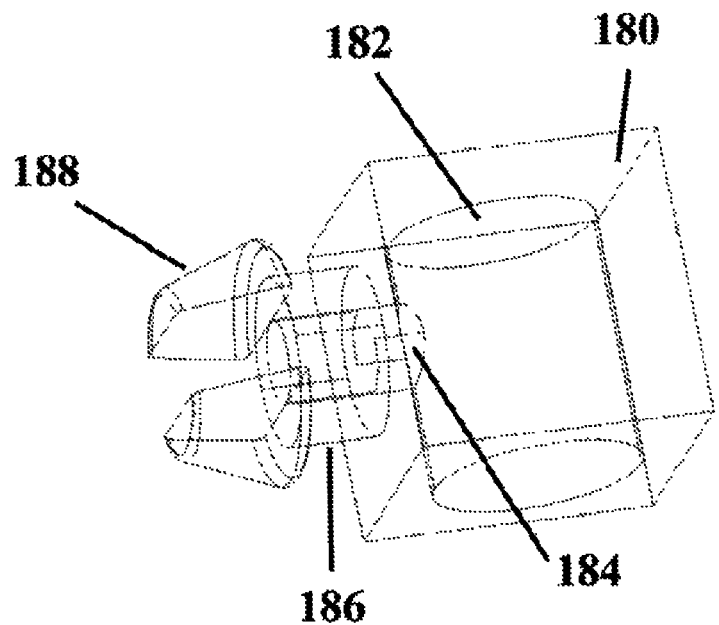
FIG. 16. Cable rotate block side view
FIG. 17. Cable rotate block front view.

FIG. 16 shows an exemplary cable rotate block (FIG. 1, item 18). This block has a body 180 with a power cable entrance path 182 that enters the fixture through a passage 184. A rotate shaft 186 and a split coupler 188 preferably fit through a hole in a triangular end cover (e.g., FIG. 12, item 122).

Figure 17:
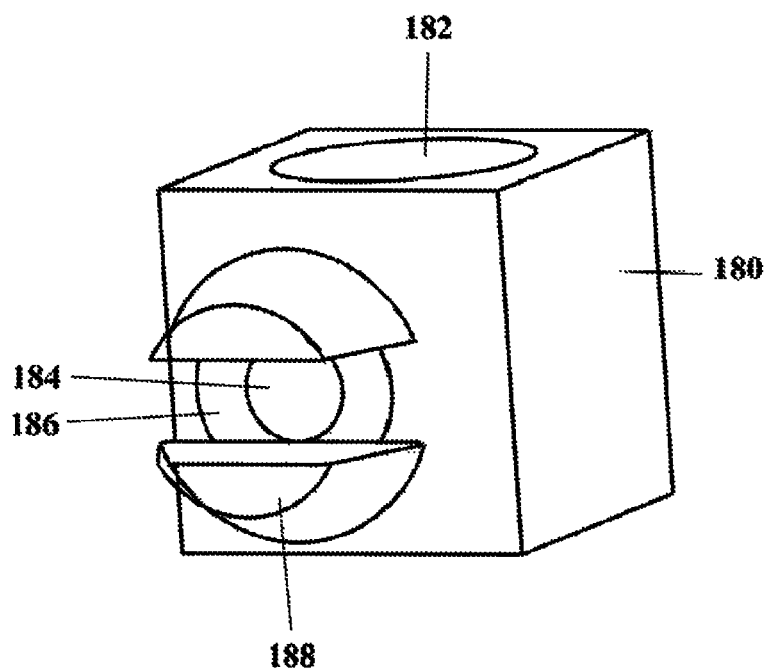

FIG. 17 shows an alternate view of the cable rotate block of FIG. 16. A cable enters from a cable conduit (FIG. 1, 16), goes into a cavity 182, makes a right turn into hole 184, and feeds into the fixture. A split coupler 188 prevents the rotate block from slipping out of an end-cover hole (e.g., FIG. 15, item 194). The block can rotate freely with respect to an end cover.

Cable Conduit

Figure 18:
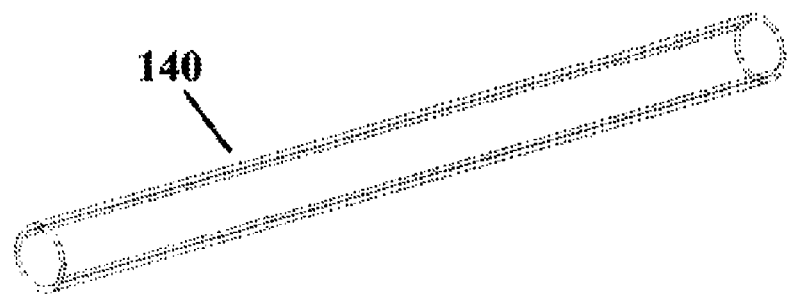
FIG. 18. Cable conduit.

FIG. 18 shows a cable conduit (FIG. 1, item 16). It may be made of a hollow rod 140, and it can be made of any appropriate length. In this manner, the cable may be shielded by the conduit. This conduit can be made of plastic or metal.

LED Light Strip

Figure 19:
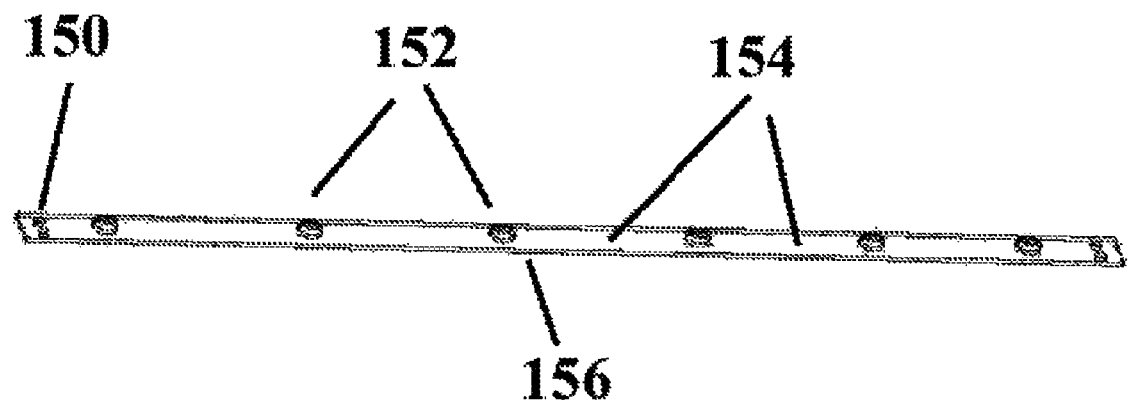
FIG. 19. LEDs light strip.

FIG. 19 shows an exemplary LED light strip (FIG. 1, item 20). Circular dots 152 represent LEDs mounted preferably on a flexible circuit 154, which in turn may be mounted on aluminum bar 156. The screw holes 150 on both ends of the bar allows rotate block A (FIG. 1, item 10) and rotate block B (FIG. 1, item 26) be mounted.

Figure 20:
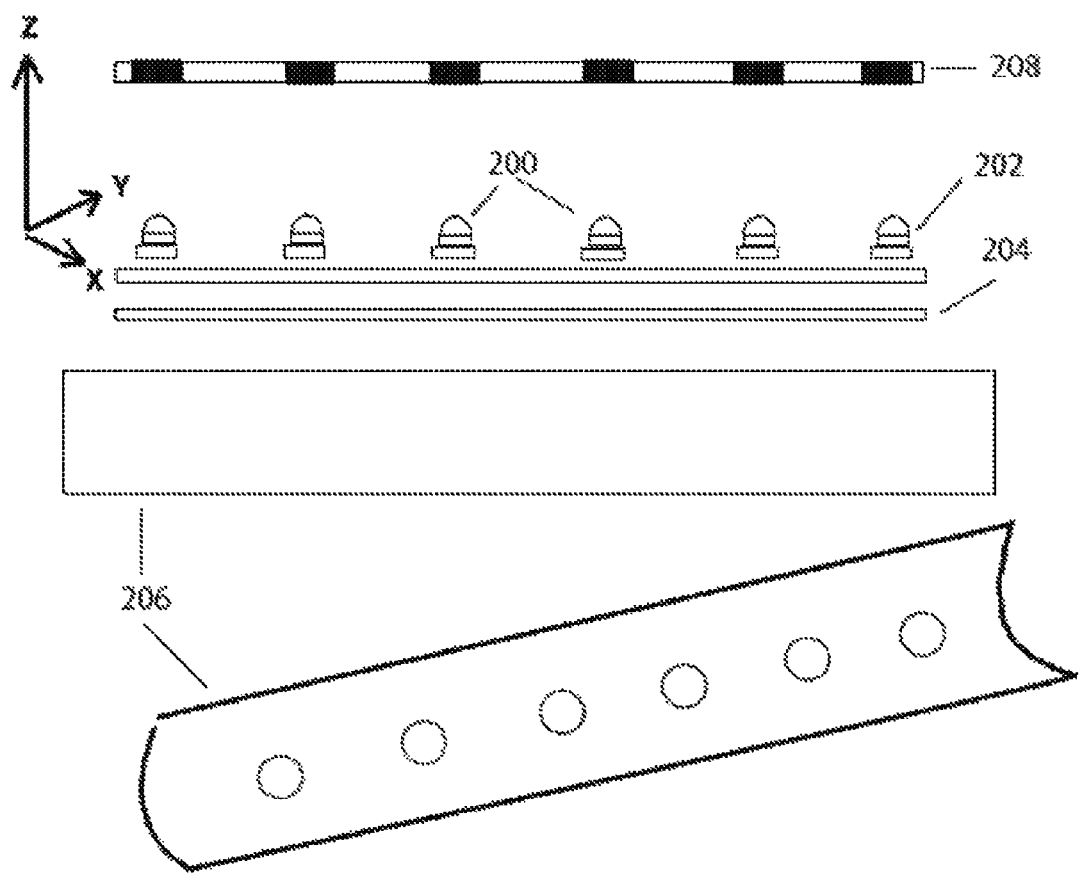
FIG. 20. LEDs light strip circuit assembly.

FIG. 20 shows an exemplary assembly of an LED light strip with reflector and heat sink. LEDs 200 may be soldered or otherwise attached onto a copper flex circuit 202. The flex circuit substrate may be about 25 to 75 microns thick, which would allow heat to transfer easily in the Z direction orthogonal to the flexible circuit surface. The substrate material may be an insulator made preferably of one of the following materials, though other materials may be used:

a) Kapton™ (Polyimide film)
b) PEN (Polyethylene Naphthlate film such as Teonex, Teijin, Dupont)
c) PET (Polyethylene Terephthalate film from Dupont)

The flex circuit conductive traces may be two ounce copper, about 2.8 mils thick, for both low resistance and good thermal conductivity. Control signal traces may be low current circuits. Additive printed thick film technology (PTF), such as silver ink, can be used. Conductive traces may be routed with design rule to retain most of the conductive copper. An LED heat sink may be mounted on the copper pads with solder or heat sink compound to promote heat dissipation. The flexible circuit 202 may be attached to the aluminum block or plate 206 via a high temperature, double sided adhesive tape 204. An aluminum heat sink plate may be formed into a one-dimensional parabolic shape and electroplated with a highly reflective coating to be used as the LED light reflector simultaneously. An example of an adhesive tape is the 3M #467MP tape. This tape has a thickness of approximately 50 microns and allows both surfaces come into good contact for good thermal transfer. A high temperature, thermally conductive, electrically insulative, silicone gasket 208 with holes for LED components to pass through may be used between the reflector 14 and the LED Flexible circuit 202.

Figure 21:
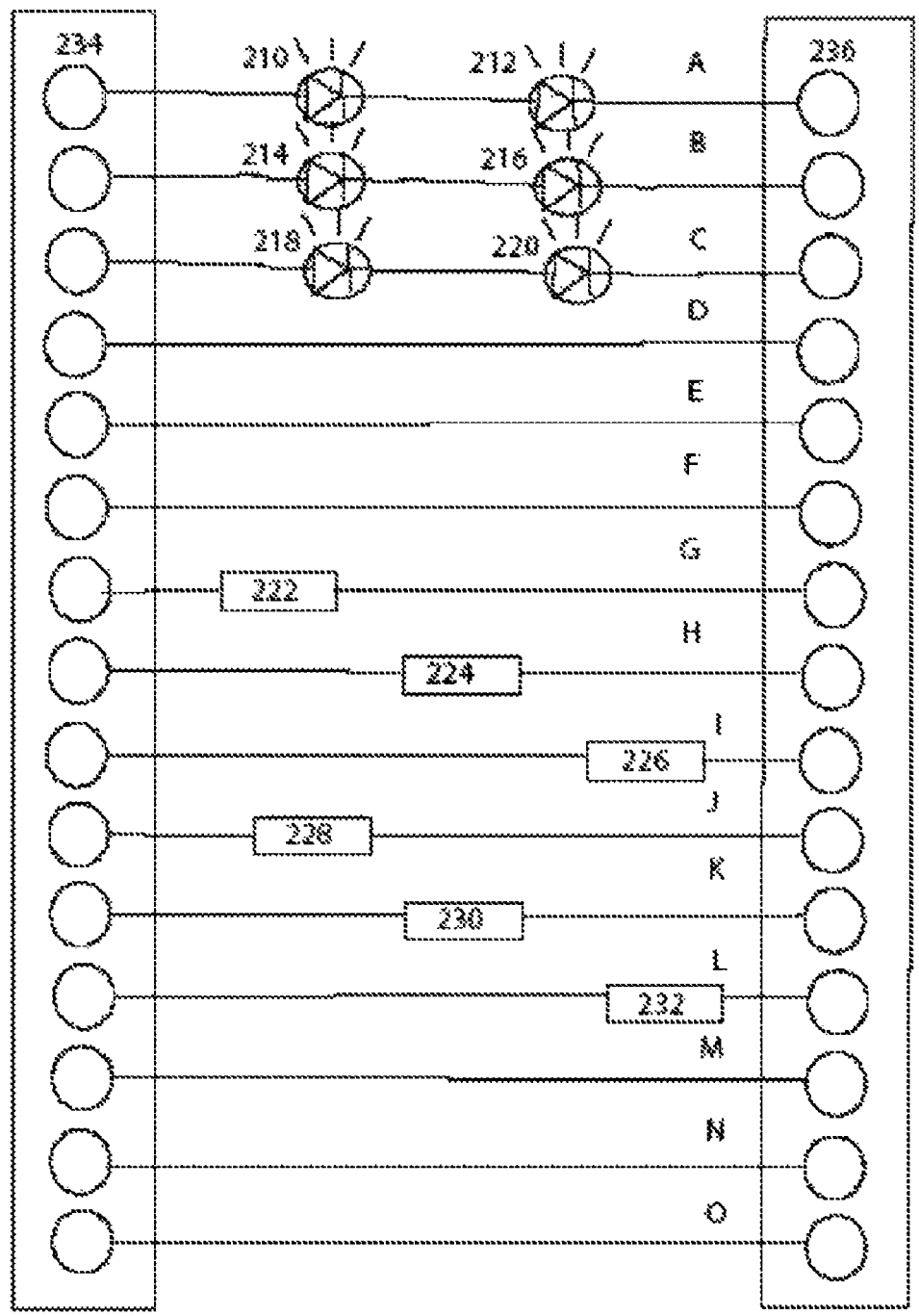
FIG. 21. LEDs strip circuit diagram with PTC components.

FIG. 21 shows an exemplary circuit diagram for a six-LEDs strip formed in three chains A, B, C. Paths A, B, C, D, E and F may be considered high current LED power circuits. D, E, and F may be used for LED current return. Two LEDs 210, 212 may be on Chain A, two LEDs 214, 216 may be on Chain B, and two LEDs 218, 220 may be on Chain C. This method may be applicable for other numbers of LEDs in each chain. Each chain preferably has an equal number of LEDs. Three paths D, E, F may be pass-through circuits without components.

Additional paths G, H, I, J, K, L, M, N and O may be part of the LED power regulation circuits. They may be low current circuits. One Positive Temperature Coefficient thermal conductive trace (PTC) may be in each of three circuits G, H and I. One PTC 222 may be in a first circuit G, one PTC 224 may be in a second circuit H, and one PTC 226 may be in a third circuit I. Each thermal conductive trace may be physically located in the proximity of one of the LEDs in each chain, such as the first LEDs 210, 214, 218 in each chain. Since the second LED in the same chain may be driven by the same current, it may be assumed to have a similar thermal dissipation characteristics and therefore similar temperature response. In this manner, a single PTC may be used for each circuit, which lowers the component count when compared to monitoring every LED.

There may be one resistance trace 228, 230 and 232 in each of the circuits, J, K and L respectively. These PTC thermal conductive traces and resistance traces may be used to control a current through the LED chains, A, B and C via a circuit shown in FIG. 23. This prevents the overheating of the LEDs and prolongs its working life. This LED temperature regulation method is discussed in further detail in following sections.

Three circuits M, N and O may be without components and may be used to bring electrical connections between pins of the right connector 236 and pins of the left connector 234.

Figure 22:
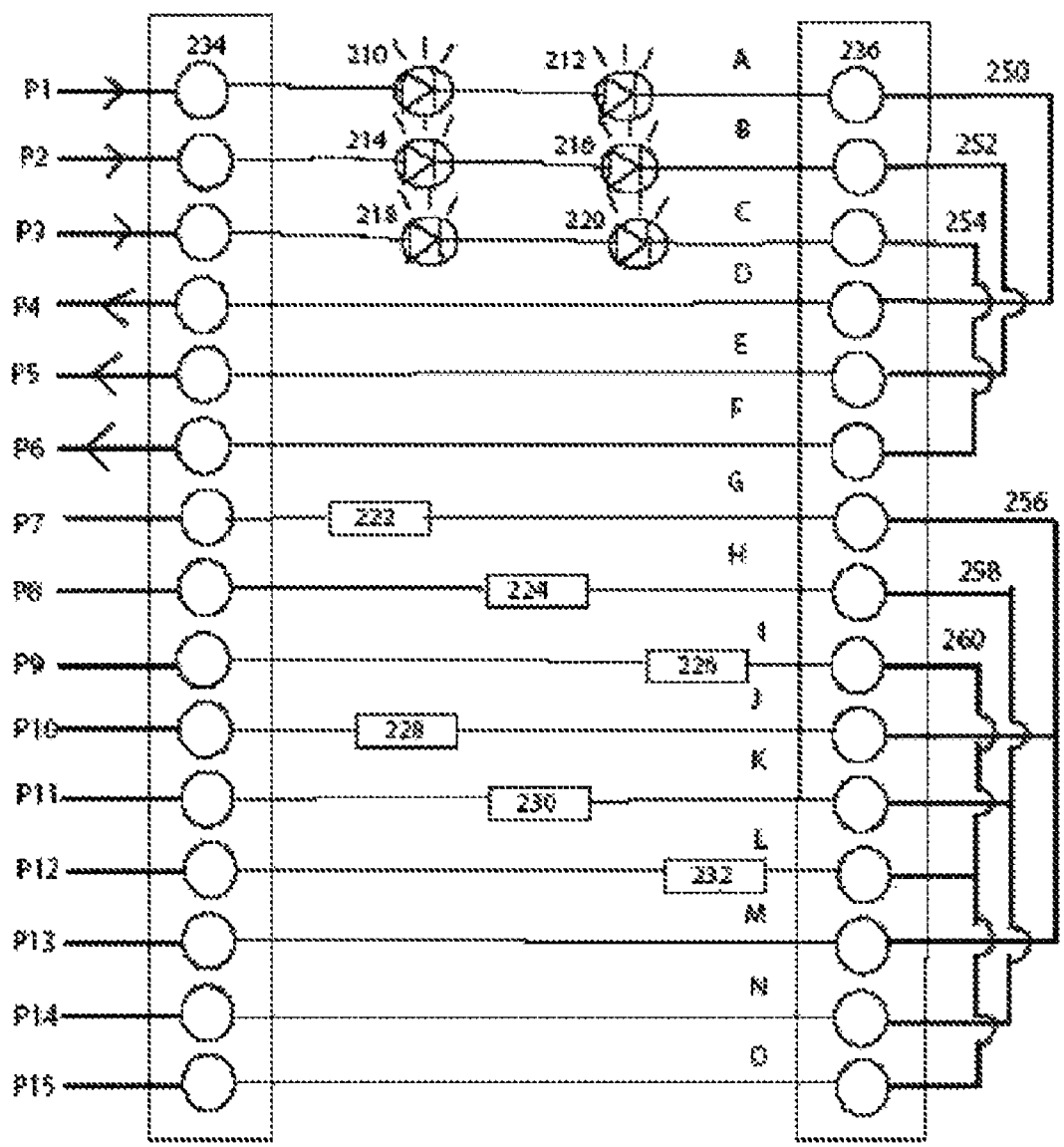
FIG. 22. LEDs strip circuit diagram with shorting end jumpers.

FIG. 22 shows an exemplary powering scheme for a six-LED fixture with a fifteen pin input connector 234 and a fifteen pin output connector 236. The output connector shown has jumpers 250, 252, 254 for connecting each of three LED chains A, B, C to each of three return paths D, E, F respectively. Three other jumpers 256, 258 and 260 each connects two PTC circuits G, H, I, J, K, L to one return path (G and J to M; H and K to N; and I and L to O respectively).

Input pins P1, P2, P3 each preferably supplies current to one of the LED chains A, B and C respectively and hence through jumpers 250, 252, 254 to three other pins P4, P5, P6. The input connector and the output connector are preferably of opposite gender. This choice allows the input connector of a second fixture be connected to a first fixture output connector without an intermediate piece.

Figure 23:
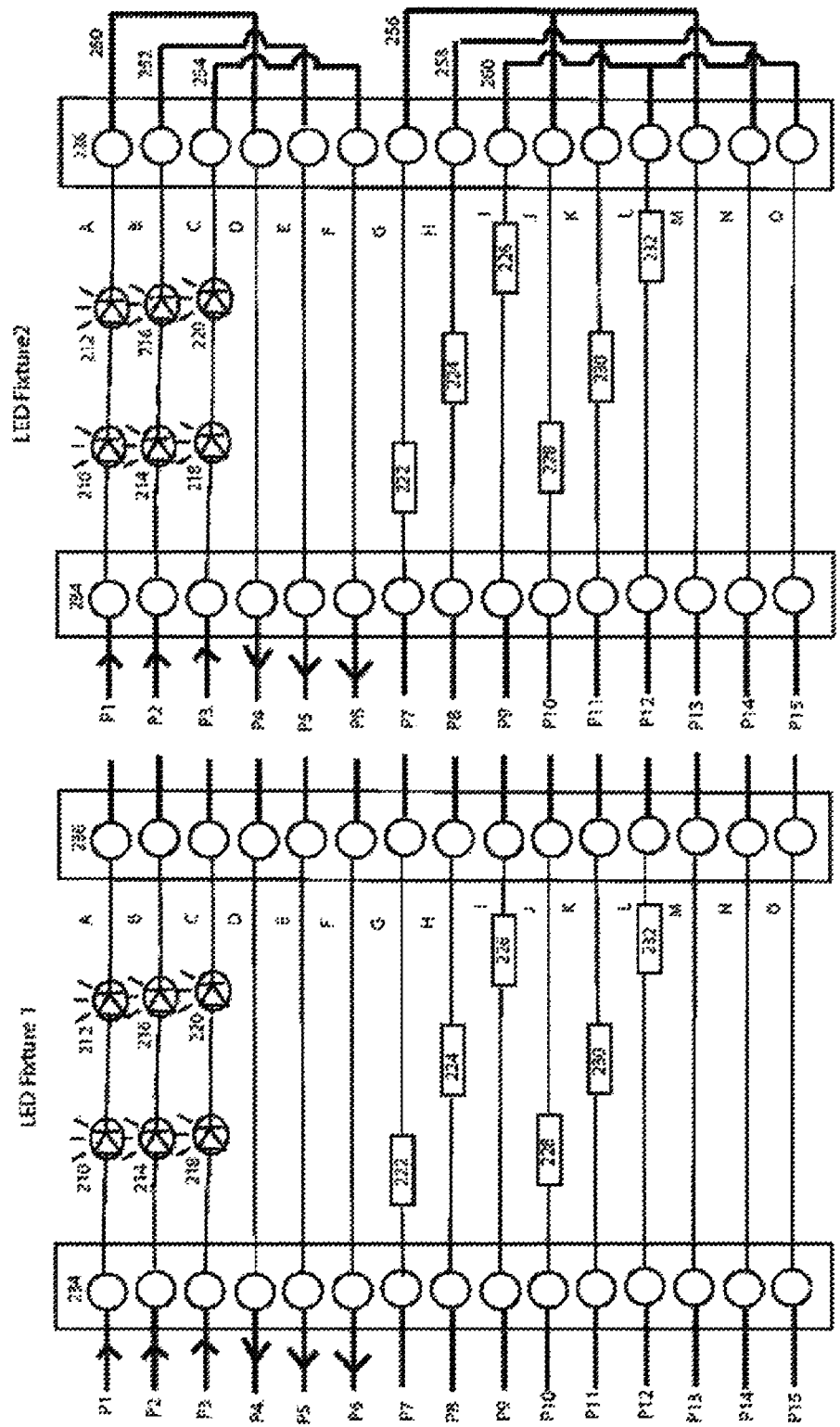
FIG. 23. Cascading of two fixture modules with end jumpers.

FIG. 23 shows an example of such a two-fixture connection scheme. Jumpers 250, 252, 254, 256, 258 and 260 may be used at the output connector 236 for the second fixture. In this example, there would be twelve LEDs, six thermistors and six resistors in total. The power supply connection at the first input connector 234 would remain the same as for the circuit of FIG. 22. This connection scheme can be extended to cascade multiple fixtures in series. Six jumpers 250, 252, 254, 256, 258 and 260 may be used at the output connector 236 for the last fixture.

This circuit design and connection scheme allows fixtures to be modular. A long fixture can be composed of multiple shorter fixtures connected to the right hand side and terminated with a consistent jumper design.

Multi-Chain LED PLM Driver

Figure 24:
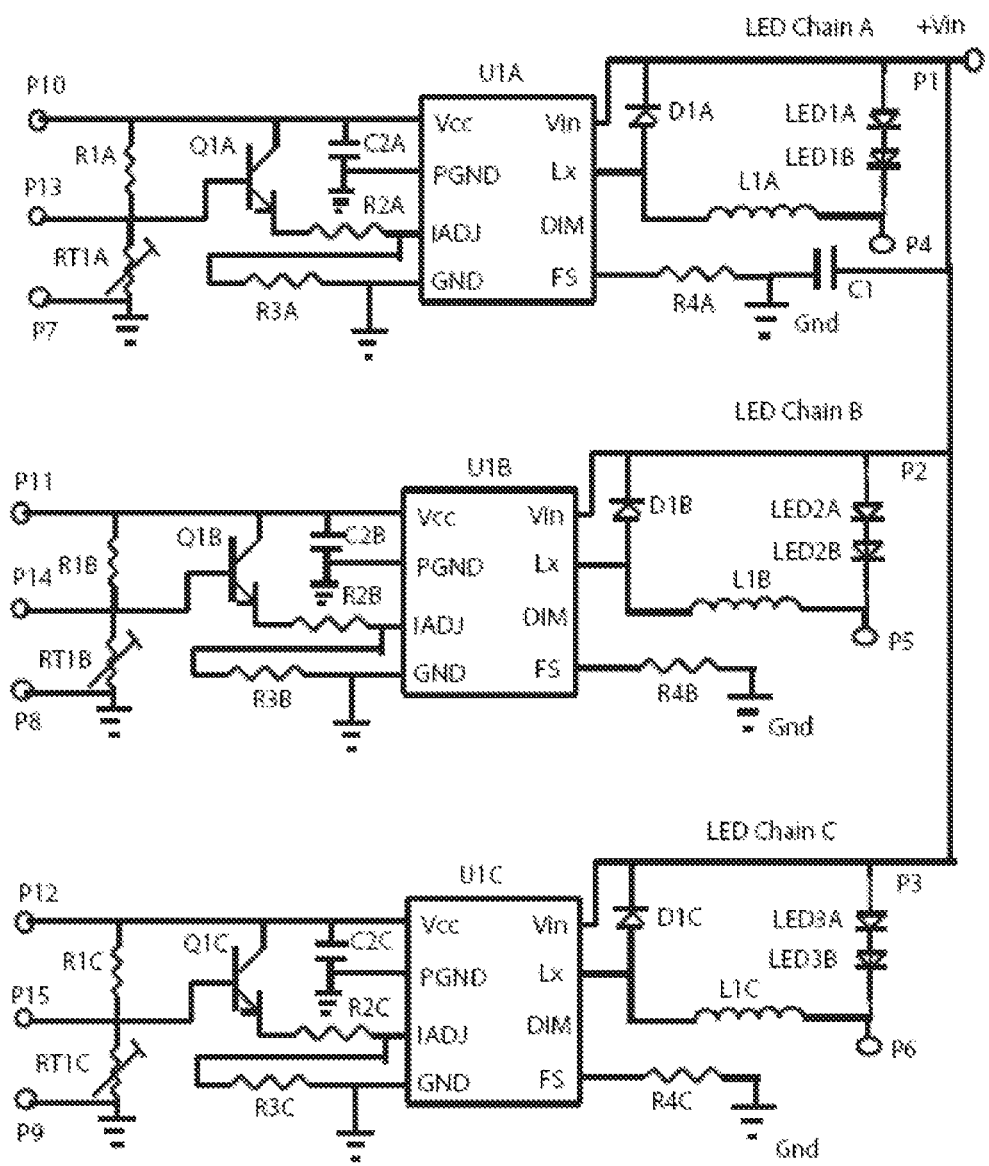
FIG. 24. Triple LEDs chain driver circuit.

FIG. 24 shows an exemplary LED driver circuit for a fixture for powering three chains A, B and C separately, each by a driver chip, U1A, U1B and U1C. An exemplary chip driver is a National Semiconductor integrated circuit LM3414HV or LM3414 with Pulse Level Modulation (PLM). Each driver circuit may have three resistors R1, R2, R3, one schottky diode D1, one inductor L1, one capacitor C2, one transistor Q1, and one printed thermally responsive resistance trace T1. One resistance R1 preferably is a printed resistance trace. The suffixes A, B and C to each of these components signify an association to a corresponding one of the three driver chips U1A, U1B, and U1C. The maximum input voltage (Vin) for an LM3414HV may be 65V, and for an LM3414 it may be 42V. Thermally responsive traces T1 and printed resistance traces R1 may be discrete components instead of printed traces.

A printed thermal responsive resistance trace T1 and a printed resistance trace R1 also are shown as items 222, 224, 226 and items 228, 230, 232 respectively in FIGS. 21 and 22. The example shown in FIG. 23 may have only two fixtures, in which case a single thermal responsive trace T1A and resistance R1A (FIG. 24) may be a series of components shared across two fixtures. Such a thermal responsive trace T1B and resistance trace R1B also are shown as items 224 and 230 in FIGS. 21 and 22. A thermal responsive trace T1C and resistance trace R1C also are shown as items 226 and 232 in FIGS. 21 and 22. Where multiple fixtures may be used, multiple sets of these components may be repeated in each of the fixtures as shown in FIG. 23.

In FIG. 24, five circuit elements R1, R2, R3, T1 and Q1 (on the left hand side of integrated circuits U1A, U1B U1C) form a current control to an LED chain (on the right hand side of integrated circuits U1A, U1B, U1C). Resistances R1 and thermal responsive traces T1 form voltage dividers across a constant reference voltage Vcc. When a PTC thermal responsive trace T1 increases in its resistance value due to rise in temperature, a voltage increases across a base-emitter of transistors Q1A, Q1B, Q1C. This results in increasing the emitter current flowing into $I_{ADJ}$ input pin of U1 and thereby decreases the LED current. A reduction of the LED current will reduce the dissipation of heat. The choice of values for thermal responsive traces and resistances T1, R1, R2 and R3 determines an operating temperature of the LED strip light. Capacitors C2A, C2B C2C may be bypass capacitors to ground and chosen for at least 1 uF capable of withstanding 6V or more.

LEDs 210 and 212 in FIGS. 21, 22 and 23 are shown as LED1A and LED1B in FIG. 24 respectively. LEDs 214 and 216 in FIGS. 21, 22 and 23 are shown as LED2A and LED2B in FIG. 24 respectively. LEDs 218, and 220 in FIGS. 21, 22 and 23 are shown as LED3A and LED3B in FIG. 24 respectively.

A driver circuit regulates a current supplied to the LED chain and draws its power from a constant voltage source shown as +Vin and ground. A resistor R4 sets a PWM frequency. An inductor L1 reduces ripple across the LED chain. When three LED chains A, B and C are powered separately, an LED failure in one would not cause a failure in the other two chains.

In the absence of resistances R1, R2, RT1 and transistors Q1, LED current may be determined by equation (1)

$$I_{LED} = 3.125 \times 10^3 / R_3 \text{ mA} \quad (1)$$

Where, preferably, $0.35 <= I_{LED}\text{max} < 1.0$ amps, and 3125 ohms $> R_3 >= 8929$ ohms Incorporating elements R1, R2, RT1 and Q1, the LED current $I_{LED}$ may be modified to equation (2)

$$I_{LED} = [((3.125 \times 10^3 / R_3) - I_{EXT}) \times 2490 \times 10^3] \text{mA} \quad (2)$$

$I_{EXT}$ may be a current of about 400 uA through resistor R2, and R2 may be chosen to satisfy equation (3) after choosing R3 from equation (1).

$$I_{EXT} = (Vb - Vbe - 1.255)/R_2 < 1.255/R_3 = (\sim 400 \text{ uA}) \quad (3)$$

since Vbe~0.7V for a silicon bipolar transistor, and the $I_{ADJ}$ pin of the integrated circuits U1 may be internally biased at 1.255V.

The emitter current $I_E$, of transistors $Q_1$, may be the same as $I_{EXT}$. Transistor Q1 base current $I_B$ may be approximately: $I_{EXT}/\beta$, where $\beta$ is the current gain for transistor Q1. The base voltage Vb of transistor Q1 may be given by equation (4).

$$Vb = [(R_{T1} \times R1)/(R_{T1} + R1)] \times [(Vcc/R1) - (I_{EXT}/\beta)] \text{volts} \quad (4)$$

Since preferably Vcc=5.4V, and for a typical small signal bipolar transistor with $V_{CEO}$>Vcc and current gain $\beta$ greater than 100, the equation for the base voltage may be simplified to $$Vb = (R_{T1} \times Vcc)/(R_{T1} + R1) \quad (5)$$

Resistances $R_{T1}$ and R1 may be chosen to satisfy conditions (6)

$$Vb > (Vbe + 1.255) \text{volts and } (Vcc/[R_{T1} + R1]) >> 1.255/((\beta \times R_3)\text{uA} \quad (6)$$

$$Vb > (0.7 + 1.255) \text{volts and } (5.4/[R_n + R1]) >> 4\text{uA}$$

$$Vb = (5.4 \times R1)/[R_{T1} + R1] > 1.955 \text{ volts and } [R_{T1} + R1] << 1.35 \times 10^6 \text{ ohms}$$

$$R1/[R_{T1} + R1] > 0.362 \text{ and } [R_{T1} + R1] << 1.35 \times 10^6 \text{ ohms} \quad (7)$$

A load on Vcc preferably should be less than 2 mA, and $5.4/[R_{T1} + R1] < 2 \times 10^{-3}$.

Therefore $[R_{T1} + R1]$ may be described by equation (8)

$$1.35 \times 10^6 >> [R_{T1} + R1] > 2.7 \times 10^3 \text{ ohms} \quad (8)$$

Cascading Fixtures Deeping Voltage Divider Point, Vb Consistent.

FIG. 23 illustrated two fixtures connected in series. For examples such as this, values of $R_1$ and $R_{T1}$ used in equations (7) and (8) would be the series values of resistances $R_1$ and $R_{T1}$ from fixture 1 and 2 respectively for each of the suffixes. For example:

$$R_1(A) = R_{1A}(\text{Fixture1}) + R_{1A}(\text{Fixture2}) \text{ for the ``A'' suffix and } R_{T1}(A) = R_{T1A}(\text{Fixture1}) + R_{T1A}(\text{Fixture2})$$

$$R_1(B) = R_{1B}(\text{Fixture1}) + R_{1B}(\text{Fixture2}) \text{ for the ``B'' suffix and } R_{T1}(B) = R_{T1B}(\text{Fixture1}) + R_{T1B}(\text{Fixture2})$$

$$R_1(C) = R_{1C}(\text{Fixture1}) + R_{1C}(\text{Fixture2}) \text{ for the ``C'' suffix and } R_{T1}(C) = R_{T1C}(\text{Fixture1}) + R_{T1C}(\text{Fixture 2})$$

A design as shown in FIG. 23 allows multiple fixtures to be cascaded without changing the voltage divider point Vb. Resistance values $R_1$ and $R_{T1}$ may stay consistent for each fixture. Therefore equations (1) through (8) define a range of values for components R1, R2, R3, RT1, Q1 with suffixes A, B and C in FIG. 24.

The resistor R4 preferably determines a switching frequency fsw, 250 KHz<fsw<=1 MHz $$20 > R4 = 20 \times 10^6 / fsw > 80 \ k \ ohms \quad (9)$$

The driver circuit preferably operates in Continuous Conduction Mode operation (CCM) with LED ON time less than 400 ns. The minimum LED switched ON time preferably would satisfy $$VLED >= 400 ns \times fsw \times Vin \quad (10)$$

Resistance R4 may be selected to satisfy this condition.

An inductor L1 may be part of the Pulse Level Modulation circuit. A minimum inductance L1 may be used to maintain less than 60% of the defined average output ripple current. Inductor L1 preferably satisfies equation (11)

$$L1 >= \frac{(Vin - V_{LED}) \times V_{LED} \times 1}{1.2 \times I_{LED} \times Vin \times fsw} uH \quad (11)$$

Where $I_{LED} = I_L \text{average} = \text{Mid point of I } L_1$ during $t_{ON}$ Schottky diode D1 preferably would withstand the peak LED current and 1.6 Vin.

Single LED Driver Configuration

Figure 25:
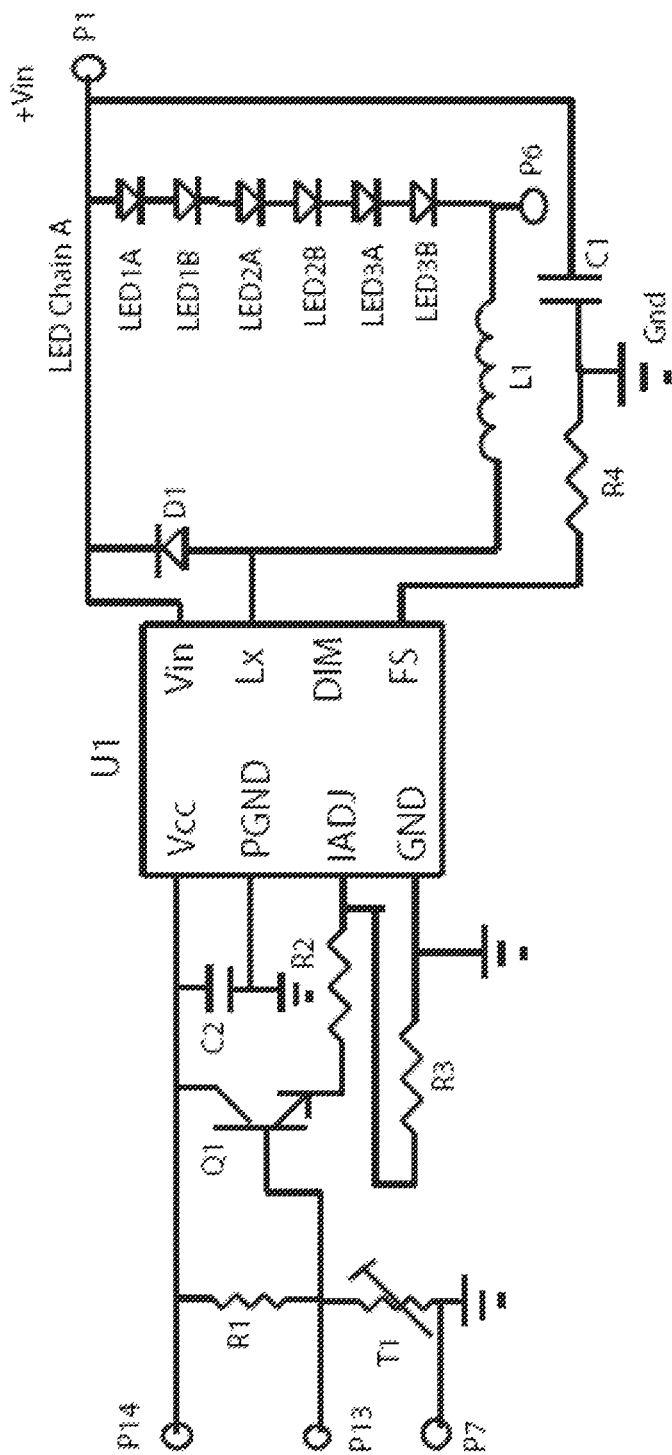
FIG. 25. Single LED driver configuration.

A fixture circuit as shown in FIG. 21 can also be powered by using only one integrated circuit driver U1. Such a design is shown in FIG. 25, which is similar to that of FIG. 24. The component count is reduced by ⅔. Component suffices "A", "B" and "C" are omitted other than for the LED chain.

Such an LED chain may be connected in series to drive all six LEDs all at the same time by a single integrated circuit driver U1. Components R1, R2, R3, R4, Q1, C2, D1, L1 still may be selected using equations (1) through (11) except that the equivalent resistance value of thermally responsive traces T1 shown in FIG. 25 may be the series of thermally responsive traces 228, 230 and 232 of fixture 1 and 228, 230 and 232 of fixture 2. The equivalent resistance of resistance R1 may be the series resistances of 222, 224 and 226 of fixture 1 and 222, 224 and 226 of fixture 2. For a preferred embodiment as in FIG. 25:

$$R1(\text{equivalent}) = [R(222) + R(224) + R(226)]_{fixture \ 1} + [R(222) + R(224) + R(226)]_{fixture \ 2} \quad (12)$$

$$RT1(\text{equivalent}) = [R(228) + R(230) + R(232)]_{fixture \ 1} + [R(228) + R(230) + R(232)]_{fixture \ 2} \quad (13)$$

Figure 26:
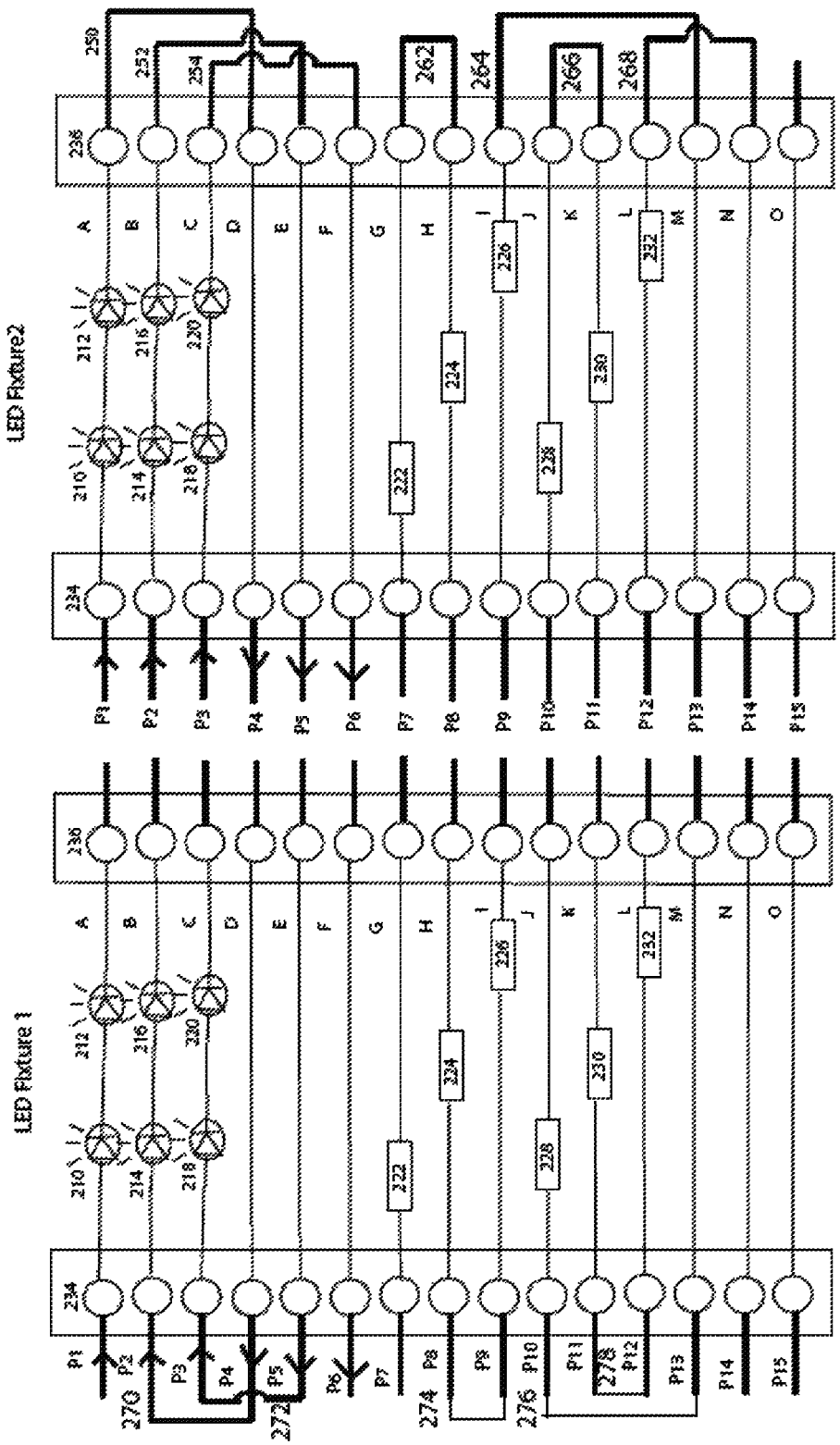
FIG. 26. Cascading of two LED fixtures with short end and driver front jumpers.

Such a cascade series of fixtures each having six LEDs is shown in FIG. 26. This arrangement may be achieved by having the same jumpers 250, 252 and 254 at the last output connector 236 as in FIG. 23. In addition, there may be additional jumpers 270 and 272 at the first input connector 234.

The thermally responsive traces may be connected in series across the fixtures. The jumpers at the last output connector would be items 262, 264, 266, 268. The jumpers at the first input connector 234 would be items 274, 276 and 278.

Input Connector Pin Reduction Circuit

Figure 27:
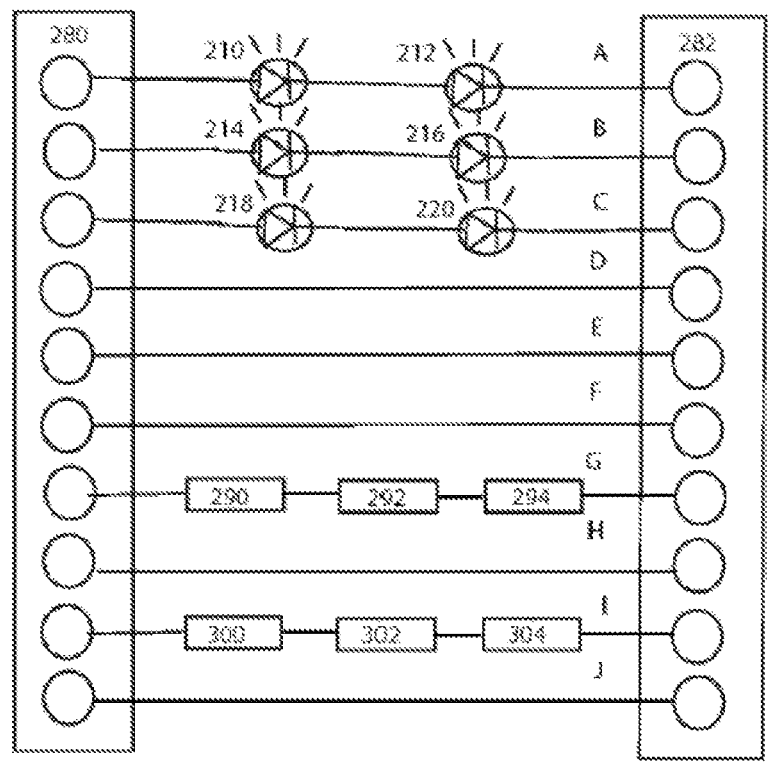
FIG. 27. PTC regulatory circuit design.

FIG. 27 shows a circuit diagram with six LEDs formed in three chains A, B and C but with a lower pin count to both input connector 280 and output connector 282 when compared to the circuit of FIG. 21. The connector pin counts may be reduced from fifteen to ten. The circuits that form the LED paths would be A, B, C, D, E and F. Circuits D, E, and F would be used for the LED current return path.

PTC Regulatory Circuit Design

In FIG. 27, paths H and J may be low current return signal paths. Positive Temperature Coefficient (PTC) thermal traces 290, 292, 294 may be connected in series in trace G. Each PTC trace may be located in proximity to one LED in each chain. Since the second LED in the same chain may be driven by the same current, it may be assumed to have the similar thermal dissipation characteristics and therefore similar temperature response. An arrangement such as this lowers component count compared to monitoring every LED. Three printed resistance traces 300, 302, 304 may be connected in series in signal path I. Both PTC traces and resistance traces may be used to control a current through the LED chains A, B, C via a circuit as shown in FIG. 25. Such current regulation prevents the LEDs from overheating and prolongs their working lives.

Figure 28:
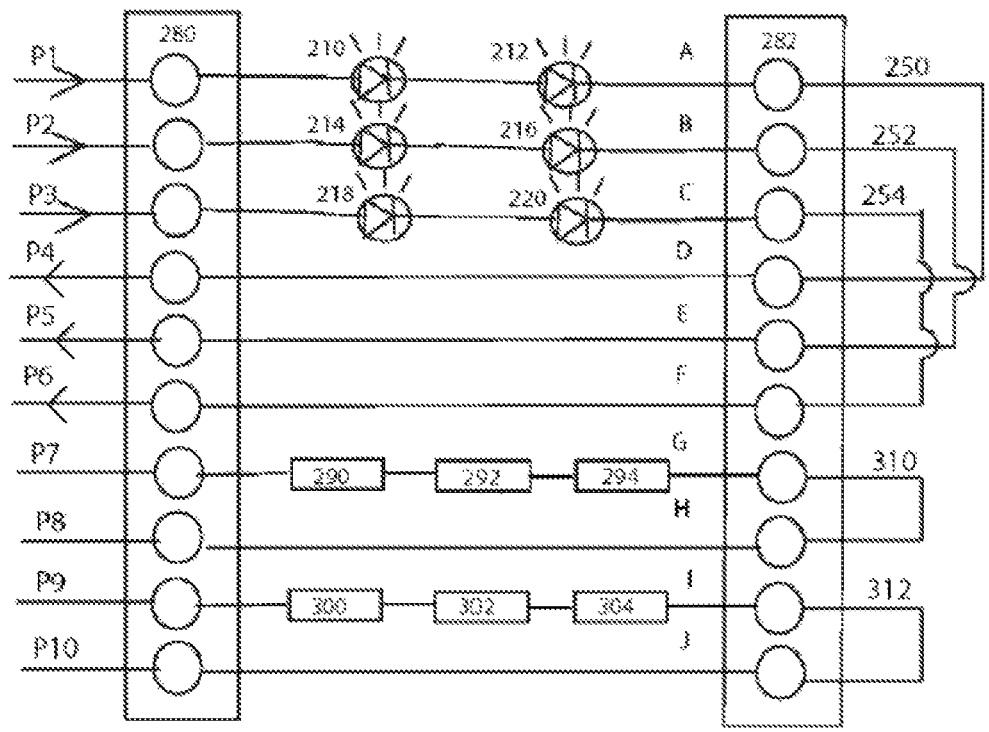
FIG. 28. End circuit jumpers for a 3 LED circuits.

FIG. 28 shows circuit jumpers 250, 252, 254 for connector 282 for three LED circuits which may be similar to jumpers for connector 236 in FIGS. 22 and 23. However, other circuit jumpers 310, 312 for connector 282 would be different from jumpers 256, 258, 260, for connector 236 in FIGS. 22 and 23.

Figure 29:
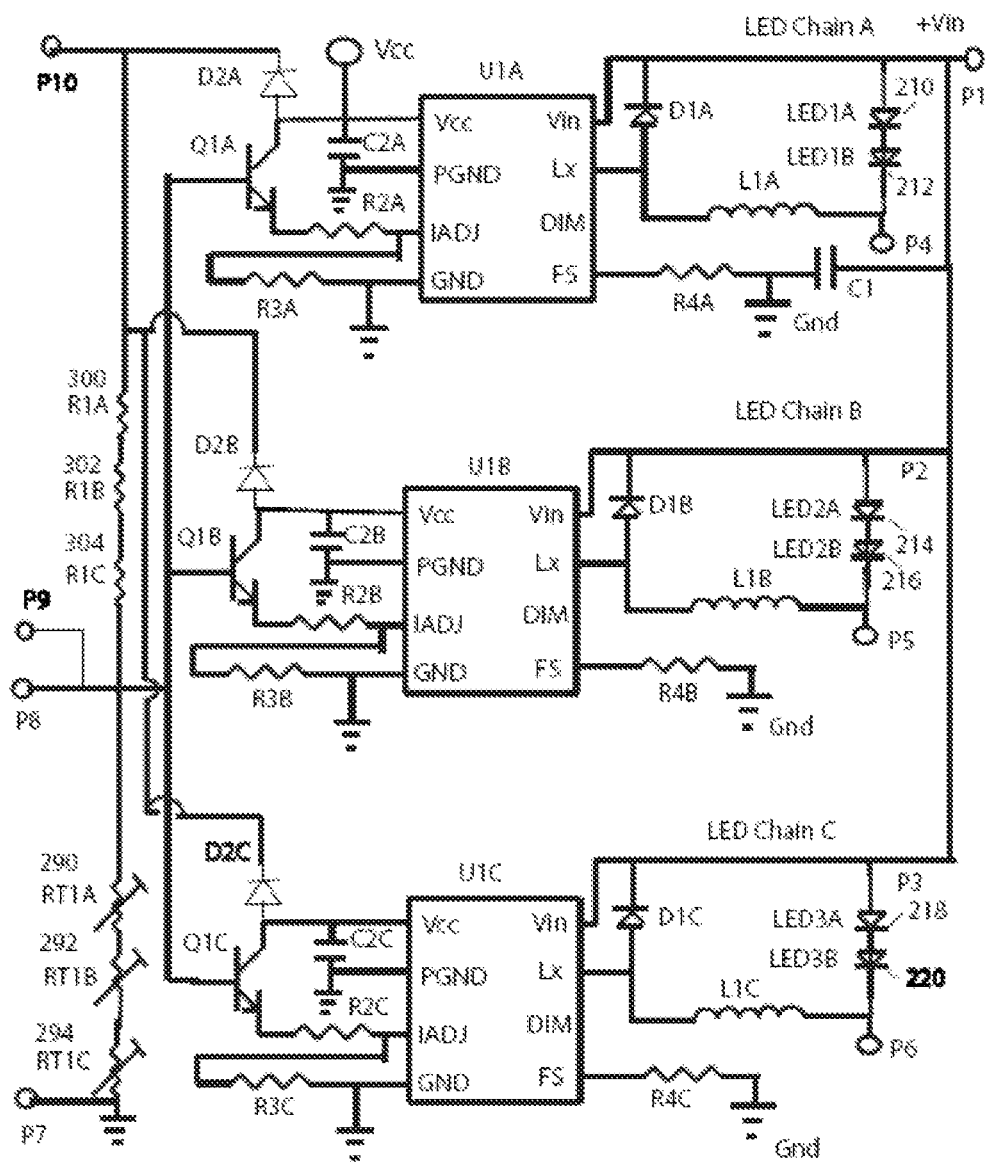
FIG. 29. The PTC regulation design in a three LED driver circuits.

FIG. 29 shows an alternate LED driver circuit embodiment using three drivers. Each of three PTC traces may be located near a first LED for each respective chain. For example, a first PTC trace 290 may be located near LED 210 for Chain A; PTC trace 292 may be located near LED 214 for Chain B; and PTC trace 294 may be located near LED 218 for Chain C respectively. In this manner, the corresponding PTC trace may be used to control the temperature in each chain by controlling the current flow through the chain.

Three transistors Q1A, Q1B and Q1C may use a common reference voltage Vcc. If each driver chip U1A, U1B, U1C generates a separate reference, the three reference voltages may be "diode-OR'd" to form the single reference voltage Vcc for the three transistors. In this way, if any of the three driver chips U1A, U1B or U1C should fail, another of the driver chips will maintain the reference voltage Vcc.

Figure 30:
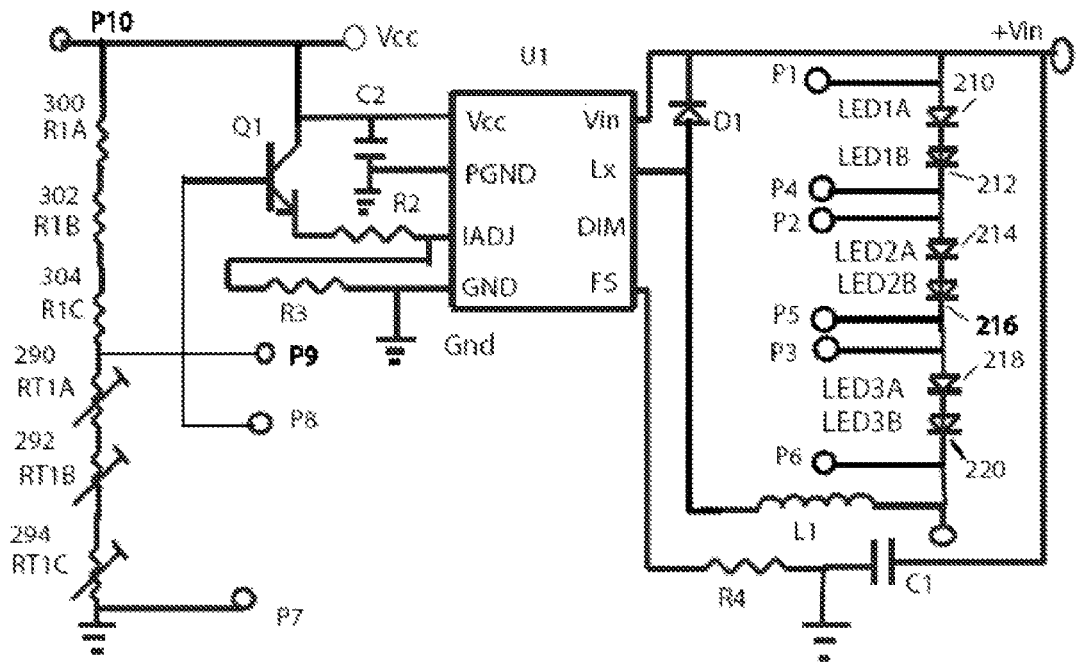
FIG. 30. PTC regulation design in a one LED driver circuit.

FIG. 30 shows an alternate design which uses only one integrated circuit U1 to drive all LEDs using pin connections P1 through P10 (connectors shown in FIG. 28). The number of LEDs driven by this circuit may be governed by the maximum output voltage of driver, which may be 65V for LM3414HV and 42V for LM3414. The circuit scheme in FIG. 29 will be able to drive three times as many LEDs as FIG. 30.

NTC Regulatory Circuit Design

Figure 31:
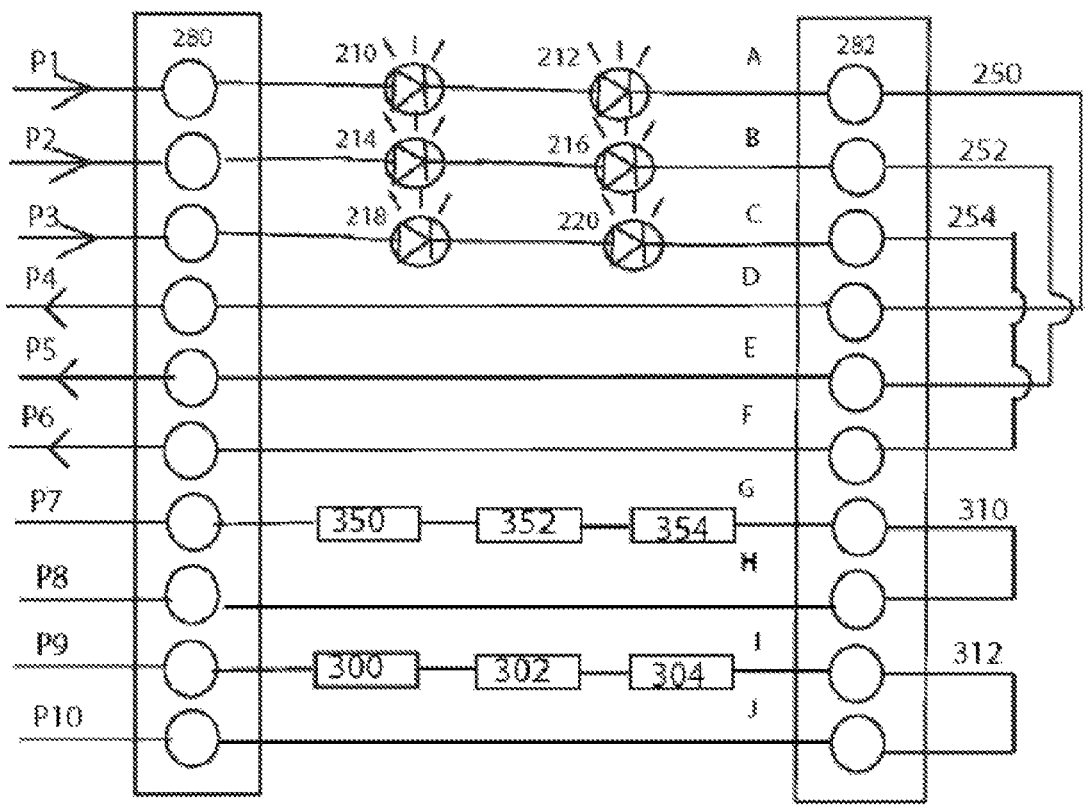
FIG. 31. NTC regulatory circuit design.

A light fixture regulatory circuit can also be design with negative thermal coefficient printed (NTC) traces. FIG. 31 shows one such configuration that uses three NTC traces 350, 352, 354. These three components may be connected in series in circuit G. Similarly to the arrangement of FIG. 28, jumper 310 may be used across circuits G and H, and jumper 312 may be used across circuits I and J.

Figure 32:
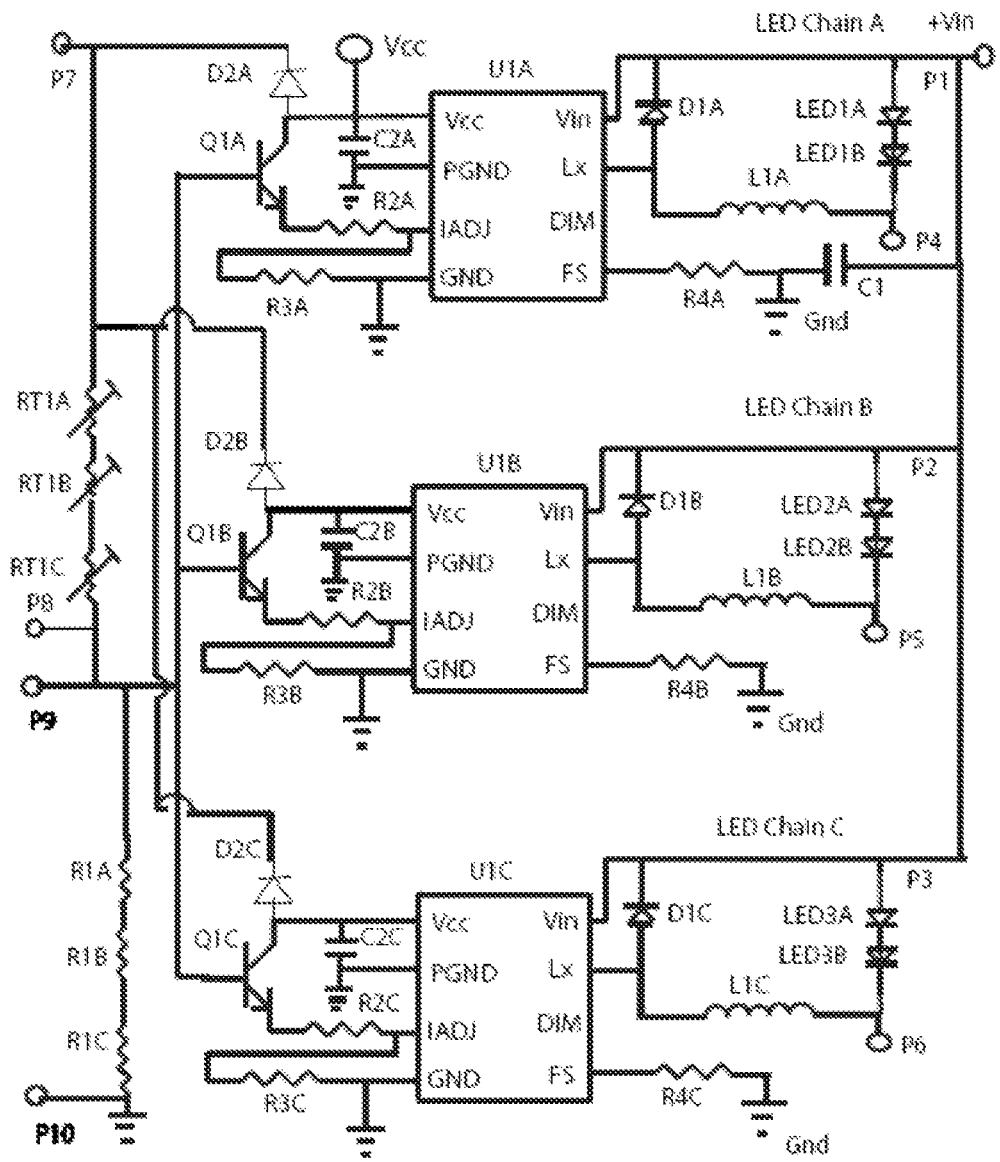
FIG. 32. NTC regulation design in a three LED driver circuits
FIG. 33. NTC regulation design in one LED driver circuit.

The LED driver circuit shown in FIG. 29 can be modified to drive a fixture design as in FIG. 32 using NTC traces. In FIG. 29 the positive thermal coefficient traces RT1A, RT1B, RT1C are on the ground side of the resistances R1A, R1B, R1C in the voltage divider. In FIG. 32, the negative thermal coefficient traces RT2A, RT2B, RT2C are on the power side of the resistances R1A, R1B, R1C in the voltage divider. Since these six traces may be within a fixture, a design such as shown in FIG. 32 may be achieved by switching connected Pins P7, P10 at the input connector 280. Because NTC traces RT2, RT2B, RT2C decrease in resistance as temperature rises, a rise in temperature in a fixture increases the base voltage of transistors Q1A, Q1B, Q1C. The currents through resistors R2A, R2B and R2C increase, and the PLM currents driving the LEDs in each chain would be reduced accordingly.

In a multiple fixture cascade mode, the equivalent values of the traces may be connected in series and would be as follows.

RT2A equivalent value=RT2A(fixture 1) and RT2A(fixture 2)

RT2B equivalent value=RT2B(fixture 1) and RT2B(fixture 2)

RT2C equivalent value=RT2C(fixture 1) and RT2C(fixture 2)

R1A equivalent value=R1A(fixture 1) and R1A(fixture 2)

R1B equivalent value=R1B(fixture 1) and R1B(fixture 2)

R1C equivalent value=R1C(fixture 1) and R1C(fixture 2)

Figure 33:
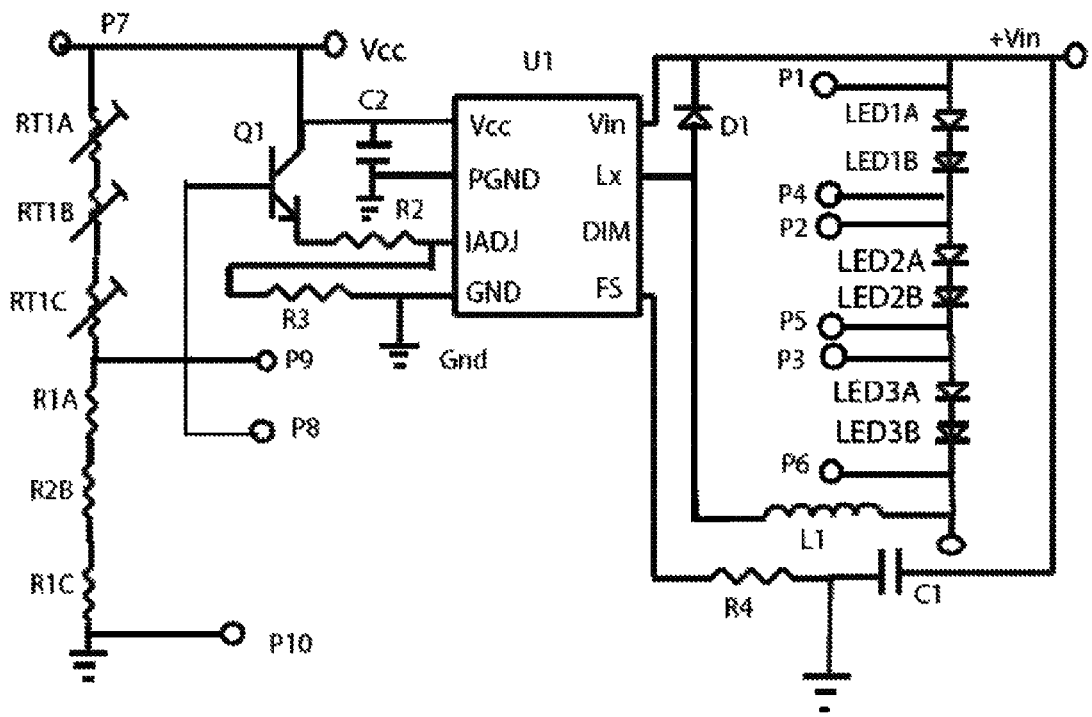

FIG. 33 illustrates an alternate LED driver circuit embodiment that is similar to the single driver circuit design shown FIG. 30. The embodiment of FIG. 30 may be modified to drive an LED fixture circuit design as in FIG. 31 but with NTC traces. PTC traces RT1A, RT1B and RT1C in FIG. 30 may be replaced by NTC traces RT2A, RT2B and RT2C and switched in position with resistances R1A, R1B and R1C. The principle of LED current regulation may be similar to that shown in FIG. 32.

Both PTC and NTC traces may be applied to the circuits of both FIG. 32 and FIG. 33. In such cases, the resistances R1A, R1B and R1C in these figures may be replaced with PTC traces RT1A, RT1B, RT1C and leaving the NTC traces RT2A, RT2B, RT2C in place as shown in the figures. With this modification, the voltages at the bases of transistors P8 or P9 would rise at a much faster rate when LED temperature rises. This can be thought of as a "push and pull" effect.

Type A Connector

Figure 34:
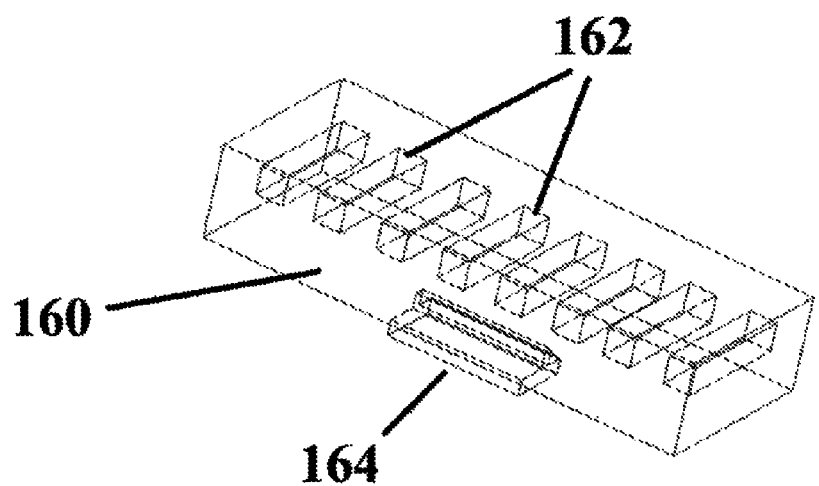
FIG. 34. Type A connector.

FIG. 34 shows a preferred, type A connector (FIG. 1, item 24). This may be a female connector 160 with holes 162 and a connector guide 164. The connector may be used for interconnection between fixtures. The number of pins for this connector would depend on the choice of the driver circuit selected. Other connectors may be used.

Type B Connector

Figure 35:
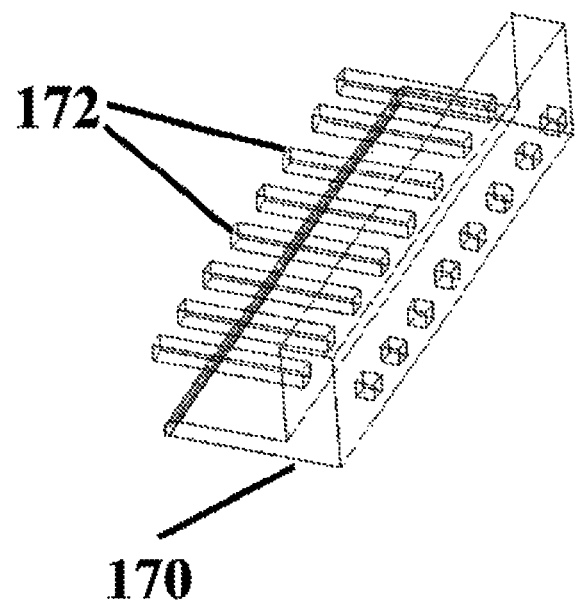
FIG. 35. Type B connector.

FIG. 35 shows a preferred, type B connector 170. This may be a male connector with pins 172 that mate with pins of a female connector (e.g., FIG. 34, item 160). Other connectors may be used.

Bracket Latch

Figure 36:
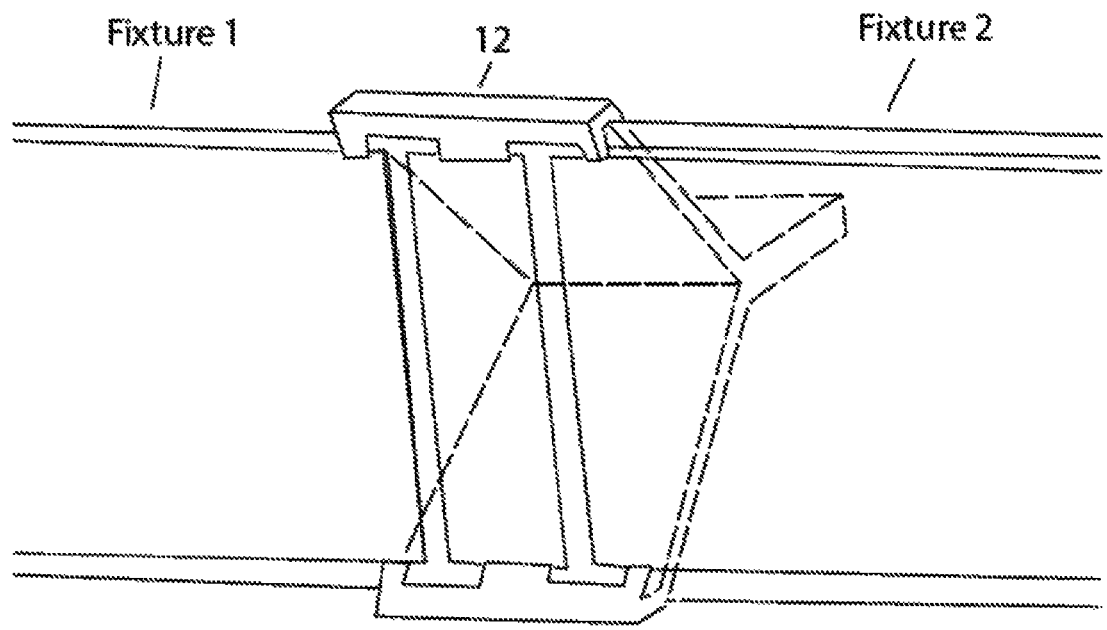
FIG. 36. Bracket Latch.

FIG. 36 shows a preferred bracket (FIG. 1, item 12) which may support a fixture and/or secure two fixtures at their joints. Other brackets may be used.

Intelligent Lighting Fixtures

Figure 37:
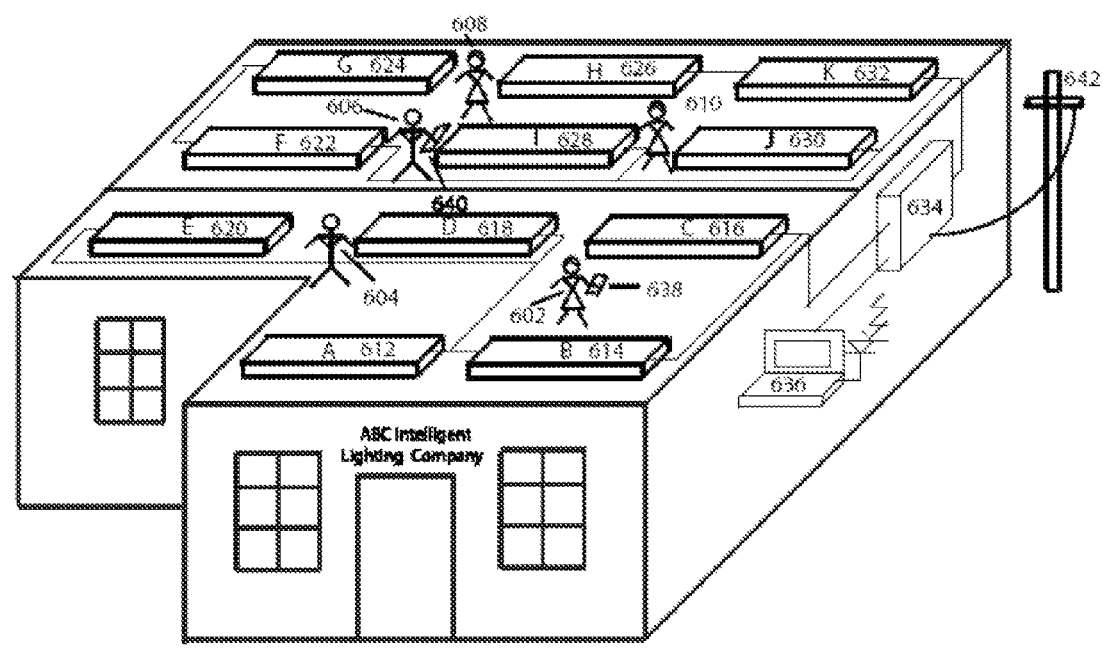
FIG. 37. Illustration of an Intelligent Lighting network.

FIG. 37 shows a concept of intelligent lighting. The concept will be discussed here in the context of a building, but it may also apply to other location, including outdoor spaces, and the use of a building as a descriptive example is not intended to limit applicability.

People in a lighted region would wear devices for sensing location, such as wireless RFID badges or chain tags 602, 604, 606, 608, 610. Some may carry intelligent personal devices 638, 640, such as cell phones, personal digital assistants, remote controls, or other devices not yet invented with capability for performing location determination functions as discussed further below. Intelligent lighting fixtures 612, 614, 616, 618, 620, 622, 624, 626, 628, 630, 632 each preferably has a unique identifier. Fixtures may be connected to one or more power distribution centers 634, which in turn may receive power from any source, such as a utility power grid 642 or local source. Local sources may include generators, photo-voltaic panels, wind turbines, batteries or other sources now in existence or not yet invented. A computer 636 may be connected to the power distribution controller 634, such as by Ethernet or other connection. The computer 636 may store and process information obtained from and/or used in the system, including but not limited to information pertaining to, or received from, lighting fixtures, badges, intelligent personal devices, power distribution centers, etc.

Figure 38:
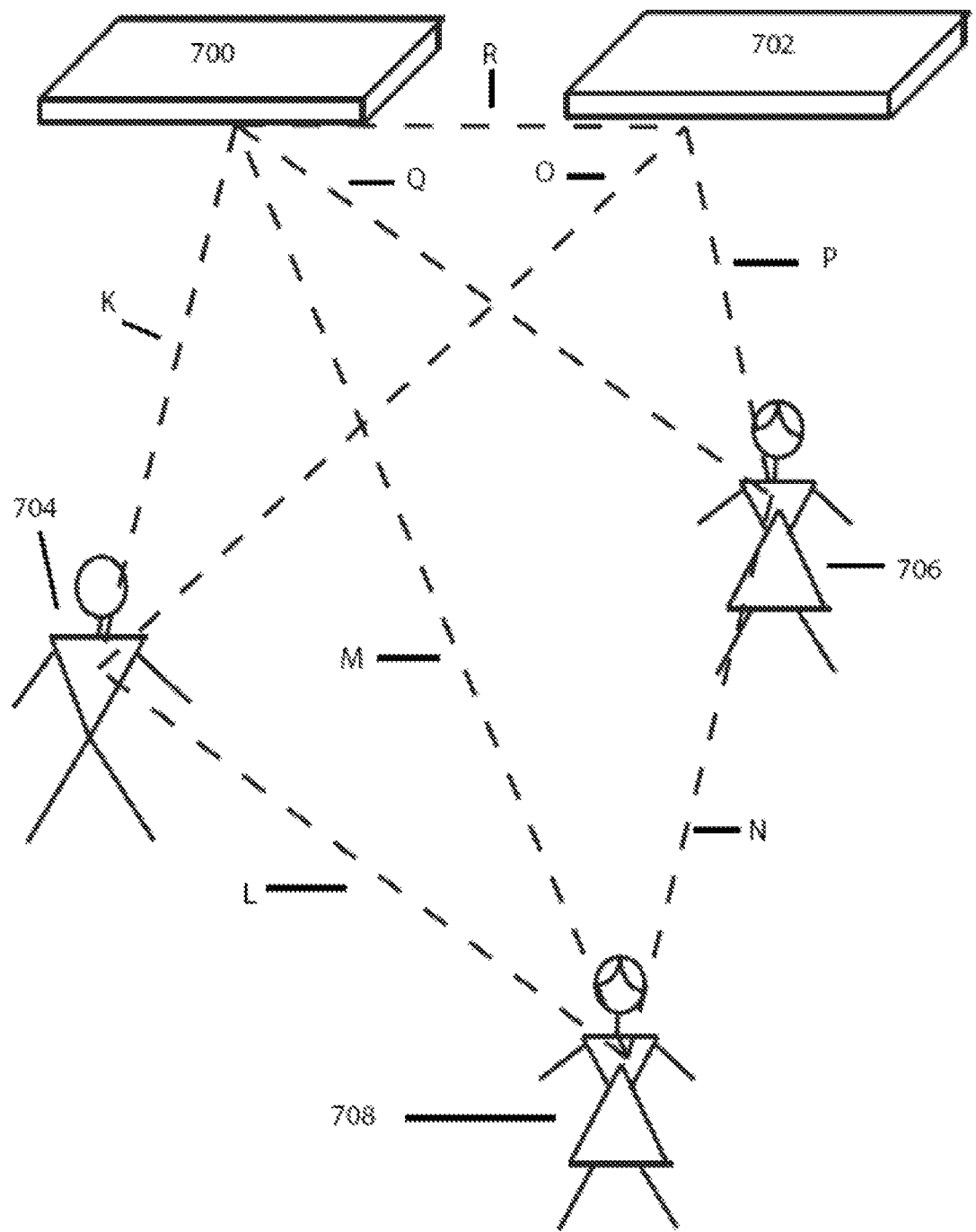
FIG. 38. Wireless Network Map.

FIG. 38 shows elements of a room layout which will be used as an example for discussing a theory of operation for implementing intelligent lighting. (The use of a room as an example is not intended to limit applicability of the intelligent lighting concept.) Light fixtures 700, 702 and occupants 704, 706, 708 form a network which collects occupant location information, such as time-stamped measurements of occupant position. In an illustrative example shown in FIG. 38, two lighting fixtures 700, 702 are spaced a known distance "R" apart. Beneath fixtures 700, 702, three persons 704, 706, 708 are shown, which for this discussion may be assumed to be on the same floor or other level. The relative distances K, O between light fixtures 700, 702 and a first occupant 704 preferably are measured in real time as will be discussed further below. Absolute positions of fixtures 700, 702 preferably are known. Triangle RKO defines an absolute location of the first occupant 704 relative to a frame of reference of the fixtures. Similarly, triangle RPQ defines the absolute location of a second occupant 706 with respect to the two light fixtures 700 and 702. In this way, positions may be determined for all occupants with direct communications to any two fixtures.

For occupants that do not have direct communications with two fixtures, such as because of obstruction or interference, position may be determined with reference to any other occupant having a known location. For purposes of illustration, assume in FIG. 38 that an obstruction blocks a direct signal path from a third occupant 708 to a lighting fixture 702. The position of the third occupant 708 can be determined indirectly through either triangle KLM or triangle MNQ. When absolute positions of the first two occupants 704, 706 are known; the absolute position of the third occupant 708 may be also obtained.

Once a position determination network is established and occupants' locations are defined, occupant movements may be determined. One way would be to update a time-dependent network map and calculate rates of change in the triangles defined by the network map. Such method of motion detection using two-way radio determination may be more accurate and useful than using traditional infra red (IR) detectors that only detect motion. Such detectors typically "time out" if they do not detect motion for a period of time and shut off their light, even though an occupant may be present.

A network map allows for coordination of multiple light fixtures to provide improved light coverage for all occupants. In the example above, occupant 708 does not have direct sensing path with light fixture 702, which implies that light from this fixture might be blocked from reaching that occupant. The system may control other fixtures to achieve desired lighting levels for that occupant. For a very large space, such as a conference room or exterior space, all the lights may not turn on if only a small section of the space is occupied. For example, if a company receptionist assigns a badge to visitor and enters into the system a destination location, the badge and the lighting fixture can form part of a system for navigating the visitor to the destination, such as by raising illumination on the path ahead of the visitor, and lowering illumination along diversionary paths.

In the past, traditional light sensors may have been combined with IR motion sensors with settings for a light threshold level, turn-on time for a timer, and motion sensitivity level. In such combinations, the power circuits would have been switched completely off if the ambient light exceeded a threshold or motion was not detected during the turn-on timer setting. In comparison, an improved, intelligent lighting fixture offers continuous level control of room brightness in real-time with one of the following methods:

a) Brightness information on the occupant may be collected from wireless badges with photo sensors, cameras in cell phones, portable smart devices with a brightness calibration application, or other sensors. This information may be fed back to the lighting system through an information network and may be a more accurate way for measuring the light level needed by occupants rather than measuring at fixed wall sensors. The network can determine a level in lumens needed for each occupant and coordinate all lights in the vicinity to provide improved lighting.

b) Wall photo sensors may be wired directly to a fixture dimming circuit or indirectly using a network, such as a power line network, to provide light level information from wall sensors to be fed back to the light fixture controller.

In a scenario where no light sensors are present, the lighting system can estimate its light level by estimating a light output power required for known distances between the occupants and the light fixtures.

Figure 39:
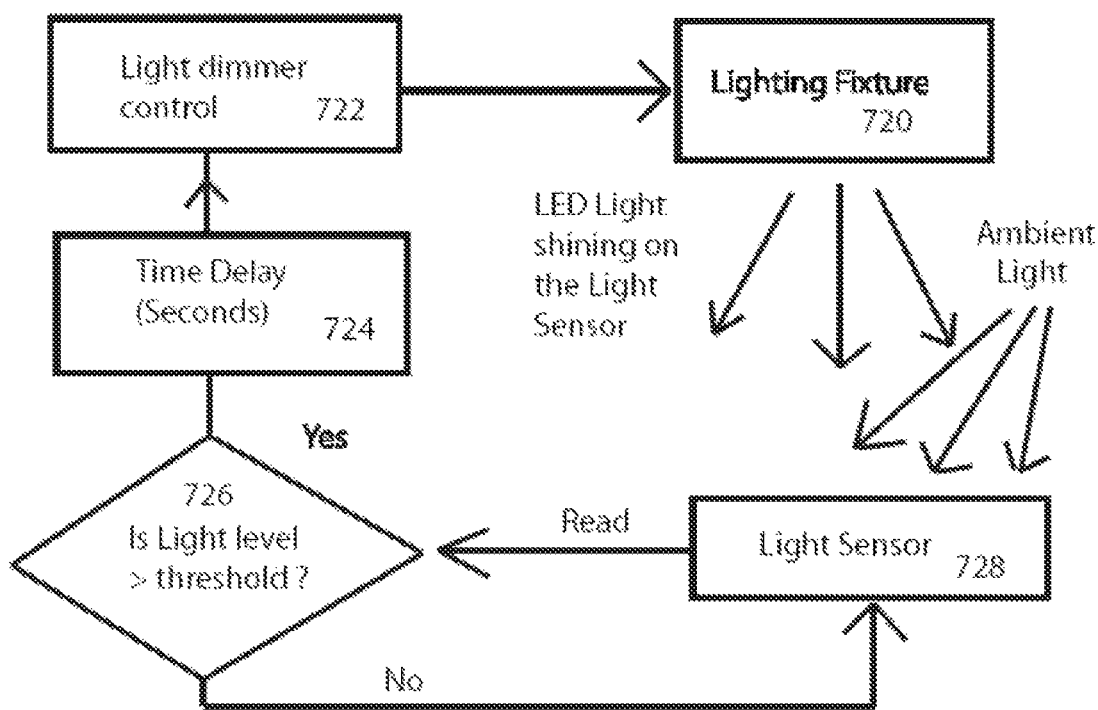
FIG. 39. Brightness control feedback loop
FIG. 40. Light Sensor Microcontroller control via an I2C communication.

FIG. 39 illustrates an exemplary control algorithm for light brightness. A light fixture 720 and ambient light both may illuminate a light sensor 728. A comparator 726 may determines one or more light threshold levels, such as a minimum and maximum level, or a desired average level. If the light level increases beyond a threshold, a light dimmer may be activated. There may be a time delay 724 between the light dimmer control 722 and the light sensor comparator 726.

Figure 40:
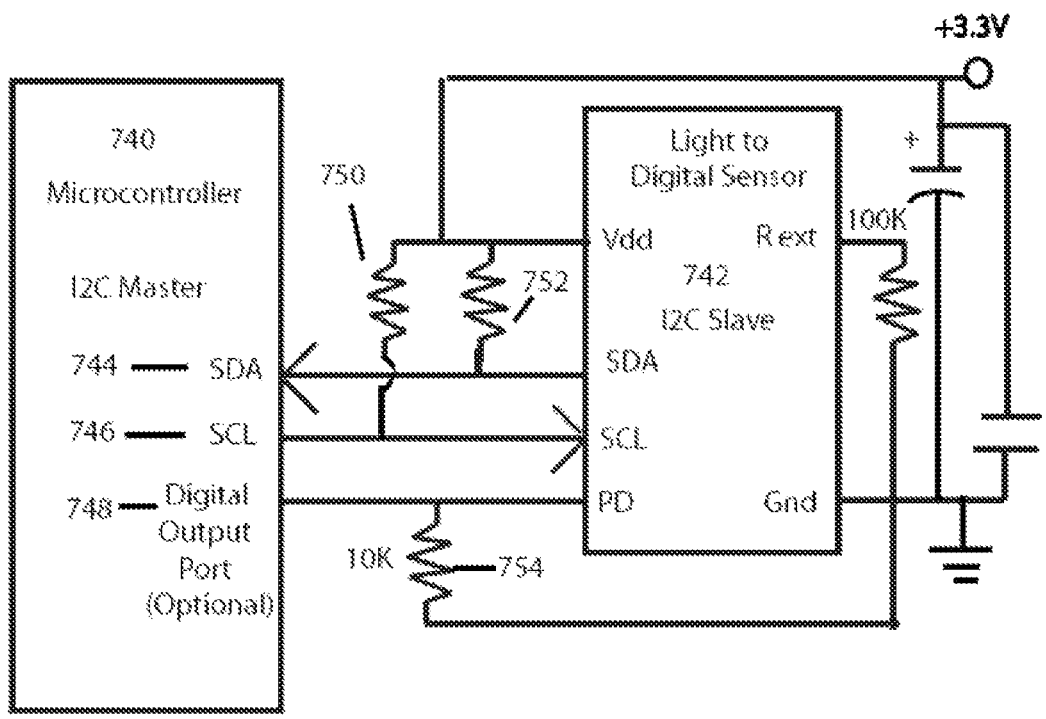

FIG. 40 shows an example of a light sensor circuit, which may use an Intersil ISL29001 sensor 742 sensor, which has a light sensing range of about 0.3 lumens to 10,000 lumens, with infrared filtering and 50/60 Hz rejection. Such a sensor has light measurement range from about 0.3 Lux to about 10,000 Lux. It also has infrared rejection and rejection of light fluctuations in the range of about 50/60 Hz. Other sensors may be used. The sensor preferably reports to a master microcontroller 740 through an I2C bidirectional serial communication port. I2C communication uses two open drain lines: a serial clock line 746 and a serial data line 744. Each line may be pulled to the line voltage Vdd via resistors 750, 752. A microcontroller example may be the Texas Instrument MSP430FG4619. Such a controller has 120 KB of Flash RAM and 4 KB of ROM and has General Purpose ports for driving LCD displays, I2C communication devices and switches. Other devices can be used, including but not limited to a smaller capacity microcontroller MSP430F2013.

Powering a Light Sensor

In the example of FIG. 40, the illustrated microcontroller 740 has an output port 748 which may be optional if the light sensor is to be powered all the time. A resistor 754 may tie the Power Down Pin PD to ground to ensure the light sensor is ON. However, if the light sensor is to be turned off for power savings, then the port 748 may be pulled high.

Communicating with a Light Sensor

Once the light chip is in an "ON" state, the microcontroller serial clock port 746 may drive the serial clock line SCL. An ISL29001's I2C address may be hardwired internally as "1000100". I2C transactions begin with the Master asserting a start condition (SDA falling while SCL remaining high). The master drives the following byte to provide a slave address and read/write bit. This particular light sensor requires a minimum of 100 ms for each bit and therefore determines its fastest update time. Other devices and protocols may be used.

IR Rejection

A light sensor may be used with a wide spectral response, such as from 400 nm to 1000 nm. IR rejection may be a consideration since many light sources have high presence of IR and these IR sources can give an apparent brightness to which the human eye does not respond. The ISL29001 light sensor may be capable of performing IR rejection because: it has two photodiodes D1 and D2. One diode D1 may be sensitive to both visible and IR light (400 nm to 1000 nm), while the other diode D2 may be mostly sensitive to only IR light. For sensors such as this, a light measurement may be made for the visible range if the light level readings from both photodiodes are used according to the following equation:

$$D3=1.85*(D1-7.5*D2)$$

Figure 41:
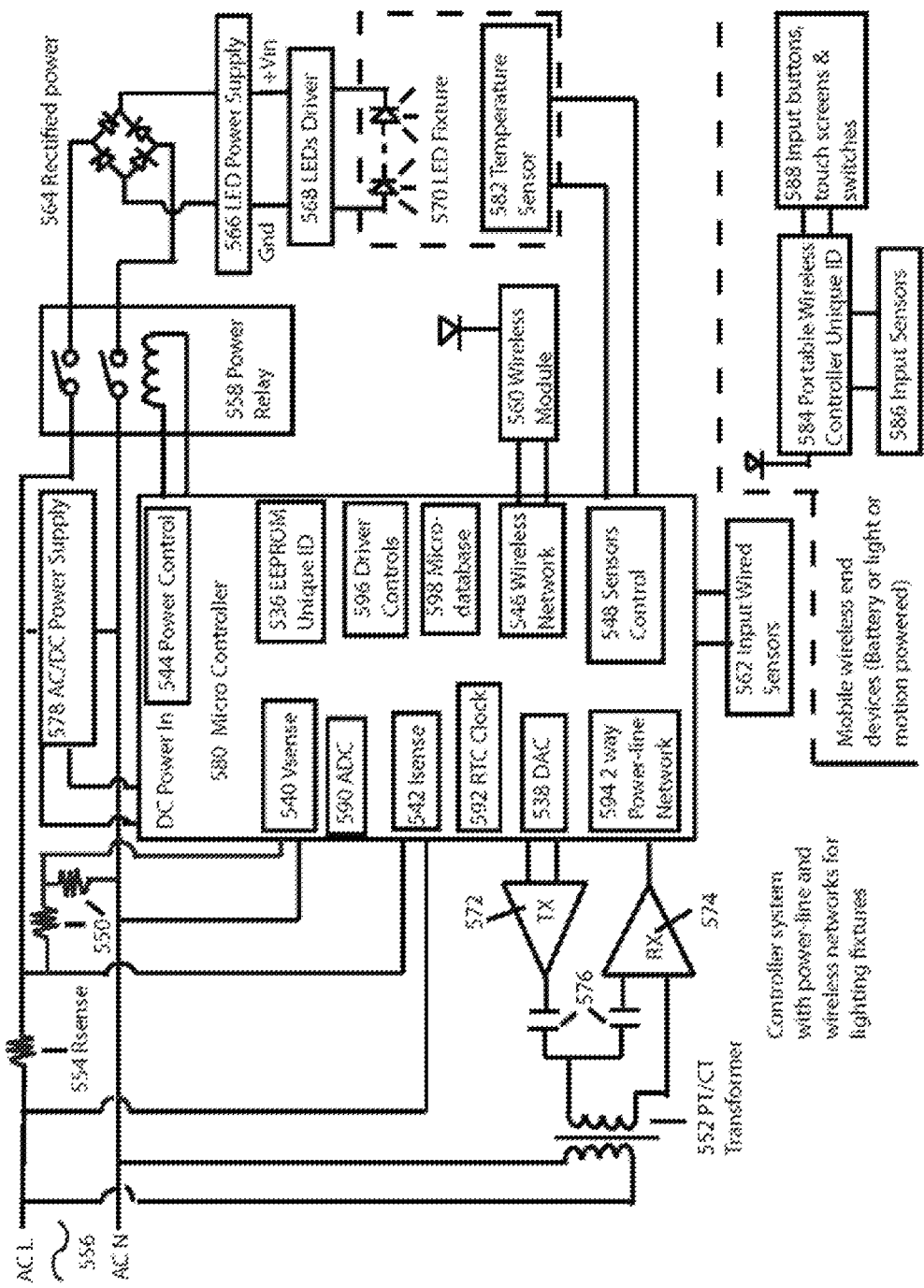
FIG. 41. A controller system with intelligence.

FIG. 41 illustrates an intelligent light fixture controller system with two types of network capability: power-line network and wireless network. A power-line network links together smart devices connected to a common power line. A wireless network connects both portable and other wireless devices within its RF range or proximity. A power line network potentially has a longer range than a wireless network.

Power-Line Communication

Since light fixtures usually draw power from a shared AC power source, power-line networking may be suitable for controlling intelligent lighting fixtures. A power-line network may be based on the concept that the power source itself is a communication channel for the network. In FIG. 41, a PT/CT transformer 552 may be a signaling power-line impedance matching transformer. It may be the gateway for a low power controller block 580 to communicate with another power-line network device using the same AC source.

A preferred low power controller block 580 draws its power from an energy efficient AC/DC Power Supply 578, which may be directly connected to an AC power source 556 that preferably is powered at all times regardless of whether the LED lights of the fixture are powered. A preferred controller block 580 has a programmable microcontroller at its core with EEPROM 536 storing a unique ID, a program, a Micro-database 598, and a Real-Time Clock 592. It may have several additional functional blocks, such as: Analog to Digital Converter (ADC) 590; Digital to Analog Converter (DAC) 538; Power control with output transistor 544 capable of driving a relay 558; Digital I/O ports 596 for driving an LED driver 568; wireless Digital I/O ports for a Wireless Network interface 546; Digital I/O ports for a Sensor Network 548; and ports for a 2-way Power-line network 594. This micro-controller system preferably performs some or all of the following functions:

a) Line Current Measurements—The micro-controller may sense the current in the AC source circuit mains 556 through an Isense port 542 by measuring the voltage across a sensing resistor Rsense 554 through the Analog to Digital Converter 590.

b) Line Voltage Measurements—The micro-controller may sense the voltage across the AC source circuit mains 556 through an accurate voltage divider resistor network 550 and picked up by the controller's Vsense port 540.

c) Line Power Measurements—The micro-controller may sense both incoming voltage and current in real-time, which allows power consumption to be computed. In the United States, the power system frequency is 60 Hz. If the sampling is performed on both current and voltage at least once every 131 uS, which is faster than 4.32 kHz, the real and apparent power can be calculated within an accuracy of 10 degree of the phase.

$$Vsense(\text{RMS}) = \sqrt{\frac{\Sigma(Vsense \times Vsense)}{N}}$$

$n = 1$ to $N$ $$Isense(\text{RMS}) = \sqrt{\frac{\Sigma(Isense \times Isense)}{N}}$$

$n = 1$ to $N$

Apparent Power = $Vsense(\text{RMS}) \times Isense(\text{RMS})$

Real Power = $\Sigma(Vsense \times Isense \times \Delta T1)$ (energy consumed in 1 second)

$n = 1$ to $N$ where $N = 7634$, $\Delta T1 = 131$ uS

Figure 46:
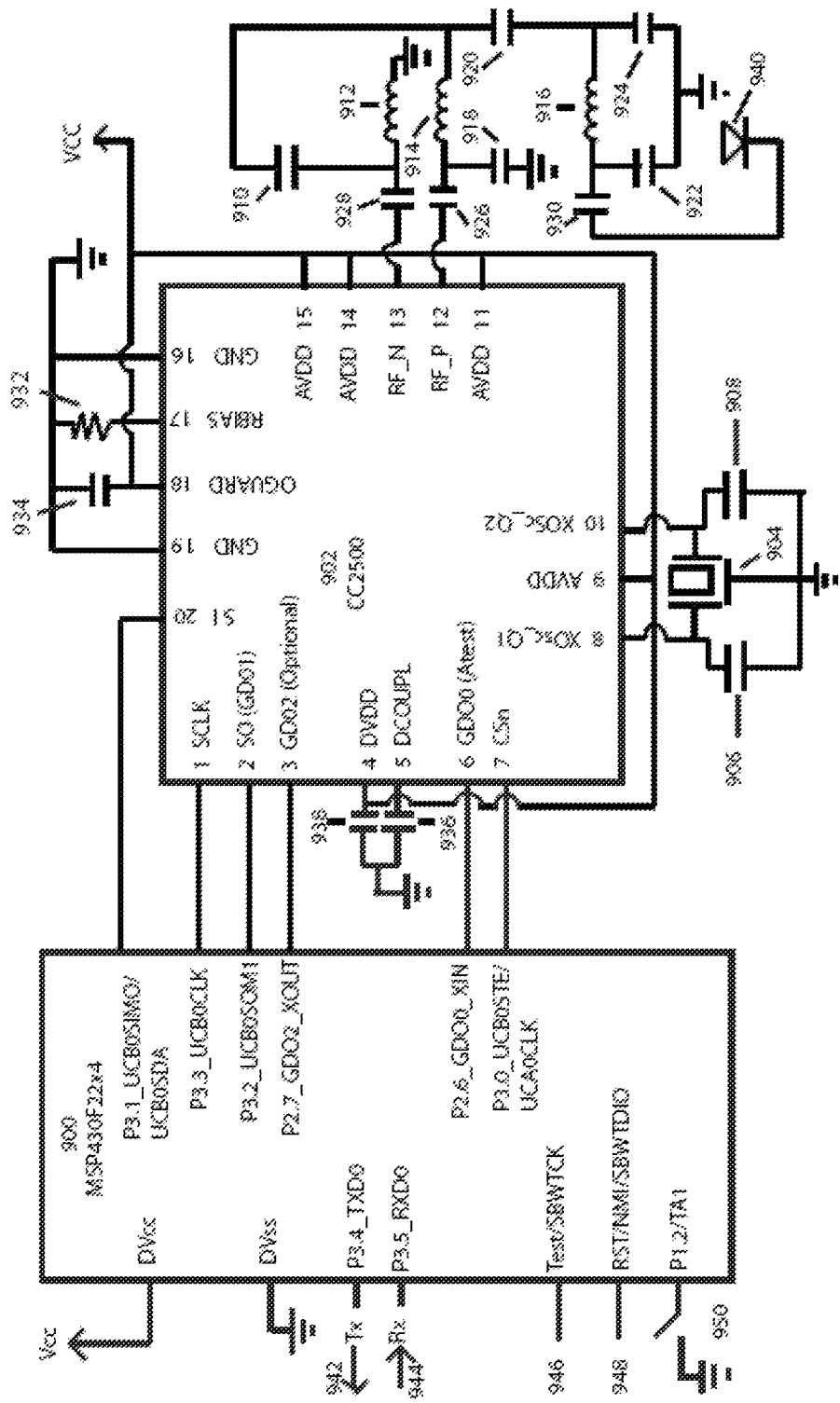
FIG. 46. MCU controlling a wireless RF Chip CC2500.
Figure 52:
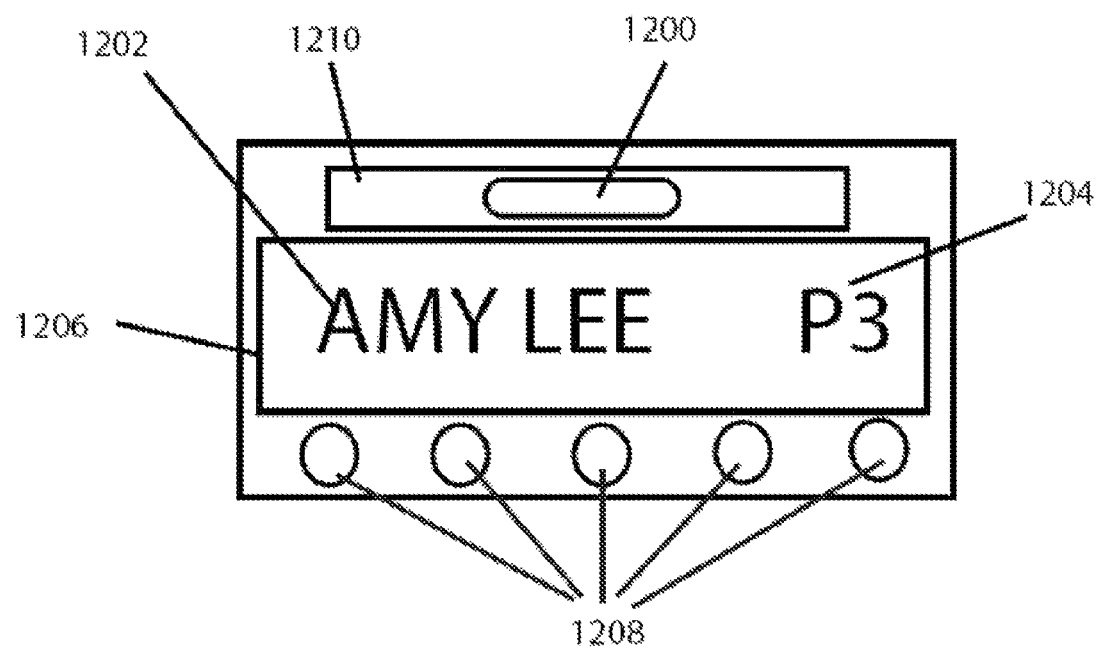
FIG. 52. Example Front view of mobile tag (End Device)
FIG. 53 Access point Flow Chart.

Energy Consumption per hour = $\Sigma$ Real Power $n = 1$ to 3600 d) Power-line Communications—The micro-controller may have a bidirectional ability to communicate with other power line network devices and a central control system through two-way Power-line network ports 594. The power line network sends data via a Transmit TX driver 572, and receives commands via a receive driver RX 574. The power line network modem may be isolated electrically and protected by blocking capacitors 576 and PT/CT transformer 552.

e) Fixture Power Control—The micro-controller may have an output 544 that controls a power relay 558, which in turn controls the AC input power to drive the LED fixture 570 via a rectified power bridge 564. The rectifier in turn provides power to an LED Power Supply 566 and a subsequent LED driver 568, which has driver controls directly controlled by controller 580. Examples of LED driver integrated circuits are LM3414HV, LM3464, LM3445, all from National Semiconductor. Other drivers may be used.

f) Temperature regulation—The micro-controller may have a sensor control port 548 that allows temperature sensors 582 to monitor the temperatures of the LEDs mounted on the LED light strip 570.

g) Real-Time Clock—The micro-controller may have a real-time clock RTC 592 that runs independently to keep track of time. It may synchronize occasionally with a central clock through the power line-network. In addition, the power distribution center/Power line network center and controller (FIG. 37, item 634) may synchronize with an external reference clock, such as atomic clock time, time zone, daylight savings time and weather information from its internet access URL sites to anticipate times for which a location may be getting ambient light.

h) Wired sensors—The micro-controller may have sensor control ports 548 which allow input from wired sensors 562, such as an ambient light sensor circuit illustrated in FIG. 40. The interface shown in FIG. 40 may be serial I2C communication. These wired sensors may be programmed as slave devices, and the micro-controller may be programmed as the master device. The I2C communication architecture allows many devices to share a common bus. Each device may be distinguished by a unique device address. Other wired sensors, such as motion sensors, can share this bus. A temperature sensor 582 for a lighting fixture can be added to this sensor control for dimming the light with closed loop feedback. This improves the life of the lighting system.

i) Wireless network controller—The micro-controller may have a wireless network port 546 which may be connected to an optional wireless module 560 that has six connections similar to those shown in FIG. 46 and runs a program flowchart similar to the one illustrated in FIG. 52. Such a wireless module 560 may be implemented with a wireless network stack, which allows a flexible dynamic multilink broadcast network scheme described further below. Such a network scheme overcomes a limitation of end devices not being able to communicate directly with other end devices, and it has freedom to join a very large network, such as a Zigbee network. Such a scheme may be implemented using a modified SimpliciTI network stack, and this device may be assigned as an "Access point." It preferably would be powered at all times.

j) Wireless portable Devices—Portable wireless devices may have input buttons (switches) 588, screen (optionally a touch screen), and input sensors 586. A portable device can have a form factor as simple as a name tag (mobile tag) similar to one illustrated in FIG. 50, with a program flowchart such as one shown in FIG. 49. An exemplary circuit diagram is illustrated in FIG. 46. That example uses a six-connection interface that allows a portable controller 584 to communicate wirelessly with the micro-controller 580 via a wireless module 560. There can be one or more portable wireless controllers, and they all preferably would have unique addresses and may be assigned as "End devices" similar to a Zigbee network. They may communicate with each other automatically and establish a network by a join-network command and executing a program flowchart, such as one illustrated in FIG. 49. A portable controller can be larger, like a handheld remote controller, and be more sophisticated to include a large touch screen and keyboard entry. It could include a network interface with cell phones, iphones, etc. Under such an arrangement, the cell phones and iphones could be used to communicate with the controller 580 running a custom application program designed for lighting control. In this case, users could use their cell phones, iphones, ipads, etc. to be their portable light controller.

Situation Awareness Dynamic Lighting Illumination Plan

Figure 42:
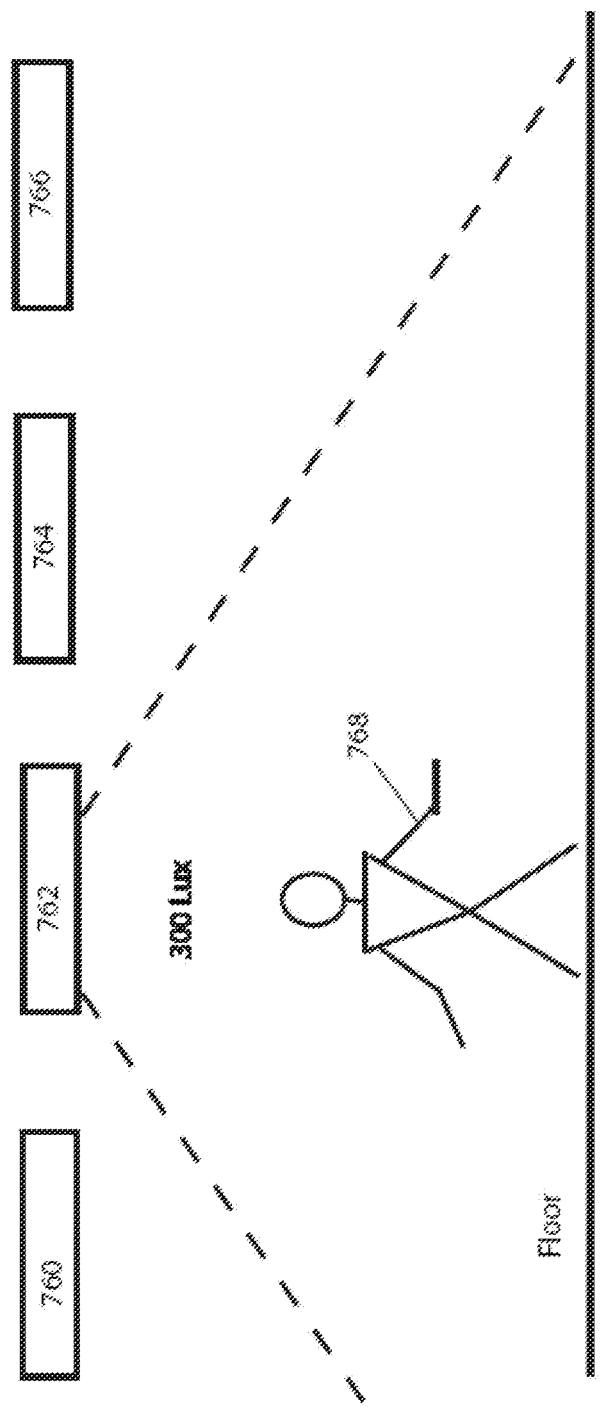
FIG. 42. Light Illumination Plan A—Ultra Savings.

The ability to identify occupants and their activities allows cost-saving illumination plans, especially in large rooms with several light fixtures and open spaces. FIG. 42 illustrates an example where an occupant 768 may be stationary under, and illuminated only by, a single light fixture 762 with an exemplary illumination light level of three hundred (300) lux in the vicinity of the occupant. The other three light fixtures 760, 764 and 766 may not be turned on. The light level would be lower at locations away from the occupant.

Figure 43:
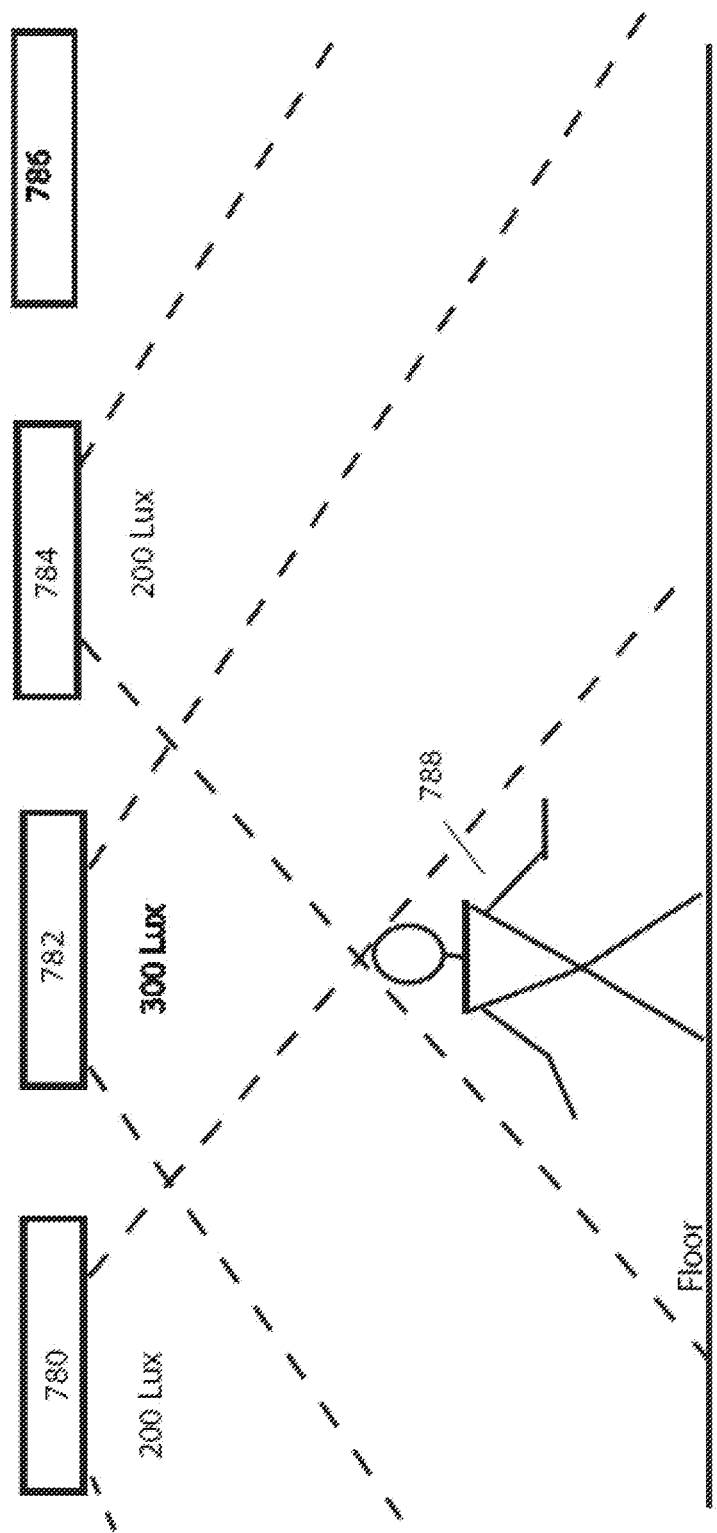
FIG. 43. Light Illumination B—Moderate Savings.

FIG. 43 illustrates an alternate plan where the occupant can choose a moderate savings light illumination plan B. In this example, the two neighboring lights 780 and 784 are illuminated at light level of two hundred (200) lux, slightly dimmer than the immediate light fixture 782 above occupant 788 illuminating at light level of three hundred lux. This allows the occupant to feel not as lonely or isolated. A fixture 786 farther away may remain off to provide energy savings.

Figure 44:
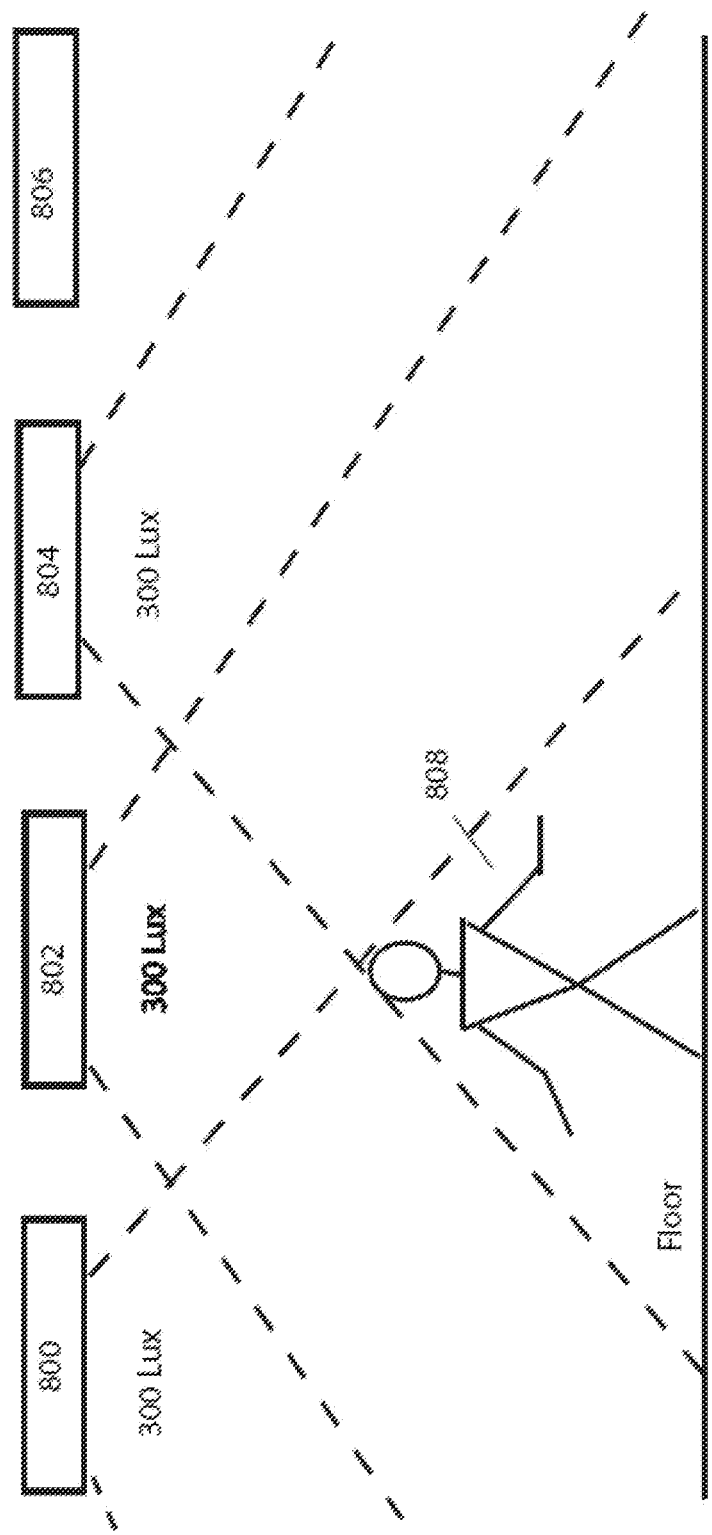
FIG. 44. Light Illumination C—Nominal Savings.
Figure 45:
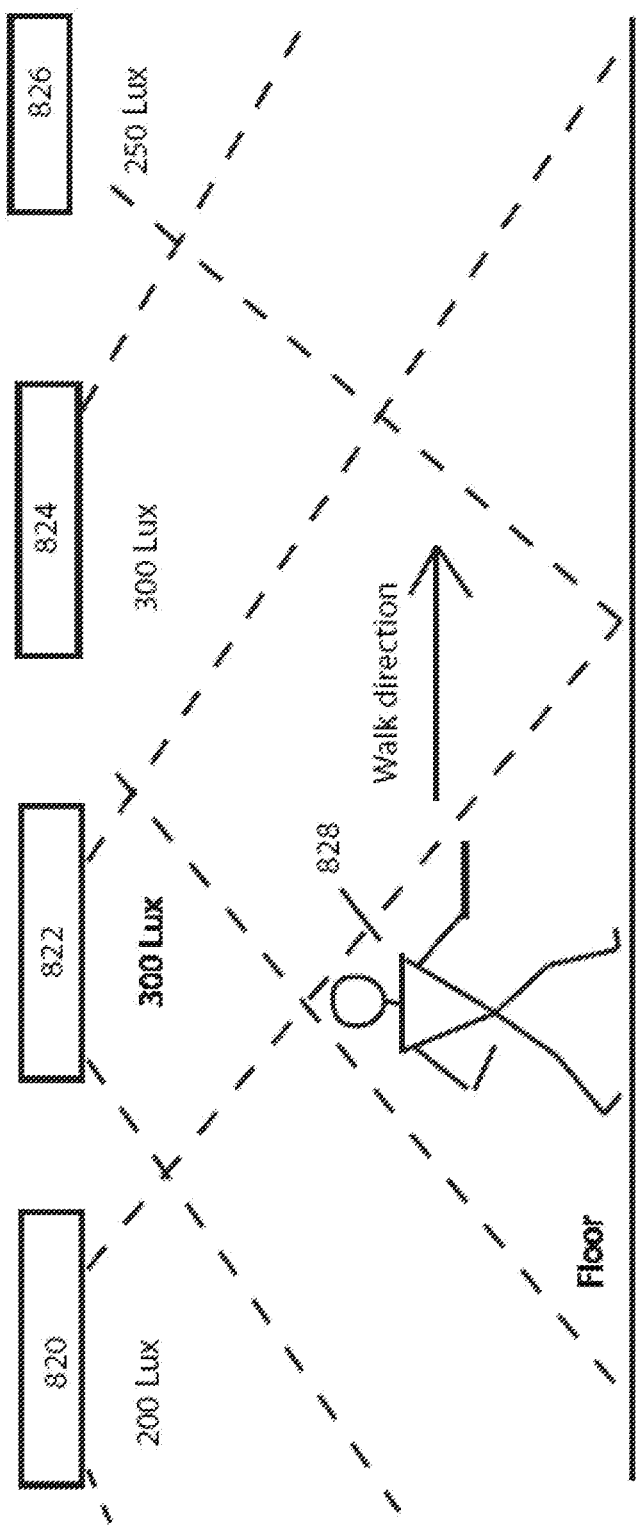
FIG. 45. Light Illumination C—Nominal Savings with Walking.

FIG. 44 illustrates an alternate plan where the occupant can choose a nominal savings light illumination plan. In this case, the two neighboring lights 800, 804 are illuminated at light level of three hundred (300) lux, just as bright as the immediate light fixture 802 above occupant 808 illuminating. This allows the occupant to feel good. Fixture 806 remains off as to provide energy savings FIG. 45 illustrates an alternate plan where the occupant has chosen a nominal savings light illumination plan C as he/she begins to walk in a direction to the right. In this case, a neighboring light fixture 820 behind the occupant may be reduced to a two hundred (200) lux light level, and light fixtures 822, 824 above and immediately in front of the occupant 828 may be illuminated at a light level of three hundred (300) lux. A light fixture 826 farther ahead but removed from the occupant 828 may turn on to a light level of two hundred and fifty (250) lux. This would allow the occupant to see clearly in the direction where to walk and still provide energy savings The use of two kinds of communication networks, a power line and a wireless network, allows long distance remote control and interactive response to mobile occupants of the room. FIG. 46 illustrates elements of one exemplary embodiment using a Texas Instruments CC2500 wireless low power 2.4 GHz RF transceiver chip 902, which operates in a frequency band 2400-2483.5 MHz ISM (Industrial, Scientific and Medical) and SRD (Short Range Device) Frequency Band. It allows sixty four (64) byte transmit/receive FIFOs and can be controlled via a 4-wire SPI interface (SI, SO, SCLK and CSn) serial communication protocol with SPI addresses from 0x00 to 0x2E. Such an interface may be used to read and write buffered data. A 16 bit RISC CPU 900 from an MSP430 family of microcontrollers may be used that provides two additional connections to the transceiver chip 902 GD02 (an Optional Digital output pin for Clear Channel Indicator), GDO0 (Atest, A digital output pin for test signals), CSn and SI for the I2C. The microcontroller 900 preferably operates in a master mode while the RF transceiver chip 902 operates in a slave mode. The transceiver may use a 26-27 MHz crystal 904 in a parallel mode oscillation. Typical values for the two crystal loading NPO capacitors 906, 908 may be 15 pF~27 pF connected one end to ground. There may be two RF balun/matching capacitors 910, 918 with values of 1.0 pF+/−0.25 pF respectively. There may be two RF balun/matching inductors 912 and 914 with values 1.2 nH+/−0.3 nH. There may be one RF LC filter inductor 916 with a value 1.2 nH+/−0.3 nH. There may be two RF LC filter/matching capacitors 922, 924 with values 1.8 pF+/−0.25 pF and 1.5 pF+/−0.25 pF respectively. There may be two RF balun DC blocking NPO capacitors 926, 928 with values 100 pF+/−5%. A 1% resistor 932 with typical value of 56K ohms may be used for an internal bias current reference. FIGS. 47, 48 and 49 illustrate exemplary pin and port assignments for the circuit if FIG. 46.

Multilink Broadcast Wireless Network

Figure 50:
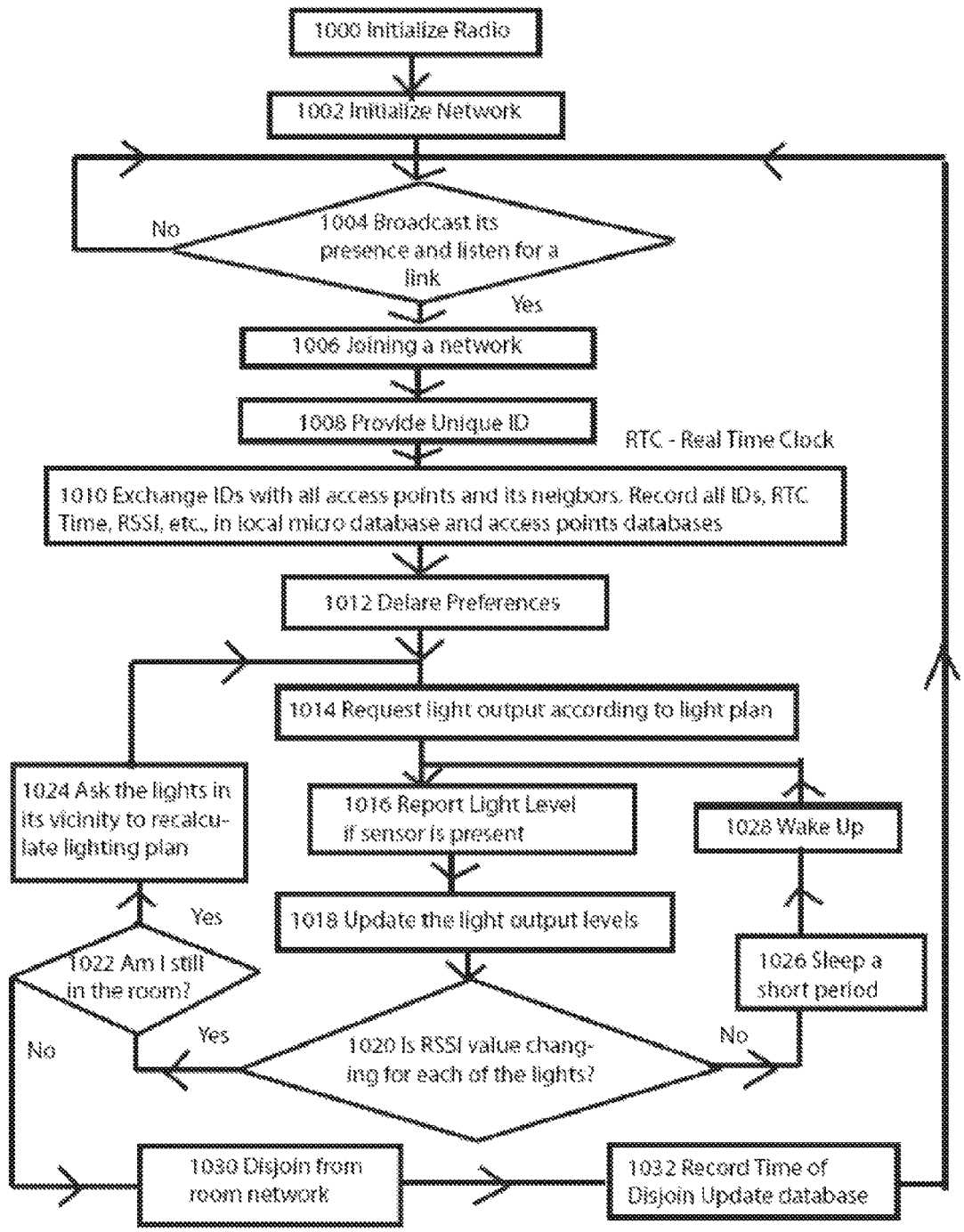
FIG. 50. Flowchart for a Mobile Tag.

FIG. 50 shows an exemplary flowchart for a microcontroller program in a mobile Tag unit. When a tag is powered on, the tag may first initialize a radio 1000. Then it may initialize a wireless network 1002. The wireless network may depend on the network protocol stack that is loaded. A SimpliciTI stack is preferred because a Zigbee stack may be much larger, and EEPROM memory space may be limited. All mobile tags may be assigned as end devices, and the devices at the light fixtures may be fully powered access points. Once a stack is established, the mobile tag broadcasts its presence and listens for a link 1004. The broadcast command allows all devices within the reception range to respond with a link action. If there is an access point within its range, the mobile tag will join the network 1006. This may be a typical network join. The access point should generate a member list of all devices in the network. Unlike a traditional join in a Zigbee network, a broadcast may also allow a multi-link broadcast network in which end devices (mobile tags) can communicate with other end devices and access points. Such a broadcast capability may be supported by SimpliciTI. An advantage would be that the network can grow to any size and dynamically be formed without all the limitations in Zigbee or SimpliciTI. It would allow all mobile tags and all access points in lighting fixtures to form a fully functional network. It preferably would allow a network formation in the absence of an access point. Mobile tags can detect each other's presence when they become members of this network.

Databases and Proximity Map

Each tag should exchange its unique ID 1008 with each other tag and with access points. An access point preferably will record the ID and the join time 1010 of a the mobile tag based on a Real-Time Clock (RTC) in its local micro database and also record the same event in the tag's micro database. In turn, the access point in the light fixtures may utilize Received Signal Strength Indicator (RSSI) information to calculate new proximity ("vector distance") map information with each of the mobile tags present. The access point then preferably sends this information to the central network server through either a power-line connection or a wired/wireless Ethernet network. The server preferably will aggregate and consolidate new information into a global proximity map in a SQL or other database.

A proximity map in matrix format stored in mobile tags and global proximity map generation is described in detail in the patent U.S. Pat. No. 7,598,854. Member's IDs, join times, and proximities may be recorded in the sever database. The server may use other databases to perform additional functionalities such as:

a) Implement personalized lighting plan preferences. The ability for devices to respond is discussed in patent application USP 20090327245.

b) Maintain time clocks for hours employees worked at each location. This facilitates workflow processes and improves productivity.

c) Update a program, such as Microsoft Outlook™ program, of the present location in the building of a tag. This could, for example, facilitate the calling of an impromptu meeting.

d) Retrieve identities of individuals who come in contact with each other and allow a trace back to implement disease surveillance intervention policy especially in a flu season, such as illustrated in U.S. Pat. No. 7,598,854.

e) Allow real-time asset tracking and management for items bearing a tag and prevent critical items leaving the building. Lights may turn on and alarm sound if items are moved. This improves security. Asset management and inventory status notification is also discussed in U.S. Pat. No. 6,816,074.

f) Provide building security, track visitors, and issue alerts of unauthorized movements.

g) Provide automated directions for visitors or new employees with a building floor plan, which is also discussed in US patent application, USP 20090327245.

Lighting Plan

With continued reference to FIG. 50, a mobile tag may call upon an access point to update its light plan preference (if selected on the buttons of the tag) or to retrieve a preset preference in the master database 1012. Then a tag may request an access points to regulate LED lights according to the chosen light plan 1014. A light level plan may be selected based on one or more of several parameters, including but not limited to distance of the tag from a light, time of day, calendar date (including daylight savings), light sensor values (fixed and/or mobile), and positions of lights relative to one another, electricity tariffs (which may change with time of day), etc. Other parameters may be used. Distance measurements may be computed from RSSI values, which may be the measured RF input signal levels in the channel based on transmission gains in the RX chain at the transceiver. In RX mode, an RSSI value may be read continuously from the RSSI status register until the demodulator detects a sync word.

Figure 51:
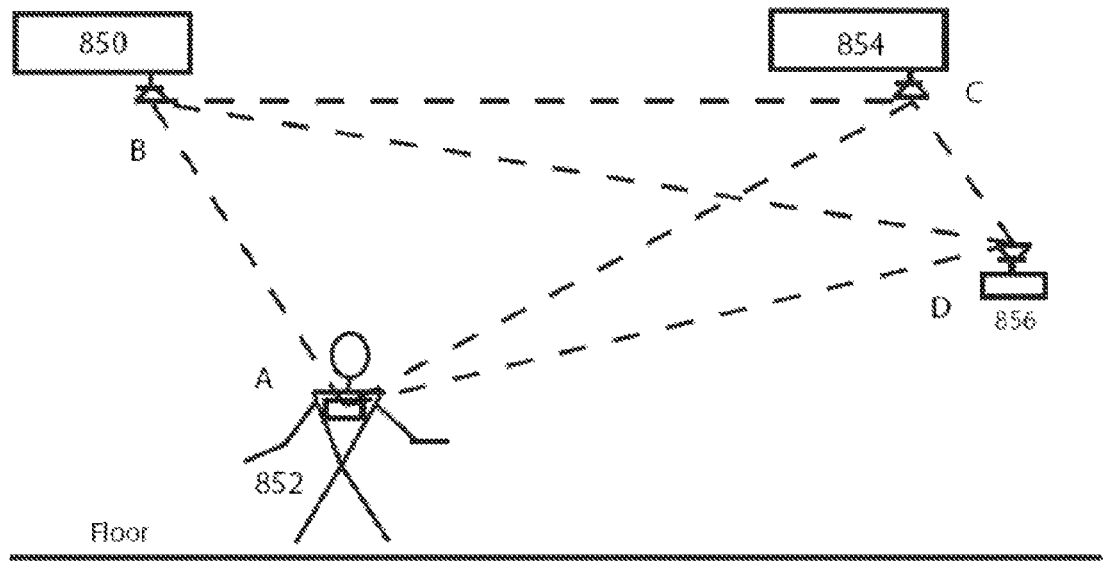
FIG. 51. Distance measurements from RSSI.

FIG. 51 illustrates an exemplary space, such as a room, hallway, sidewalk, street, etc. where there may be two light fixtures 850, 854; and a calibrating wireless unit 856. If the distance BC between the two fixtures is known, and if the calibrating unit 856 is positioned at a known location relative to the fixtures (i.e., BD and CD), then the corresponding RSSI values obtained for the fixtures may be used as a reference. Once the RSSI values are calibrated, a person's location 852 can determined from the RSSI values using the geometrical relation $AB^2=BC^2+AC^2-2\times BC\times AC \cos(\text{Angle BCA})$.

In addition, if there is a light sensor on the tag, the tag may report the light level to an access point (FIG. 50, item 1016). Access points may update their respective LED light output levels according to the received light sensor reading 1018. A tag may check for RSSI value changes with respect to an access point 1020. A change in RSSI value would indicate motion, and an access point may determine whether the tag is still within a range, such as within the room confines 1022 or if the space is outdoors, within some other range limit. If a tag is still within range, the tag may request an access point to recalculate its lighting plan 1024. The process of FIG. 50 would return to step 1014 to request an updated light output according to the applicable plan. If it is determined that the tag has left the room 1030 or relevant space, then the access point may record the tag's disjoin time from the network and update the database 1032. The access point may return to a periodic broadcast mode and listen to the link 1004 for the presence of any tags. In the specific case of an indoor space, a tag's leaving one room and entering another room presents another network formation event, and steps described above may be repeated at a different access point. (The same may occur in outdoor spaces.) A network from which the tag departed may alert a network to which the tag enters as to that tags lighting plan so that the person will have continuous and agreeable light upon passing through a doorway or otherwise transitioning location.

FIG. 52 illustrates a mobile name tag, which may be an end device. A tag may be implemented with active RF technology as shown in FIG. 46, though other implementations may be used. A tag may bear the name of a person to whom it is assigned, such as "Amy Lee" 1202. A light plan 1204, such as "P3," may be displayed on a screen 1206, which allows user to know the current light plan. This display 1206 can be implemented using LCD technology, LED technology, E-Ink technology, or another technology. E-Ink technology has relatively low power consumption since it consumes power only during switching. A tag may have various buttons 1208 used for selecting a light plan and other operations. A selected light plan 1204 may be called a "light preference". Above the screen 1206 may be an opening 1200 through which a light sensor may measure ambient light. A strip antenna 1210 may be implemented using a flexible circuit technology and may be embedded in the plastic cover film of the tag.

Figure 53:
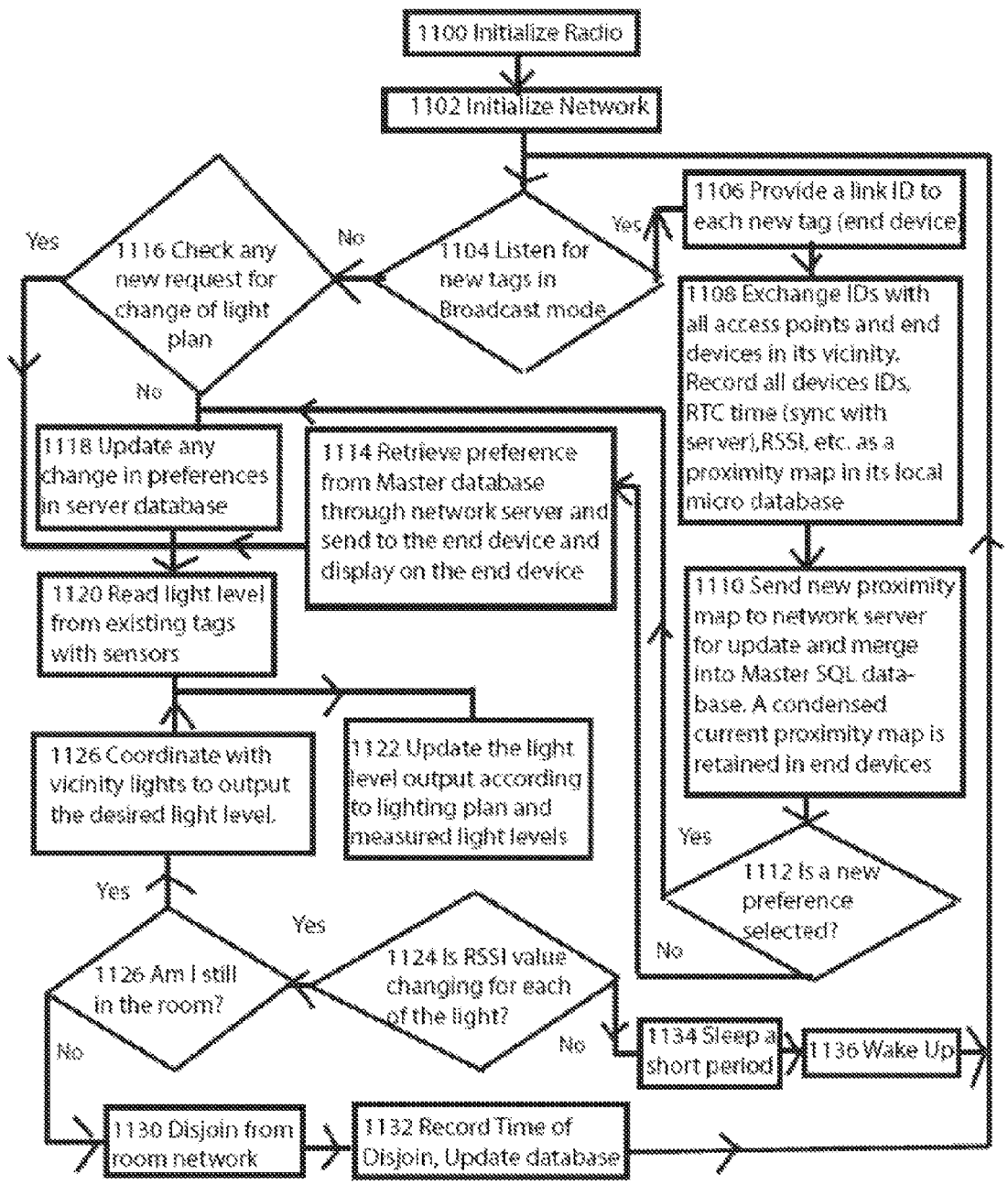

FIG. 53 shows a flow chart for an exemplary access point in a light fixture. In a nominal circumstance, the microcontroller and the radio preferably are switched on in a low power or occasionally a sleep mode. If the unit has never been powered up before, or after a power failure, it may go through an initialization step 1100 for the radio and an initialization step 1102 for the network. The radio may be listening 1104 for someone to enter the access point's service area, such as a room, corridor, sidewalk, street way, etc. An initial condition may be for the mobile tag to be in a broadcast mode. Upon detecting a tag, an access point preferably would provide a link ID 1106 for the new tag to join the network. In a broadcast mode, mobile tags may communicate with each other and join into a network among themselves. Each tag and access point preferably exchanges its ID 1108, captures all the IDs in its vicinity, and records these events in real-time. The information may be saved in a proximity map in matrix format in one or more micro databases. Another copy of the information may be sent to a network server and merged into a master database 1110. Mobile tags each may retain a condensed version of portions of the proximity map.

An access point preferably then checks for any new preference selected by a mobile tag 1112. If yes, the access point preferably updates a preference database at the network server 1118. Otherwise, the access point may retrieve a preference or a default choice from a network server database 1114 if the tag does not have an existing one.

An access point may read ambient light levels from existing tags that have sensors 1120. A fixture may then update the light output levels according to a lighting plan and optimize the output to measured light levels 1122. This dynamic lighting control may be capable of responding to changes in the lighting due to external environment.

An access point may monitor changes in RSSI with the mobile tags 1124 in order to detect movement of occupants. In the absence of RSSI value changes 1124, the access point may optionally go into a low power sleep mode 1134 for a time until waking up 1136 and returning to a step 1104 of listening for new tags. But if an RSSI value changes, the access point may evaluate the movement. For example, the microcontroller may determine whether a mobile tag is leaving the room 1126 or service area. If a tag did not leave the service area, then the microcontroller may continue to coordinate with other vicinity lights to output a more desirable light level for the occupant 1128. An access point may continue to monitor for changes until the occupant leaves the service area. When a tag leaves the service area 1130, the link ID may be removed to indicate a disjoin of the network. The disjoin event may also be recorded and entered into the network server database 1132. The access point may then return to the step for looking for a new mobile tag entering the room 1104.

If there are existing mobile tags in the room and there are no movements, an access point may check for any change in request for a light plan 1116. In this manner, the light fixture may be controlled to respond to requests from the occupant.

It should be noted that the access point also may report the energy consumption and time of usage 1110.

Master Network Server

Figure 54:
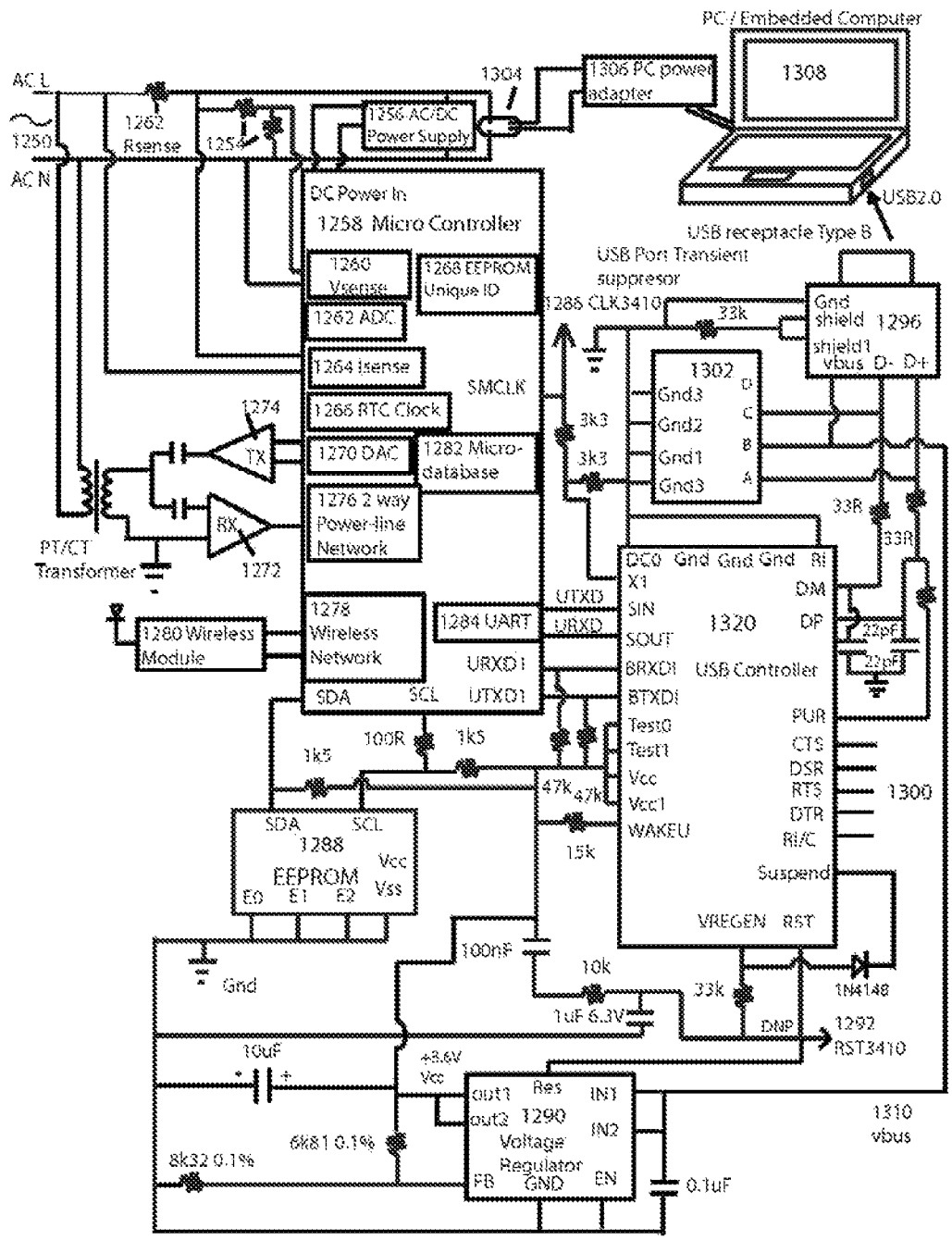
FIG. 54. Master Network Server.

FIG. 54 shows an exemplary circuit for a master network server, which draws power from AC power source 1250. Such a server may use a personal computer, a laptop, an embedded PC, or other computing machine. It may through a USB bus or other interface control lighting fixtures, and it may be used to program portable controls or wireless tags. A preferred server may communicate with all lighting fixtures through a power-line network and wireless network. Such a server may maintain databases of lighting plans, lighting preferences, and proximity maps, as well as histories of network events and energy usage. One exemplary master network server may be comprised of the following components:

a) Controller system 1258. One exemplary system may be based on a Texas Instruments MSP430 family of controllers with higher performance than controllers in lighting fixtures. It may measure its own power/energy consumption and that of an associated PC via an Analog to Digital Converters (ADC) 1262 with high voltage differential ports 1260, 1264 for measuring voltages across known resistances, Rsense1 1252 and Rsense2 1254. A Power-line network 1276 may include an analog to digital converter (ADC) to receive analog signals through receiver 1272. It also may transmit Pulse Width Modulation (PWM) signals using a Digital to Analog Converter (DAC) 1270 through a transmitter 1274. A stored memory EEPROM 1268 preferably is sufficiently large to maintain a micro-database, keep its unique ID, store a wireless program stack, and store its program. A stable crystal may be included to provide an accurate, on-chip clock signal 1286 and timing for a USB controller 1320. A Real-Time-Clock program 1266 preferably maintains time for the controller and all its network members. A higher accuracy clock may be achieved via synchronization with the PC, which in turn synchronizes with an atomic clock on-line via the Internet or other communication channel. In addition, the power distribution center/Power line network center and controller (FIG. 37, item 634) may collect information about the local time zone, daylight savings time and weather information from its internet access URL sites to anticipate the times for which a location may be receiving ambient sun or sky light. This is beneficial for designing an appropriate lighting plan and also anticipating future power demand. If a facility uses solar panels and a battery storage system to power its lighting system, an appropriate energy savings plan can be chosen to reduce power draw during peak or other critical times. Alternately, it can formulate a light plan that eliminates energy needs from the power grid by not depleting all the stored battery energy. Such a controller preferably draws its power from an isolated AC/DC power supply 1256.

b) A personal computer or laptop or an embedded PC, preferably with a USB2.0 or above port 1308 drawing its power from a power adapter 1306 and AC power connector 1304. In addition, the computer USB2.0 serial port communicates with a USB Controller 1320 via a USB receptacle Type B 1296 via a transient port suppressor 1302.

c) USB Controller 1320 communicating serially with micro controller 1258 via signal lines SIN, SOUT, BRXDI and BTXDI, and a UART 1284. The USB controller 1320 and voltage regulator 1290 may be reset by a reset signal 1292.

d) EEPROM 1288 expands the size of the controller memory. The EEPROM may be a Catalyst part CAT24FC32V1.

e) USB Port transient suppressor 1302 prevents voltage surges on the USB port. The USB Port suppressor may be a Texas Instruments part SN75240PW.

f) Voltage regulator 1290 preferably regulates the voltage from the USB bus from the computer to a voltage 1294, Vcc=+3.6 volts. It draws its power from the USB2.0 port via a VBus 1310, which is connected to the USB2.0 receptacle 1296. The voltage regulator may be a Texas Instruments part TPS77301DGK.

A wireless network may be constructed from a wireless network module 1280 similar to FIG. 46 with its TX port (FIG. 46 item 942) and RX port (FIG. 46 item 944) communicating with the I/O ports 1278 on the microcontroller 1258.

Master Network Server Flow Chart

Figure 55:
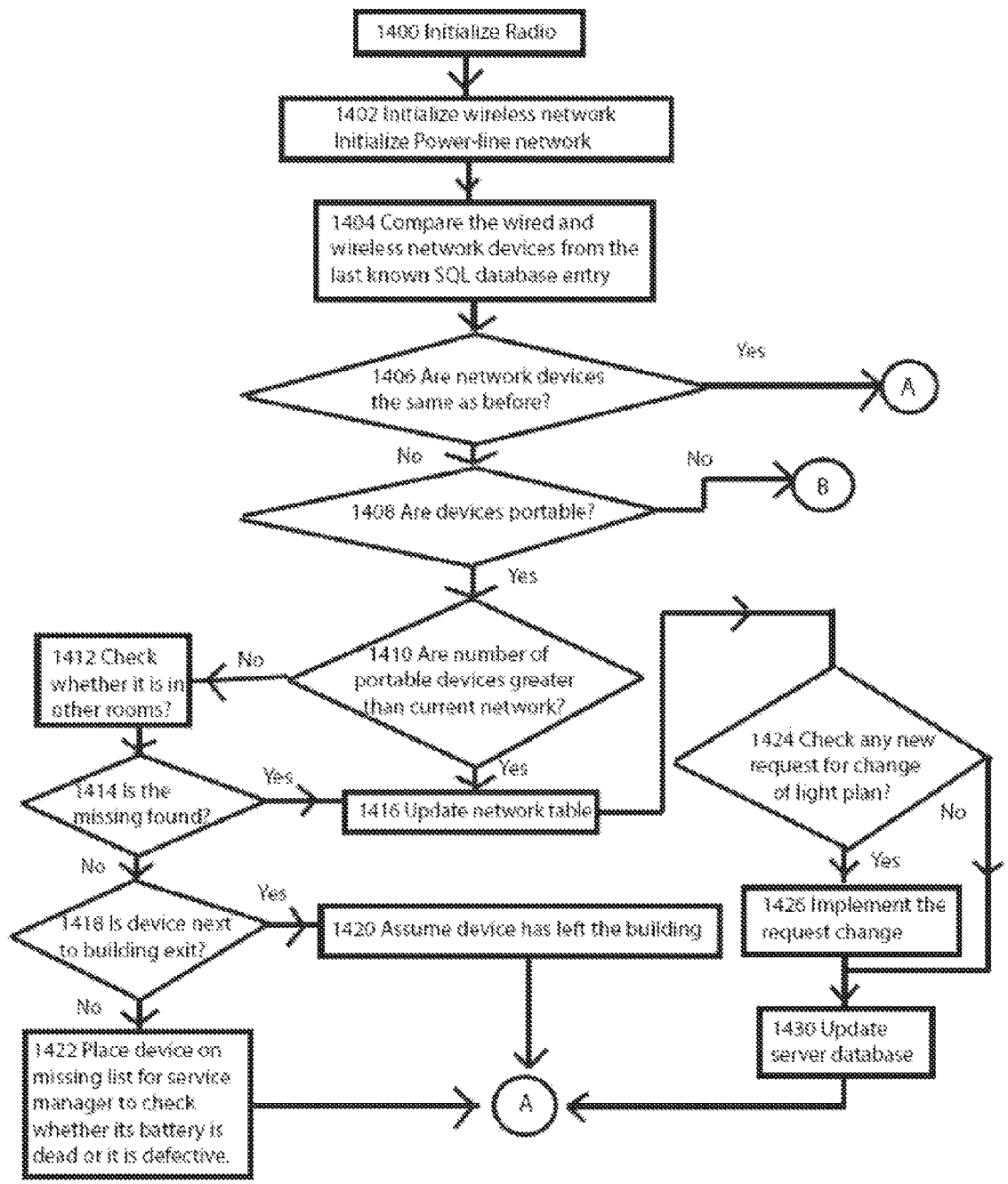
FIG. 55. Master Network Server flow chart Part 1.

FIG. 55 shows an exemplary Master Network Server flow chart. The server may first initialize a Radio 1400, along with a wireless network and a power-line network 1402. Initialization may involve the stack loading. Next, the server preferably communicates with all the devices currently active in the network 1404. It may then determine whether there is a discrepancy in the network devices compared to its last known database record 1406. If there is a discrepancy, the server may determine whether the discrepancy involves portable devices 1408. In step 1410, the server may determine whether the current number of devices is greater than or less than the prior number recorded in the database. If the current number of portable devices is less, then the server attempts to determine to what other location the device may have moved 1412. If the device is found in another room or other location, the server updates the network table 1416. If the device is not found 1418, the server attempts to determine whether the device may have left the service area through an exit at the last location where the device was detected. (This step may be modified according to service area, e.g., if the service area is outdoors.) If that location has an exit, the server may place device on a list of devices that have left the service area 1420. This list is not a list of missing/failed devices, but may be a list of devices assumed to be active and awaiting return to the service area. If there was no exit from the devices last registered location, the device may be placed on a list of missing/failed devices 1422. The missing/failed list is kept, and an alert may initiated for a service manager to check whether the battery is dead or the device is inoperative. At this point, the program may return to point "A", which is found in FIG. 56 and which is part 2 of the Master Network Server flow chart.

In step 1416, after the network table has been updated, the process may proceed to step 1424 to check for any new requests for changes to a lighting plan. If a change has been requested, the process may proceed to step 1426 to implement the requested change. After implementing the requested change, or if no change was requested, the process may update the server database in step 1430. (If no request for a change was made, the server may nevertheless update the database with a time stamp and other information, such as the location of the employee, etc.) The process may return to point "A", which is found in FIG. 56.

Figure 56:
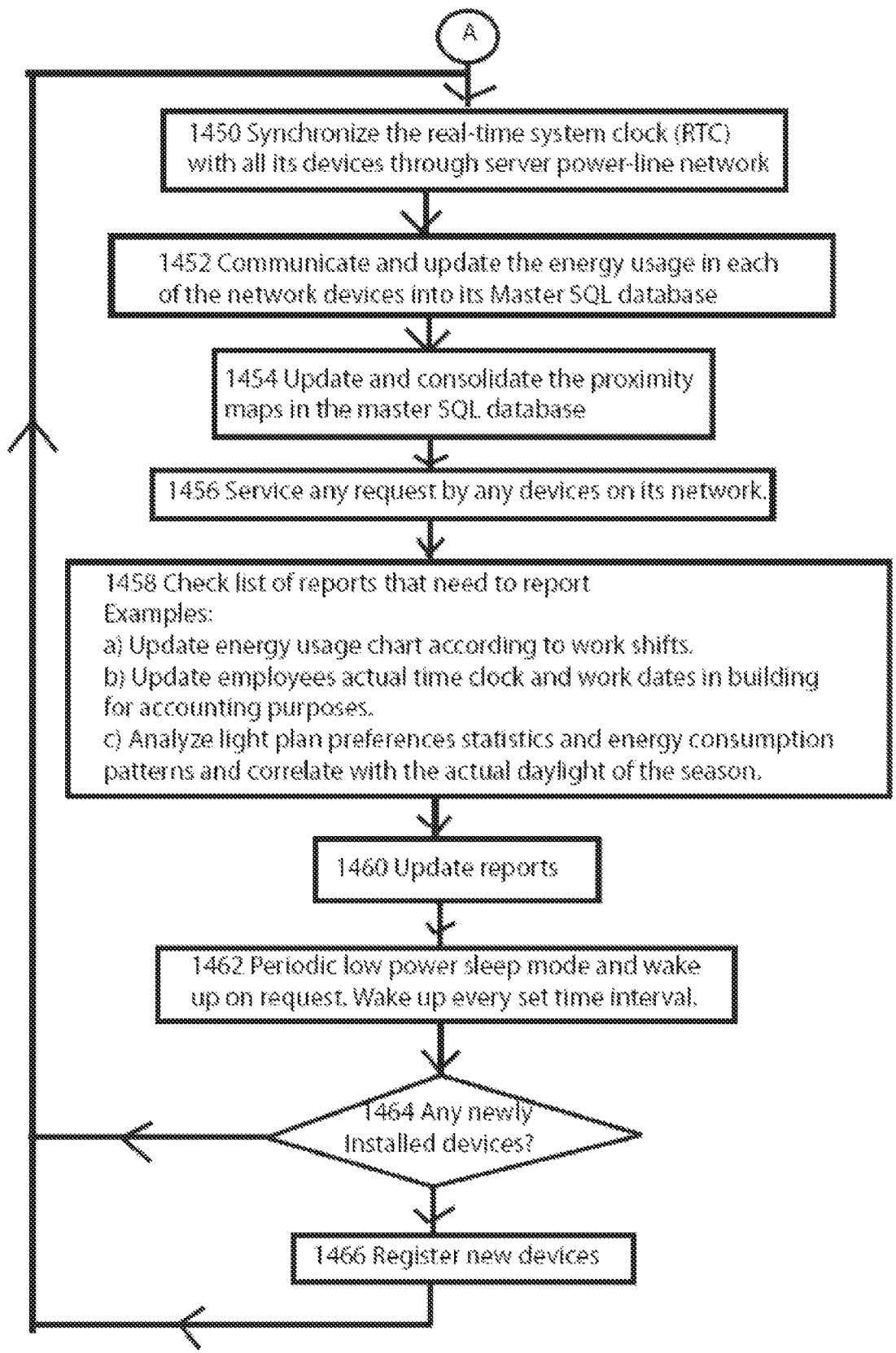
FIG. 56. Master Network Server flow chart Part 2.

In FIG. 56, point "A" is a real-time time synchronizing step 1450. This synchronization preferably is carried with all non-wireless devices through the server power-line network. Wireless portable devices preferably synchronize through the wireless intercommunication. In step 1452, the server may communicate and update a measurement of energy usage for some or all of the devices on its network and store the updated information in a master database. In step 1454, the server may update and consolidate proximity maps in the database. In step 1456, the server may carry out any service requests made by any devices on its network list. For example in step 1458, the server may update an energy usage chart according to a timetable. The server may update employees' actual time clocks and work dates for accounting purposes. (This may be a more accurate way of recording work hours based on both location and building. Sometimes, an employee may have different jobs in different buildings, and they can clock for different rates automatically by this system.) The server may analyze light preference statistics and energy consumption patterns, and the server may correlate the actual daylight of the season. This capability allows behavioral patterns to be identified and energy savings policies to be implemented. Worker efficiency studies can also be performed, and lighting policies may be adjusted for productivity rather than energy savings if this should be the policy of the building operator. Compromise workflow solutions can also be found with this kind of system, such as optimizing for performance during some time periods and for energy efficiency during other periods.

In step 1460, the server may update reports. Upon completion, the server network may enter a low power sleep mode 1462 and wake up upon request or after a predetermined time. Wake up upon request may be initiated upon installation of a new device. Step 1464 allows for installation of a new device. Step 1466 allows for new device registration. In the absence of new devices, the program can return to point "A."

Figure 57:
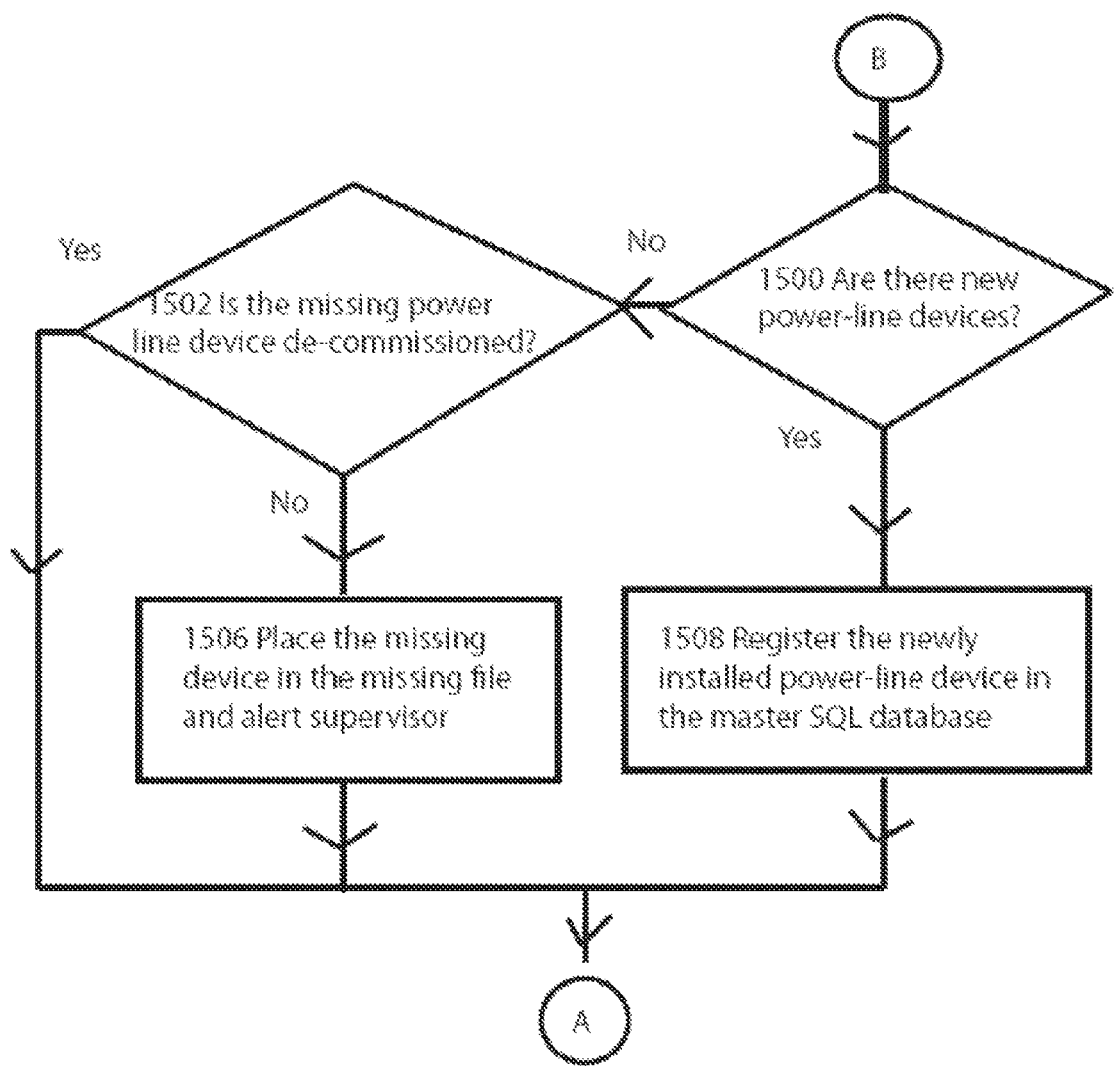
FIG. 57. Master Network Server flow chart Part 3.

In FIG. 55, a step 1408 labeled "B" identified a situation where a new device has entered the system, but the device is not a portable device. This could be, for example, a situation where a new light fixture has been installed. However, this new fixture may be added to the system according to steps illustrated in FIG. 57. A step 1500 may determine whether the new device is a power-line device. If it is, the device may be registered 1508 in the master database, and the server process may return to point "A" in FIG. 55. If there was no new power-line device, but if a device was removed, the server may determine whether a device is to be decommissioned 1502. If the device is to be decommissioned, the server may remove it from the database. If the device is not to be decommissioned, then the server may identify it in the database as missing and initiate an alert to a supervisor of the building or other person for resolution. The process may then return to point "A" in FIG. 55.

Alternate AC Voltage and Current Measurement Solution

Figure 58:
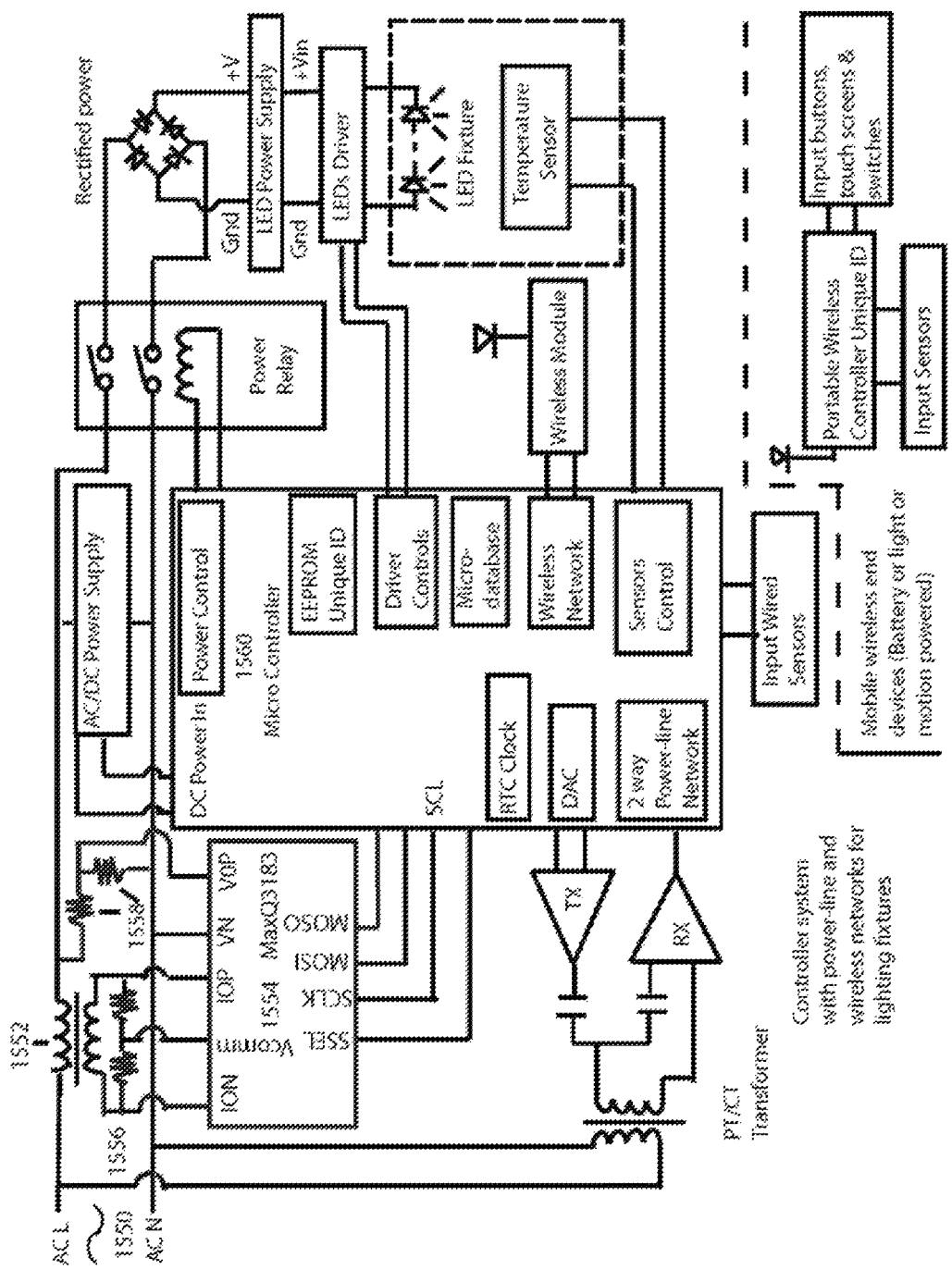
FIG. 58. Additional AC voltage and current sense IC interface.

FIG. 58 illustrates an alternate circuit to the one shown in FIG. 41. In the circuit of FIG. 41, a microcontroller system 580 measured both AC voltage and AC current. In contrast, FIG. 58 shows that a circuit may use a dedicated Maxim integrated circuit MaxQ3183 1554 for both AC voltage and current measurements and communicating measured values back to a microcontroller system 1560. In this arrangement, the microcontroller need not directly interface to the power-line voltages and be subject to complications associated with voltage spikes and demands for isolated power and ground. The Maxim IC may also provide various power measurements, such as apparent and real power, which the microcontroller system 1560 would no longer need to compute. This arrangement would free the micro-controller system to perform other functions. Similar implementation can be for the Master network server shown in FIG. 54.

In the circuit of FIG. 58, the Maxim chip 1554 measures AC line voltage 1550 through voltage dividing resistors 1558 The chip 1554 may measure current and power factor through a transformer 1556 connected to its Vcomm, ION and IOP pins. The chip may communicate with the microcontroller 1560 via an I2C bidirectional serial communication port. Power-line communications in the circuit of FIG. 58 preferably are the same as in the circuit of FIG. 41. The circuit of FIG. 58 would increase the capacity of the microcontroller to perform other functions.

The embodiments described above are intended to be illustrative but not limiting. Various modifications may be made without departing from the scope of the invention. The breadth and scope of the invention should not be limited by the description above, but should be defined only in accordance with the following claims and their equivalents.

What is claimed is:

1. A lighting system for use with one or more mobile electronics devices, said lighting system comprising:
  a database for storing unique IDs of the one or more mobile electronics devices;
  a plurality of light fixtures having unique identifiers;
  the plurality of light fixtures further comprising a first light fixture with a first known location and a second light fixture with a second known location;
  the first and the second known location being stored in the database;
  said lighting system further comprises;
  a control subsystem for controlling the one or more light fixtures;
  a position determination subsystem in communication with the one or more electronic devices capable of determining positions in three dimensions of each of the one or more electronic devices;
  a vector determination subsystem in communication with the position determination unit and with the one or more electronic devices;
    wherein the one or more mobile electronics devices comprising:
  an interface through which a user can communicate with the plurality of light fixtures and provide an input for setting a lighting level;
  a light sensor measuring a light level;
  wherein the one or more electronics devices transmitting a signal to the first or the second light fixture,
  based on the received signal and the known location of the first and second light fixtures, the vector determination subsystem determines the exact position of the one or more mobile devices;
  once the exact position of the one or mobile devices are determined, the control subsystem can adjust a light intensity, brightness or level based on the location of the one or more mobile devices, and/or the one or more mobile devices can transmit a personalized user preference through the input of the user interface to the control subsystem for adjusting a light based on the user selection;
  wherein the personalized user preference is a plurality of pre-stored light illumination plans;

wherein based on the position determination, the control subsystem can track the movement of the one or more mobile devices and adjust the light intensity, brightness or level to allow cost-saving illumination plans; and the control subsystem is determined to estimate a light output power required for each of the plurality of the light fixtures in respect to the position of the one or more mobile device in an area;

wherein the one or more plurality of the light fixtures are reducing light level simultaneously as the user is leaving the area.

2. The system of claim 1, wherein:

the one or more mobile devices can be attached to a user, employee, and/or an object.

3. The system of claim 2, wherein:

the control subsystem is capable of maintaining a tracking database of all the one or more mobile devices within its range;

the control subsystem with a real-time clock attached to the tracking database of the one or more mobile devices providing information for an inventory control;

wherein the one or more mobile devices are entities in a production line, productivity information is provided for a real-time productivity management; and wherein the one or more mobile device are carried by an employee with attached location and real-time clock information time card that are stored in the tracking database.

4. The system of claim 3, wherein:

the control subsystem is capable of associating the user, the employee or the object with a workflow process in real-time and determine production rate and/or human wage cost;

the control subsystem further assigning a coordinated lighting plan to the employees or the user at specific location and a specific time and determine a desired workflow plan to increase productivity.

5. The system of claim 3, wherein:

a time determination subsystem is capable of providing real-time inventory keeping of the one or more mobile devices; and the control subsystem is capable of alerting if the one or more mobile devices are moved unintentionally from its intended location.

6. The system of claim 3, wherein:

a proximity determination among the one or more mobile devices provide contact tracing of the one or more mobile devices; and maintaining a list of contact tracing in the database.

7. The system of claim 6, wherein:

the control subsystem along with the database is capable of determining a duration of proximity of contact at predefined range.

8. The system of claim 3, wherein:

the control subsystem in communication with a temperature sensor is capable of identifying a fire and providing an exit route to the one or more mobile devices;

wherein the control subsystem further providing building routes navigation directions in general.

9. The system of claim 1, wherein:

the plurality of pre-stored light illumination plans includes one of;

wherein a lighting network map with ranging information to provide relevant actual light level information of other neighboring light fixtures to that particular light fixture, or fixtures that might be blocked from communicating directly with an occupant to determine the appropriate light level the one or more fixtures should provide knowing the location and preference of the occupant to all these fixtures.

10. The system of claim 6, wherein:

the control subsystem capable of generating a proximity matrix map subsequent set of second tier contacts in the database; and capable of extracting a contact tree of proximity contacts maintained in the database.

\* \* \* \* \*